(12) United States Patent
Bloom

(10) Patent No.: US 6,694,217 B2
(45) Date of Patent: Feb. 17, 2004

(54) AUTOMATED SYSTEM FOR EFFICIENT ARTICLE STORAGE AND SELF-SERVICE RETRIEVAL

(75) Inventor: Gregg Bloom, Lauderdale by the Sea, FL (US)

(73) Assignee: Breakthrough Logistics Corporation, Lauderdale by the Sea, FL (US)

( * ) Notice: Subject to any disclaimer, the term of this patent is extended or adjusted under 35 U.S.C. 154(b) by 8 days.

(21) Appl. No.: 09/864,724

(22) Filed: May 24, 2001

(65) Prior Publication Data

US 2002/0177922 A1 Nov. 28, 2002

(51) Int. Cl.[7] .............................................. G06F 17/00
(52) U.S. Cl. ........................ 700/215; 700/242; 700/243
(58) Field of Search ................................. 700/214, 242, 700/215, 225, 226, 243

(56) References Cited

U.S. PATENT DOCUMENTS

| | | | | |
|---|---|---|---|---|
| 4,636,634 A | * | 1/1987 | Harper et al. | 235/385 |
| 4,643,495 A | * | 2/1987 | Pepping et al. | 198/800 |
| 4,792,270 A | * | 12/1988 | Yoshida | 186/37 |
| 4,813,752 A | * | 3/1989 | Schindler | 198/798 |
| 4,877,121 A | * | 10/1989 | Yamashita et al. | 198/475.1 |
| 4,894,717 A | | 1/1990 | Komei | |
| 4,997,076 A | * | 3/1991 | Hirschfeld et al. | 194/212 |
| 5,223,829 A | * | 6/1993 | Watabe | 235/382.5 |
| 5,330,062 A | * | 7/1994 | Murphree | 198/793 |
| 5,385,265 A | * | 1/1995 | Schlamp | 221/131 |
| 6,010,064 A | * | 1/2000 | Umeda et al. | 235/375 |
| 6,085,170 A | | 7/2000 | Tsukuda | |
| 6,246,925 B1 | * | 6/2001 | Robinson et al. | 209/549 |
| 6,416,270 B1 | * | 7/2002 | Steury et al. | 414/282 |
| 6,421,580 B1 | * | 7/2002 | Robrechts | 700/214 |
| 6,456,900 B1 | * | 9/2002 | Kakuta | 700/233 |
| 2001/0042024 A1 | | 11/2001 | Rogers | |

\* cited by examiner

Primary Examiner—Khoi H. Tran
(74) Attorney, Agent, or Firm—Akerman Senterfitt

(57) ABSTRACT

An automated system of storage locker bins to efficiently provide the storage and self-service retrieval of articles. The articles can be packages and the automated system of storage locker bins can be used effectively in a package delivery process in which packages are transported in bulk to a destination centralized pickup location for recipients. The automated system of storage locker bins can operate at a high level of efficiency with regard to space utilization to further reduce storage costs and ultimately reduce delivery costs by employing moving and stationary bins to allow recipients to retrieve packages stored at heights above the reach of those recipients and bins which are configurable in size to allow storage locker bins to be adjusted to sizes more closely approximating the size of the articles or packages to be loaded into them. The automated system of storage locker bins can enable self-service retrieval following an authentication of the recipient by providing recipients the location of the storage machine unit containing their package and a temporary access code to retrieve their package.

49 Claims, 25 Drawing Sheets

Bin Inventory table — 1300

| Bin Id | SBU Id | Master Bin Id | Bin Size | Configuration Code | Temperature Code | Customer Id | PIN | Quick Code | Package Id | Status | Delivery Employee Id | ePD Shipper Id | Delivery Date/Time | Notification Date/Time |
|---|---|---|---|---|---|---|---|---|---|---|---|---|---|---|
| A01-01-0234 | A01 | 01 | 3 | 234 | standard | 183-62-3085 | 9999 | 1111 | 11122123-4-AT001-080400- | notified | 183-62-3085 | ePackage Depot | 7/12/2000 8:05:22 PM | 7/12/2000 8:10:06 PM |

Bin Availability data view — 1301

| Bin Size | Temperature Code | Quantity |
|---|---|---|
| 3 | standard | 47 |

Bin Reservation table — 1302

| Bin Size | Temperature Code | ePD Shipper Id | Reservation Date/Time | Quantity | Trailer Loading Employee Id | Status |
|---|---|---|---|---|---|---|
| 3 | standard | ePackage Depot | 7/11/2000 11:33:04 | 11 | 183-44-4288 | new |

Reserved Bins data view — 1303

| Bin Size | Temperature Code | Quantity |
|---|---|---|
| 3 | standard | 19 |

Pending Bin Configuration Adjustments table — 1304

| Bin Size | Temperature Code | Quantity Adjustment |
|---|---|---|
| 3 | standard | -1 |

Unreserved Bins data view — 1305

| Bin Size | Temperature Code | Quantity |
|---|---|---|
| 3 | standard | 28 |

FIG. 10A

Configuration Adjustments Log table

| Configuration Adjustment Id | Configuration Type | Bin Id 1 | Bin Id 2 | Bin Id 3 | Bin Id 4 | Configuration Code 1 | Configuration Code 2 | Configuration Code 3 | Configuration Code 4 | Employee Id | Configuration Date/Time |
|---|---|---|---|---|---|---|---|---|---|---|---|
| A01-01-0234-121300 | dividing | A01-01-0234 | | | | 2 | 34 | | | 183-62-3085 | 12/13/2000 6:59:17 PM |

1306

High-availability Bins data view

| SBU Id | Temperature Code | Available Quantity |
|---|---|---|
| A01 | standard | 32 |

1307

Employee table

| Employee Id | ePD Shipper Id | Local Market Id |
|---|---|---|
| 432-47-0926 | epd | sflor |

1308

Notification Check table

| Customer Id |
|---|
| 123-45-6789 |

Notification Queue table

| Customer Id | Record Date/Time | Total Number of Packages | New Indicator | First Notification Date/Time | Last Primary Contact Date/Time | Last Secondary Contact Date/Time | Next Primary Contact Date/Time | Next Secondary Contact Date/Time | Number of Primary Attempts | Number of Secondary Attempts | Next Contact Date/Time |
|---|---|---|---|---|---|---|---|---|---|---|---|
| 123-45-6789 | 7/12/2000 8:06:22 PM | 1 | yes | null | null | null | null | null | 0 | 0 | null |

1311 brace over last columns

Package Pickup table

| CDC Id | Bin Id | SBU Id | Master Bin Id | Configuration Code | Bin Size | Temperature Code | Customer Id | PIN | Quick Code | Package Id | Delivery Employee Id |
|---|---|---|---|---|---|---|---|---|---|---|---|
| sflor-019 | A01-01-0234 | A01 | 01 | 234 | | 3 standard | 183-62-3085 | 9999 | 1111 | 111122123 4-AT001-080400-001 | 183-62-3085 |

1312

Package Pickup table (continued)

| Shipper Id | Delivery Date/Time | Notification Date/Time | Pickup Date/Time |
|---|---|---|---|
| ePackage | 7/12/2000 8:05:22 PM | 7/12/2000 8:10:06 PM | 7/13/2000 5:43:25 PM |

Quick Code table — 1313

| Quick Code | PIN | Customer Id |
|---|---|---|
| 1111 | 9876 | 123-45-6789 |

SBU Settings table — 1314

| SBU Id | Load Position Master Bin Id | Door Configuration Code |
|---|---|---|
| A01 | 16 | 100 |

Bin Movement table

| Load Position Master Bin Id | Movement needed for Master Bin | Movement needed for Master Bin 02 | ... | Movement needed for Master Bin [x] | [-x] |
|---|---|---|---|---|---|
| 16 | -3 | -4 | | | |

1315

Master Bin by Movement table

| Load Position Master Bin Id | Master Bin After Movement 0 | Master Bin After Movement 1 | Master Bin After Movement -1 | Master Bin After Movement 2 | Master Bin After Movement 14 | Master Bin After Movement -2 | Master Bin After Movement [x] |
|---|---|---|---|---|---|---|---|
| 16 | 16 | 15 | 17 | 14 | 18 | ... | [x] |

↳ 1316

Customer table

| Customer Id | PIN | Last Name | First Name | CDC Preference | Previous CDC | Zip Code | Primary Contact Type | Primary Contact Number/ Address | Primary Contact Frequency | Primary Calling Window Start Time | Primary Calling Window End Time |
|---|---|---|---|---|---|---|---|---|---|---|---|
| 123-45-6789 | 9876 | Brenner | Raymond | sflor-019 | sflor-019 | 33333 | phone | 954-565-4444 | 24 | 8:00 | 21:00 |

↳ 1256

Customer table (continued)

| Secondary Contact Type | Secondary Contact Frequency | Secondary Contact Number/ Address | Secondary Calling Window Start Time | Secondary Calling Window End Time | Dual Notification Indicator | ePD Account Balance |
|---|---|---|---|---|---|---|
| e-mail | 0 | customer@ | | | yes | 0 |

FIG. 10D

AUTOMATED SYSTEM FOR EFFICIENT ARTICLE STORAGE AND SELF-SERVICE RETRIEVAL

CROSS REFERENCE TO RELATED APPLICATIONS

This application is related to and claims priority from U.S. application Ser. No. 09/810,903 entitled "METHOD AND APPARATUS FOR EFFICIENT PACKAGE DELIVERY AND STORAGE," filed Mar. 16, 2001, the entirety of which is incorporated herein by reference.

BACKGROUND OF THE INVENTION

1. Field of the Invention

The invention pertains to the general field of storage and delivery of ordered items. More particularly, the invention pertains to an efficient automated system of storage locker bins for storing and facilitating the self-service retrieval of an article.

2. Description of the Related Art

The Internet has provided tremendous opportunities for the sales of products in the retail business. Consumers can easily go online using a computer, personal digital assistant (PDA), or even a cellular phone, and readily access a plethora of web sites that offer a wide range of products. Notwithstanding the fact that online businesses can offer lower prices to consumers because of lower overhead costs, consumers and retailers can be disadvantaged by the cost associated with shipping and handling. For example, the effective cost of ordering a bottle of shampoo and a toothbrush which might cost $4.00 could be $9.00 due to the cost of shipping and handling. As a result of the added cost of shipping and handling, it is currently impractical to order low cost items unless the cost of shipping and handling can be significantly reduced. Even for higher priced items, the shipping and handling costs associated with each order can be tolerable for an occasional purchase, but are prohibitive when added up across the frequency of purchase a consumer normally makes.

In order to reduce the cost of shipping and handling, more efficient methods and systems of delivery are required. In current delivery methods and systems, ordered items may be picked at a retailer's fulfillment site in batches, but each order is handled in a singular manner. A recipient of a product may place an order to a retailer. The retailer accepts the order, packages the ordered item and then ships the package along with other packages via a package delivery service. Once the package delivery service picks up the package from the retailer, the package is usually taken to an initial distribution center where it is sorted according to the destination address of the recipient. It will then be shipped by air, land or sea to one or more distribution centers where it is resorted every time. Once the package reaches the distribution center that services the recipient locale, the package will be transported on a delivery truck, along with other packages to be delivered in that local area, to the customer-specified address of each package on the delivery truck, until the delivery truck reaches the customer-specified address of the recipient's package for final delivery.

Inherent in these delivery and handling processes are numerous inefficiencies that in the end, result in increased cost. Firstly, the packages of ordered items are packed inefficiently for the entire distance that they are transported. This is due to the nature of trying to pack items of different shapes and sizes into a box or container that is large enough to hold all the items, with added packing materials to prevent the differently shaped items from damaging each other during transport. Secondly, packages are moved from cargo-carrying vehicles and package sorting facilities a numerous amount of times as packages are distributed. The packages are moved from a delivery vehicle to a facility and vice-versa. At each point that a package changes hands when being routed through a package shipper's distribution network, it is resorted and grouped with other packages to fit onto the next cargo-carrying vehicle. This translates to an increased shipping and handling cost. Thirdly, each package delivered to its final distribution center has to be carried on an individual basis to the recipient's delivery address. The packages are delivered to recipient addresses on smaller cargo-carrying vehicles and can only be delivered during reasonably acceptable business hours. If the recipient is not available at the time of the attempted delivery, a package may either be left outside of a recipient's home where it is susceptible to theft, mischief, or weather damage, or it may remain undelivered until a further delivery attempt is made. The shipping cost is further compounded in instances where several attempts have to be made to finalize the delivery.

Analysts have predicted that the buying habits of mainstream consumers will change, in the near future, to one that is heavily dependent on the Internet. In addition to the inefficiencies described above, if and when this growth occurs, the current delivery methods and infrastructure will be vastly inadequate to accommodate this growth.

Given these inefficiencies, there exists a need to achieve more efficient methods and systems for delivering packages. The invention discloses a storage system for storing delivered articles. The system can include a storage machine unit with storage locker bins, which randomly store a delivered article destined for a recipient. The random storage of a delivered article means that the storage locker bins are not predetermined, such as in a mailbox system where a particular mailbox belongs to a specified individual. With the present invention, a delivered article can be placed into any available storage locker bin. The system can include means for loading the delivered article into any randomly chosen storage locker bin that has a capacity to accommodate the delivered article. Furthermore, an association can be made between an identifier of the article (article identifier) and an identifier of the storage locker bin (storage locker bin identifier).

The storage machine unit can include storage locker bins that are moveable about an axis, thereby providing access to a storage locker bin while loading articles that have been delivered (delivered articles). The storage machine unit can have bin doors that correspond to the storage locker bins, and the doors can remain unlocked while the moveable storage locker bins revolve about an axis during loading. The storage locker bins can be positioned so that they move vertically about the axis. The means for loading the delivered article can further include an optical reader, for example a scanner, for recognizing the article identifier and the storage locker bin identifier.

During retrieval of the delivered article by a recipient, the storage locker bins can be moved about the axis so as to provide access to a particular storage locker bin. The storage locker bins can be vertically moveable about the axis. The storage machine unit can include a set of bin doors, which correspond to the moveable storage locker bins to provide access to any of the moveable storage locker bins when the storage locker bins are moved adjacent to the set of bin doors. The set of bin doors can be stationary with respect to the movement of the moveable storage locker bins. Hence, movement of the storage locker bins is independent of the set of bin doors. Access can be provided when the moveable storage locker bins are moved to a position behind the stationary set of bin doors. The system can further have a bin door sensor that can detect closure of a bin door of the set of bin doors, prior to permitting movement of the moveable storage locker bins during the retrieval. Hence, if a bin door is open during the retrieval, then the storage locker bins can be prohibited from moving about the axis. This ensures that other storage locker bins cannot be accessed through the open storage locker bin door while the moveable storage locker bins are moving during retrieval. Some of the storage locker bins within the storage system can be stationary storage locker bins located at a fixed position within the storage machine unit.

The storage system can further have means to enable self-service retrieval of the delivered article by the recipient. The self-service retrieval means can further include means for determining which moveable storage locker bin corresponds to a code entered by the recipient, wherein the code can identify and locate which moveable storage locker bin contains an article destined for the recipient. The code can be one containing a recipient identifier, or a PIN code, or a code temporarily assigned to the recipient to enable retrieval, or any combination thereof. Upon determination of the storage locker bin containing an article for the recipient, moving means provides for moving that storage locker bin to an unloading position. A lock mechanism provides means for unlocking the storage locker bin that has been moved to the unloading position.

The storage locker bins can further include an adjustment dividing mechanism that can enable a storage locker bin to be configured into a quantity of storage locker bins of various dimensions. The adjustment dividing mechanism can include a dividing panel within the storage locker bin and a key operated locking mechanism capable of locking the dividing panel into different positions. A single key can act as a master key that operates a plurality of the key operated locking mechanisms. The storage system can further include means for tracking storage locker bin configuration changes and a data record for storing and updating the tracked configuration changes. The storage locker bin configuration changes can include changes to a quantity of storage locker bins within the storage locker bin (a quantity of bins within a master bin) and/or changes to the dimensions of the storage locker bins (dimensions of the bins within a master bin). An optical reader can be utilized to read configuration change data.

The storage system can further include electronic circuitry for automatically triggering a dispatch of an electronic notification to the recipient of a delivered article subsequent to loading the article. The electronic circuitry can have recording means necessary for recording billing information related to the delivery of the delivered article. This information can include an order identifier, an ordering customer identifier, a recipient identifier, a customer identifier, a package identifier, a delivery date, a delivery time, a delivery notification date, and/or a delivery notification time. The electronic notification can be in the form of a facsimile, an email, a telephone call, and/or a page. The time for dispatching the electronic notification can be customized to include a periodic notification and/or a time during which dispatching the electronic notification is restricted.

The storage system can further include reservation means for reserving a quantity of storage locker bins for articles to be loaded at a future time. The reservation can be general in the sense that the storage system can reserve a quantity of bins of a particular size without having to reserve specific bin locations. Alternatively, the reservation can also be one in which specific bin locations can be reserved. The reservation can be for a specific shipper.

The storage system can further have authentication means for authenticating the identity of a recipient prior to revealing an identifier of a storage machine unit (storage machine unit identifier) containing an article destined for the recipient or providing access to the storage locker bin containing the article destined for the recipient. The means for providing access to the storage locker bin containing the article destined for the recipient can include providing a temporary access code to enable retrieval of the article from the storage locker bin. The authentication means can further include a data card reader, a data entry keypad, and/or a finger print authentication device or similar device such as a retina scanning device. The authentication means can be located separately from the storage machine unit. An electronically controllable entrance door can control entry to an area of a facility containing storage machine units, the entrance door having a disposition to allow or deny entry controlled by the authentication means.

The storage system can further have means for creating a package location report having identifiers of storage machine units containing articles destined for a particular recipient. The package location report can list a temporary access code that can be utilized in conjunction with a recipient's PIN code for retrieval of the article destined for the recipient. The storage system can also include an entrance station having a data entry keypad and/or a data card reader. An access card having a recipient identifier electronically stored on the card can be read by the data card reader. The means for creating a package location report can include means for validating an identity of the recipient, wherein the validation means can include reading the recipient identifier from the access card using the data card reader and validating the data entered on the data entry keypad in conjunction with the read recipient identifier.

The storage system can further include an access card having a recipient identifier electronically stored or embedded in the card, wherein the recipient identifier can be read by a data card reader. Additionally, a data entry keypad can be used for inputting a recipient's PIN code. Validation of a recipient identifier and PIN code can cause the electronic opening of an access to a destination centralized pickup location wherein the storage machine unit is located.

The storage system can include a data record having stored therein, an article identifier and an associated storage locker bin identifier. The article identifier can include an identifier of the recipient. The storage system can further include means for creating a report listing quantities of available bins within the storage machine unit.

An embodiment of the invention can further be described as a storage system for storing delivered articles, including storage machine units having storage locker bins which can randomly store delivered articles destined for recipients and a processor communicatively interfaced to the storage machine units which can control a disposition of the delivered articles within the storage machine units. The storage system can further include a database communicatively linked to the processor, for example a server, and one or more application programs linked to the database for controlling the disposition of the delivered articles. Disposition can include, configuration of the storage locker bins for accommodating the delivered articles, loading the delivered articles into the storage locker bins, notification of delivery of the delivered articles upon loading, and retrieval of the delivered articles by the recipients. A loading means can be used to load the delivered article into any randomly chosen storage locker bin having a capacity able to accommodate the delivered article. An association is made between an article identifier and an identifier of the storage locker bin (storage locker bin identifier).

The storage system can further include means for configuring a randomly chosen storage locker bin or a specific storage locker bin to accommodate a delivered article destined for the recipient. A loading means can be used for loading the article destined for the recipient into a randomly chosen storage locker bin. The loading means can include means to associate a storage locker bin identifier with an article identifier, means for notifying the recipient of the delivered article subsequent to loading, and means for permitting the recipient to retrieve the delivered article subsequent to loading.

Another embodiment of the invention provides a storage system for storing delivered articles. The storage system can include a storage machine unit with storage locker bins which randomly store a delivered article destined for a recipient and electronic circuitry for automatically triggering the dispatch of an electronic notification to the recipient of a delivered article subsequent to its loading.

A further embodiment of the invention provides a storage system for storing delivered articles. The system can include a storage machine unit with storage locker bins which randomly store a delivered article destined for a recipient, and an adjustment dividing mechanism of the storage locker bins that enables a storage locker bin to be configured into a quantity of storage locker bins of various dimensions.

Yet a further embodiment of the invention provides a storage system for storing delivered articles in which the system can include a storage machine unit having storage locker bins that are moveable about an axis to provide access to a particular storage locker bin during retrieval of the delivered article by a recipient. The storage locker bins of the storage system described as having moveable storage locker bins can randomly store delivered articles destined for recipients, and the movement of those storage locker bins can be vertical about the axis.

BRIEF DESCRIPTION OF THE DRAWINGS

There are presently shown in the drawings embodiments of which are presently preferred, it being understood, however, that the invention is not so limited to the precise arrangements and instrumentalities shown, wherein:

FIG. 10A depicts exemplary data tables and data views associated with the automated system of storage locker bins;

FIG. 10B is a continuation of the exemplary data tables and data views of FIG. 10A;

FIG. 10C is a continuation of the exemplary data tables and data views of FIG. 10B;

FIG. 10D is a continuation of the exemplary data tables and data views of FIG. 10C;

DETAILED DESCRIPTION OF THE INVENTION

The invention provides a storage system that can efficiently facilitate the storage and self-service retrieval of articles, which can includes packages. The storage system can be utilized in package delivery processes in which, packages can be transported in bulk to a destination centralized pickup location where they can be picked up by a recipient. The storage system includes a storage machine unit having moveable and/or stationary storage locker bins.

The storage system permits bulk delivered packages to be randomly loaded into any available movable or stationary storage locker bin within the storage machine unit. The random loading of packages into any available storage bin means that a recipient does not have a dedicated storage locker bin, which is typical of mailbox-type systems. The storage machine unit can have a set of bin doors corresponding to its moveable bins, which remain stationary as the moveable bins are moved to provide access to the moveable storage locker bins. The movement of the storage locker bins can include revolving about an axis and access to the storage locker bins can be provided whenever the storage locker bins are moved to a position in which the storage locker bins are aligned with and behind the stationary set of bin doors corresponding to the moveable bins. The storage locker bins can include an adjustment dividing mechanism that allows a storage locker bin to be configured into a number of storage locker bins of various dimensions. A storage machine unit can also be referred to as a SmartBin Unit (SBU). An automated system of storage locker bins can contain a plurality of SBUs which can be co-located and each SBU can contain a plurality of storage locker bins. The automated system of storage locker bins can also be referred to as a storage system for storing delivered articles.

Figure 1:
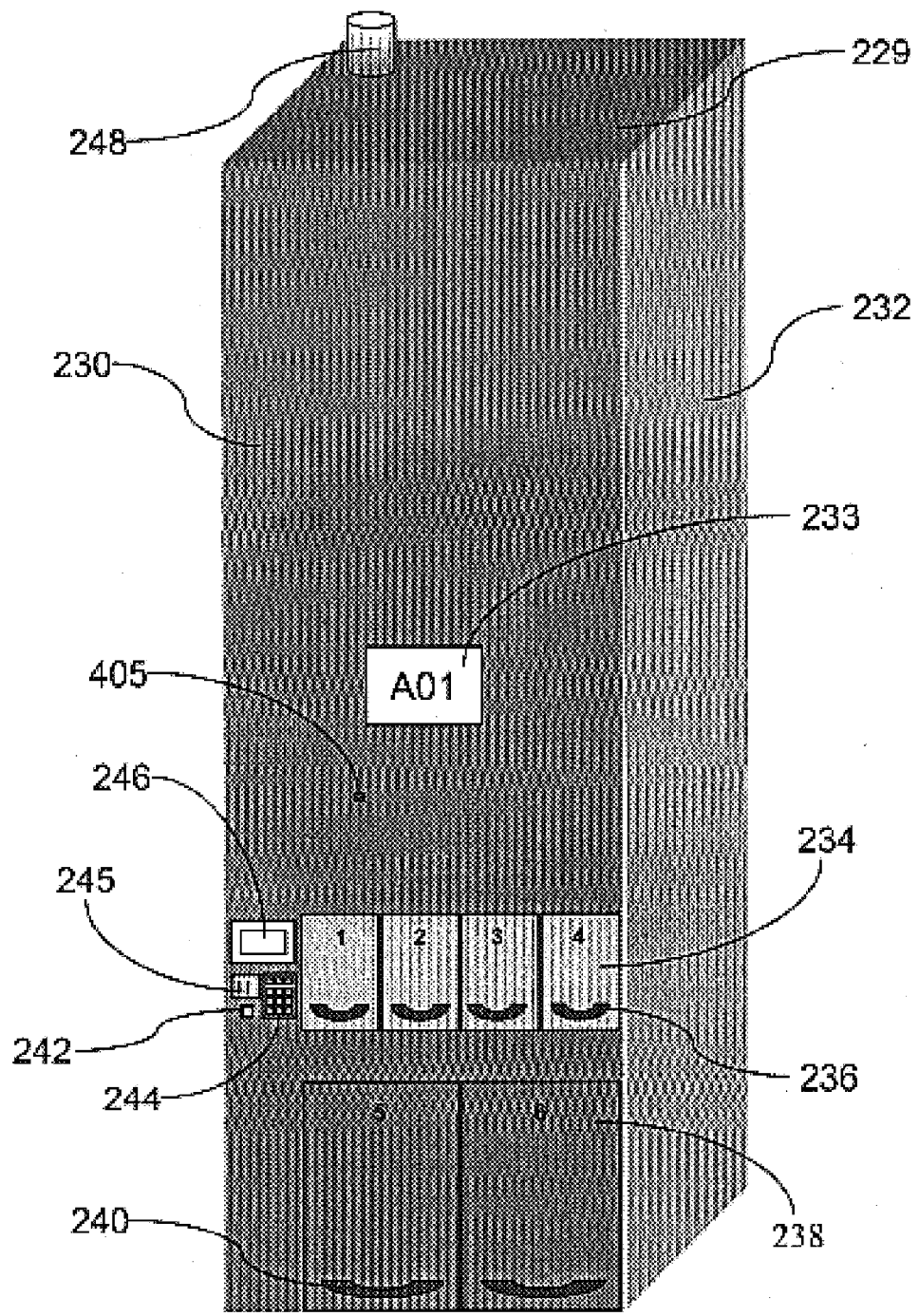
FIG. 1 is a diagram of an illustrative embodiment of the front exterior of an exemplary storage machine unit or SmartBin Unit (SBU) within an automated system of storage locker bins.

There is shown in FIG. 1 a diagram of an illustrative embodiment of a storage machine unit within the automated system of storage locker bins. The exemplary SBU can have a top exterior panel 229, a front exterior panel 230, and a side exterior panel 232. The exterior panels can be attached to a structural frame of the SBU.

Figure 2:
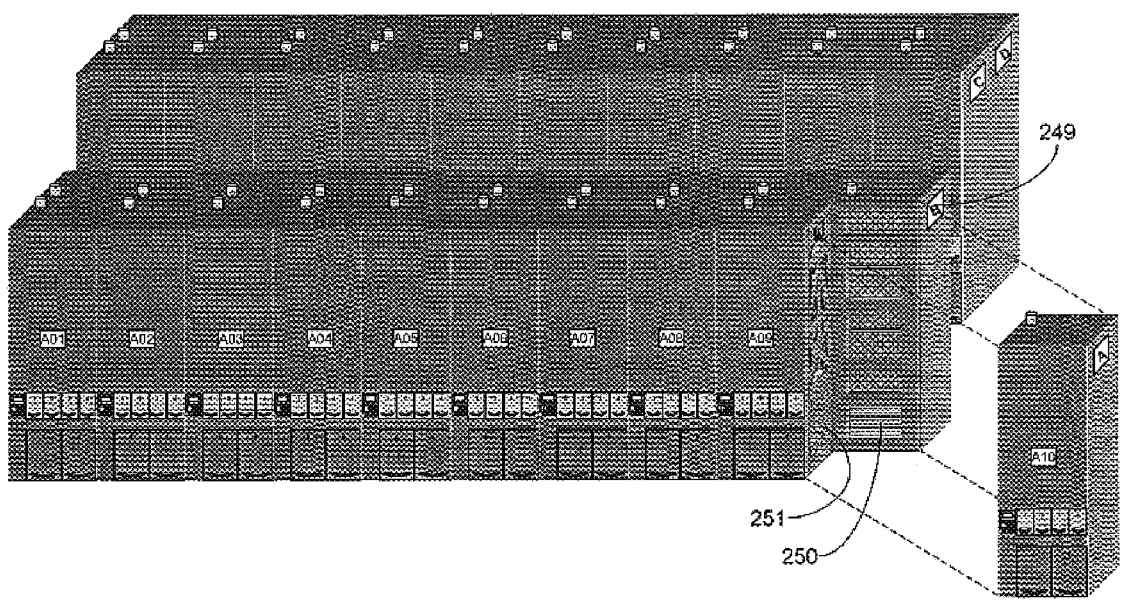
FIG. 2 is a diagram of an exemplary arrangement of SBUs within a centralized destination pickup location (CDC)

There is shown in FIG. 2 a diagram of an exemplary arrangement of several SBUs co-located, for example, within a centralized destination pickup location. Forty SBUs are arranged in four rows within the exemplary arrangement depicted. The rows of SBUs are grouped into back-to-back pairs with aisles on either side of the grouped rows, including an aisle in between the two groupings. The frames of adjacent SBUs can be attached together. The SBU at the end of the first row is shown extended away from its row to illustrate the composition of the SBUs within the grouped rows. The SBU located with its back side up against the one which has been extended away from the row can be constructed without a back exterior panel as shown in this example. Depending upon where an SBU fits within an arrangement of SBUs within a destination centralized pickup location (or customer distribution center (CDC)), it may not need one or more external panels attached to its structural frame. The SBU which has been extended away from its row can serve the purpose that a back external panel would serve for the SBU which its back side is against. Likewise, the SBU at the end of the second row can serve the purpose that a back external panel would serve for the extended SBU. Accordingly, all SBUs can have a front exterior panel 230 and a top exterior panel 229, but only SBUs located at the end of a row would need to have a side exterior 232 on their side not adjacent to another SBU. Locating SBUs in such an arrangement can reduce the cost of each SBU by not requiring exterior panels where SBU surfaces are adjacent other SBUs as well as being a slightly more space efficient arrangement. Of course SBUs can also be constructed with exterior panels on all sides if desired and a SBU can be used in a stand-alone fashion instead of in groups. While it may be unnecessary for a SBU to have a side exterior panel 232 or a back exterior panel, a stationary bin interior back panel 250 and stationary bin interior side panels 251 can be attached to the inside of the lower section of a SBU's structural frame to provide the interior walls of a SBU's stationary bin, along with a stationary bin interior top and bottom panel. There is also shown in FIG. 2 a SBU row identifier sign 249, which can be affixed, for example, on the outer side of a side exterior panel 232 of a SBU located at the end of a row of SBUs. The SBU row identifier sign 249 can be used to display an identifier of the row of SBUs within a CDC.

Referring back to FIG. 1, each SBU can have a SBU identifier label 233 and a SBU identifier barcode label 245. An identifier of the SBU can be written on the SBU identifier label 233 and the SBU identifer barcode label can contain the SBU's identifier in a format that can be optically read, such as a barcode. A storage machine unit identifier can be referred to as a SBU identifier (or SBU Id). Both labels can be affixed to the front exterior panel of the SBU 230. The front exterior panel 230 can contain several openings in which the features integral to the functions of a SBU can be housed. The features can include a scanner port 242, a keypad 244, a display screen 246, and two sets of bin doors. A set of revolving bin doors 234 that provide access to the revolving storage locker bins can be located above a set of stationary bin doors 238 that provide access to stationary storage locker bins, which can extend up from the bottom of the SBU. The location of the bin doors 238 with respect to bin doors 234 is not intended to be a limitation on the system. Each bin door can have a handle attached to it, for example, centered just above its lower edge. The revolving bin door handles 236 and/or stationary bin door handles 240 can alternatively be constructed as an indentation within the bin door, rather than an attachment made of additional material as shown in FIG. 1.

A bin door positioning slot 405 can be a small appendage attached or adjoined onto the exterior surface of the front exterior panel 230 of the SBU, a distance approximately the length of a revolving bin door 234 above one of the revolving bin doors 234. It can be affixed to the front exterior panel 230. The bin door positioning slot 405 can extend beyond the surface of the front exterior panel 230 forming a slot with at least an open bottom and one open side.

An exterior wiring duct 248 can be an opening in the top exterior panel 229 of the SBU to provide for the SBU's wiring to extend from the SBU to a power source and to a CDC processing server 450.

Figure 3:
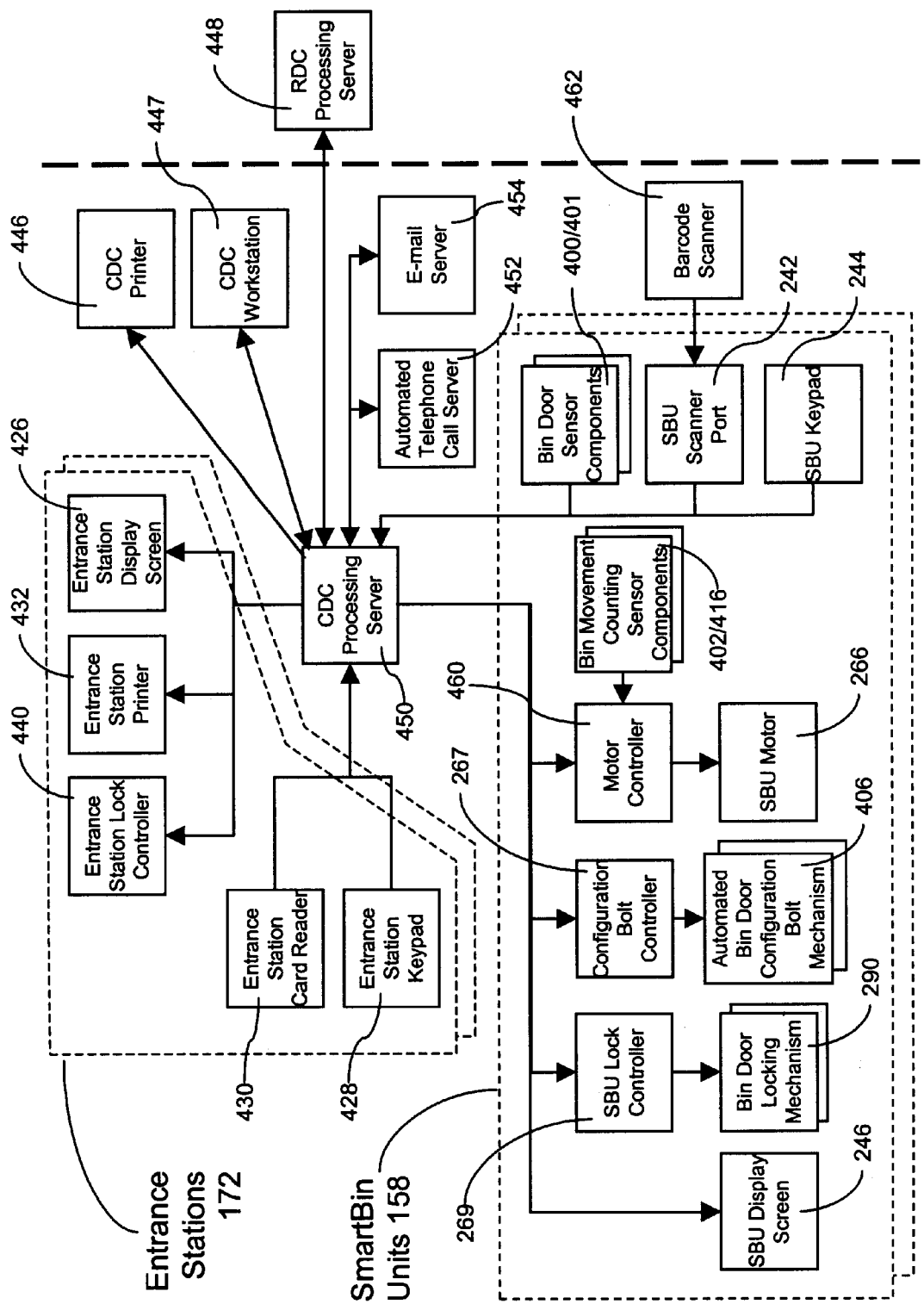
FIG. 3 is a diagram illustrating the networked electronic components of an exemplary automated system of storage locker bins.

Referring now to FIG. 3, there is shown an illustrative diagram of the networked electronic components within a CDC. The electronic components of a SBU 158 are shown grouped within a rectangle overlapping an offset rectangle behind it. This depicts that a plurality of SBUs 158 can be located within a CDC. Within the rectangle of the SBU 158, the components that can send signals and/or data from the SBU 158 to the CDC processing server 450 can include a SBU keypad 244, a SBU scanner port 242, and a plurality of bin door sensors (400 and 401). The SBU keypad 244 can contain function keys in addition to numeric keys. The function keys can be labeled with a descriptor of the function they perform. A barcode scanner 462 can send signals and/or data through the SBU scanner port 242 into which it can be connected to the CDC processing server 450. In another embodiment, a wireless barcode scanner can communicate directly with the CDC processing server 450 via a wireless network. In an embodiment featuring a wireless network, it is not necessary for SBUs to have a scanner port 242.

Other components within a SBU can receive signals and/or data from the CDC processing server 450, including a SBU display screen 246, a SBU lock controller 269, a configuration bolt controller 267, and a motor controller 460. In one embodiment the SBU display screen 246 can be a liquid crystal display (LCD) which displays information as controlled by programs of the automated system of storage locker bins running on the CDC processing server 450. In another embodiment the SBU display screen 246 can be a video monitor capable of displaying graphical user interface (GUI) screens and accepting touch-screen commands from users. In the embodiment featuring a touch-screen capable video monitor, the SBU keypad 244 may not be a necessary component of the SBU 158. The controller components can interpret commands from the CDC processing server 450 and send signals to other components of the SBU 158 to trigger their motion. For example, the motor controller 460 of a SBU 158, can interpret a command from the CDC processing server 450 to initiate a SBU motor 266 to run in one of the two directions in which it operates. The motor controller 460 can be built into a component which can contain the SBU motor 266, an electrically controlled brake for stopping its motion, and optionally one or more motor movement sensors which can be used to send feedback to the motor controller 460 indicating a number of revolutions that the motor 266 has performed. The composition and functions of the motor controller 460, the SBU motor 266, and the other components mentioned can be consistent with the state of the art for motors used to power electromechanical automated storage and retrieval machines, such as a vertical carousel or a vertical mechanical filing cabinet, in so much as the motor components of the current invention can interpret a command to move a specified distance in a specified direction. After receiving and interpreting a command from the CDC processing server 450 to run the motor in a specified direction, for a specified distance, the motor controller 460 can control the SBU motor 266 to initiate it to run in the specified direction and can engage the brake to stop the motor after it has moved the specified distance, for example, after the motor has moved a set of revolving bins to position one particular bin into a loading/unloading position.

Figure 3A:
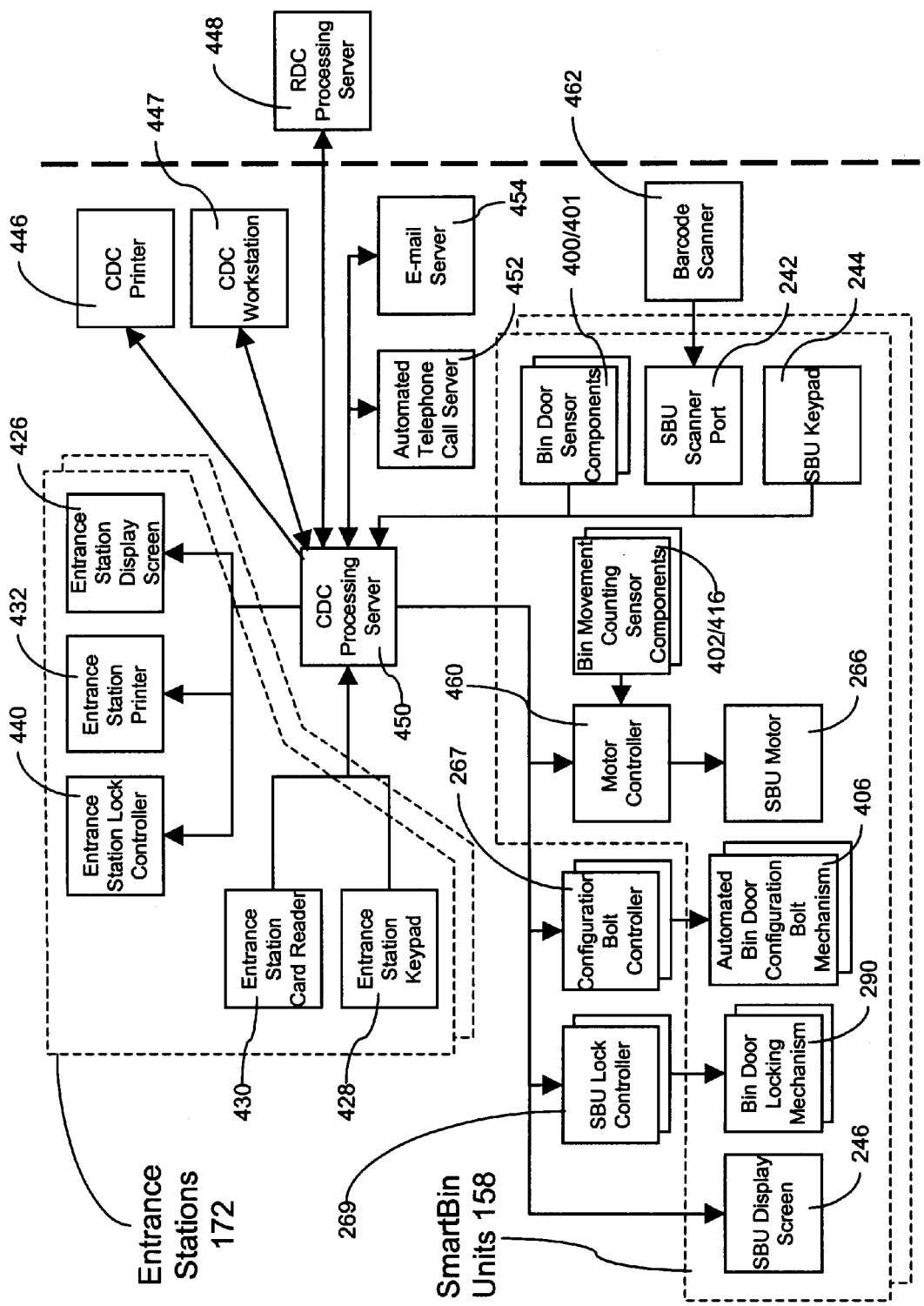
FIG. 3A is a diagram illustrating the networked electronic components of an alternate embodiment of the exemplary automated system of storage locker bins of FIG. 3.

A configuration bolt controller 267 can, for example, interpret a command from the CDC processing server 450 to move a configuration bolt, of a specified one of a plurality of automated bin door configuration bolt mechanisms 406 within a SBU 158, between one of its two possible positions—a consolidating position and a dividing position. After receiving and interpreting the command from the CDC processing server 450, the configuration bolt controller 267 can control the specified automated bin door configuration bolt mechanism 406 to move its configuration bolt from the consolidating position to the dividing position or vice versa. An SBU lock controller 269 can, for example, interpret a command from the CDC processing server 450 to unlock one specified bin door locking mechanism 290 of a plurality of bin door locking mechanisms 290 within a SBU 158. After receiving and interpreting the command from the CDC processing server 450, the SBU lock controller 269 can control the specified bin door locking mechanism 290 to unlock its associated bin door. In one embodiment a configuration bolt controller 267 and a SBU lock controller 269 can be located within a SBU 158 to control the automated bin door configuration bolt mechanisms 406 and bin door locking mechanisms 290 of that SBU 158, respectively. In other embodiments, such as one depicted in FIG. 3A, a configuration bolt controller 267 and a SBU lock controller 269 can be located separate from any one SBU 158 and can control the automated bin door configuration bolt mechanisms 406 and bin door locking mechanisms 290 of a group of SBUs 158, respectively, through for example, wired connections.

An automated telephone call server 452, an e-mail server 454, and a RDC processing server are depicted in FIG. 3. The call server 452 and e-mail server 454 can have bi-directional communications with the CDC processing server 450. The functions of both the automated telephone call server 452 and the e-mail server 454 can be triggered by programs running on the CDC processing server 450 and input information can be sent from the database of the automated system of storage locker bins residing on the CDC processing server 450 to the functions running on either the call server 452 or the e-mail server 454. The functions running on either the call server 452 or the e-mail server 454 can return output data back to the programs that triggered them. A CDC workstation 447 and a CDC printer 446 can be located, for example, in the backroom area of a CDC. The CDC workstation 447 can be used to initiate some of the programs of the automated system of storage locker bins, sending and receiving data to/from the CDC processing server 450. The CDC printer 446 can receive data from the CDC processing server 450, enabling it to print reports. In one embodiment, the CDC processing server 450, automated telephone call server 452, and e-mail server 454 can all be located within a CDC. In another embodiment, one or more of the servers can be located outside of the CDC, but can be networked to the SBUs 158, to the components of a plurality of entrance stations 172, and to each other. An example, of an embodiment in which the servers are not located within the CDC they serve can be one in which the CDC processing servers 450, automated telephone call servers 452, and/or e-mail servers 454 serving a group of CDC's within a local market are grouped within a data center to facilitate the sharing of support personnel and server capacity. In either embodiment, a RDC processing server 448 located outside the CDC can communicate with the CDC processing servers 450 of all the CDC's associated with it. There can be substantial interaction between a CDC processing server 450 and its associated SBUs 158, entrance stations 172, call server 452, and e-mail server 454 and a fast dedicated network can be used to ensure adequate levels of interaction between the networked components. Because there may only be limited communication between a CDC processing server 450 and a RDC processing server 448, such as for batch updates, file transfers, and data replication, a fast dedicated wide area network may be employed, but a dial-up connection between the CDC processing server 450 and the RDC processing server 448 may be sufficient.

Figure 4:
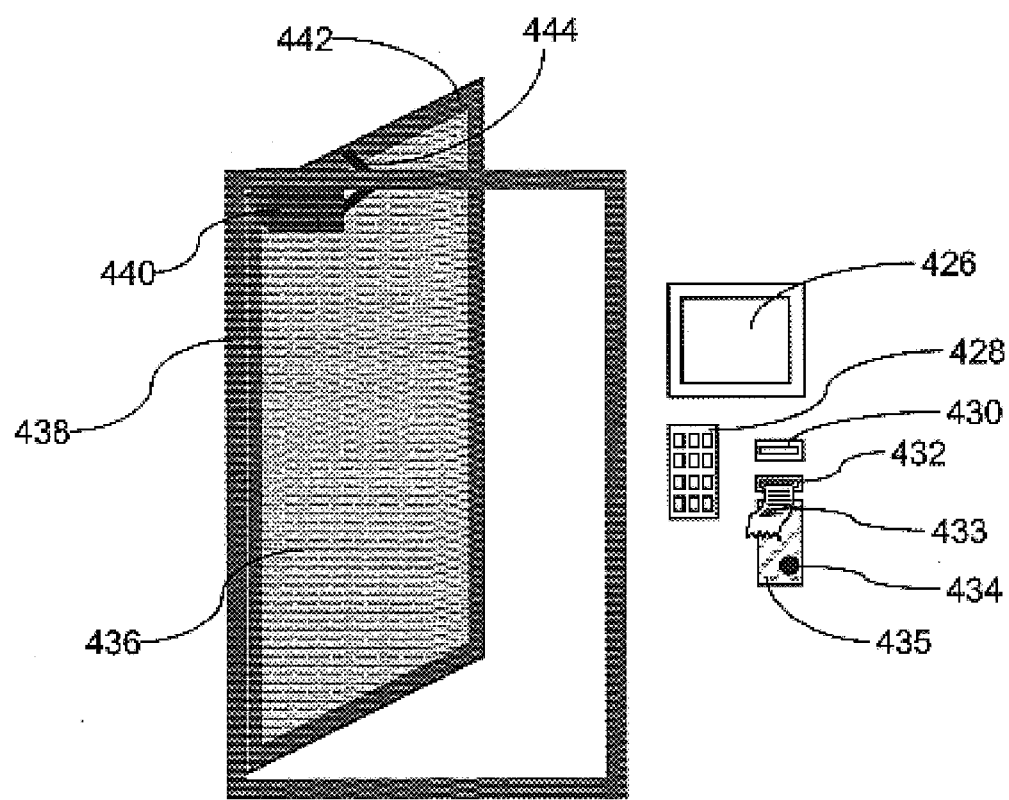
FIG. 4 is a diagram of an exemplary entrance station.

A plurality of entrance stations 172 is shown in FIG. 3 by a hexagon overlapping another offset hexagon. The components of each entrance station 172 can include an entrance station card reader 430 and an entrance station keypad 428 which can send data to the CDC processing server 450 and an entrance station lock controller 440, an entrance station printer 432, and an entrance station display screen 426 which can receive electronic signals and/or data from the CDC processing server 450. An illustrative embodiment of an exemplary entrance station 172 is shown in FIG. 4. Referring to FIG. 4, the entrance station 172 can include an entrance station display screen 426, key pad 428, card reader 430, and printer 432, which can be housed within a wall of an inner entranceway area of a CDC, with only their front surfaces extending beyond the wall. The printer 432 can be a tape printer, for example, and it can have a printer refill door 435 located below it. The printer refill door 435 can have a cam lock 434, and it can be hinged to a printer refill compartment embedded within the wall. The printer refill compartment (not shown) can contain one or more rolls of printer tape loaded in the printer 432, and it can provide access for a worker to replace a toner cartridge or ink ribbon. A report 433 is shown hanging out of the paper output opening of the printer 432. The entrance station display screen 426 can be a LCD or a CRT video monitor, the latter having a touch screen display with data entry capability. The CRT video monitor can serve the function of the entrance station keypad 428. The entrance station keypad 428 can contain function keys in addition to alphanumeric keys. The function keys of the entrance station keypad 428 can be labeled with a descriptor of the function they perform. The card reader 430 shown can be one in which a card is inserted and is returned by a motor component of the card reader 430, but a card reader 430 in which a card can be swiped through the reader can also be used without departing from the spirit of the invention.

The door of an entrance station 172 can be an electronically controlled automatic opening door that swings inward after successful validation of a PIN entered on the keypad 428 with a recipient identifier read from an access card inserted in the card reader 430. An entrance station door can also be the type of automatic door that opens by sliding into a cavity within one side of the doorframe. Either style can function consistent with the objectives of the current embodiment of the invention as long as it is activated by an entrance station lock controller 440 when triggered by the CDC processing server 450 after a successful validation of a PIN and access card. Alternately, the door at an entrance station can be either style of automatically opening door that can be triggered by a motion/proximity sensor similar to an entrance door at a supermarket, without any validation being performed. The components of the door shown in the entrance station 172 of FIG. 4 can include a glass pane 436 enclosed within a glass pane frame 442, movable within a door frame 438. The entrance station lock controller 440 has an attached door opener component 444 which can open the door when activated by the lock controller 440 and which prevents the door from being opened when it is not activated. The lock controller 440 can control the door opener 444 to automatically return to the closed (locked) position after a determined interval of time after it was activated.

Figure 5:
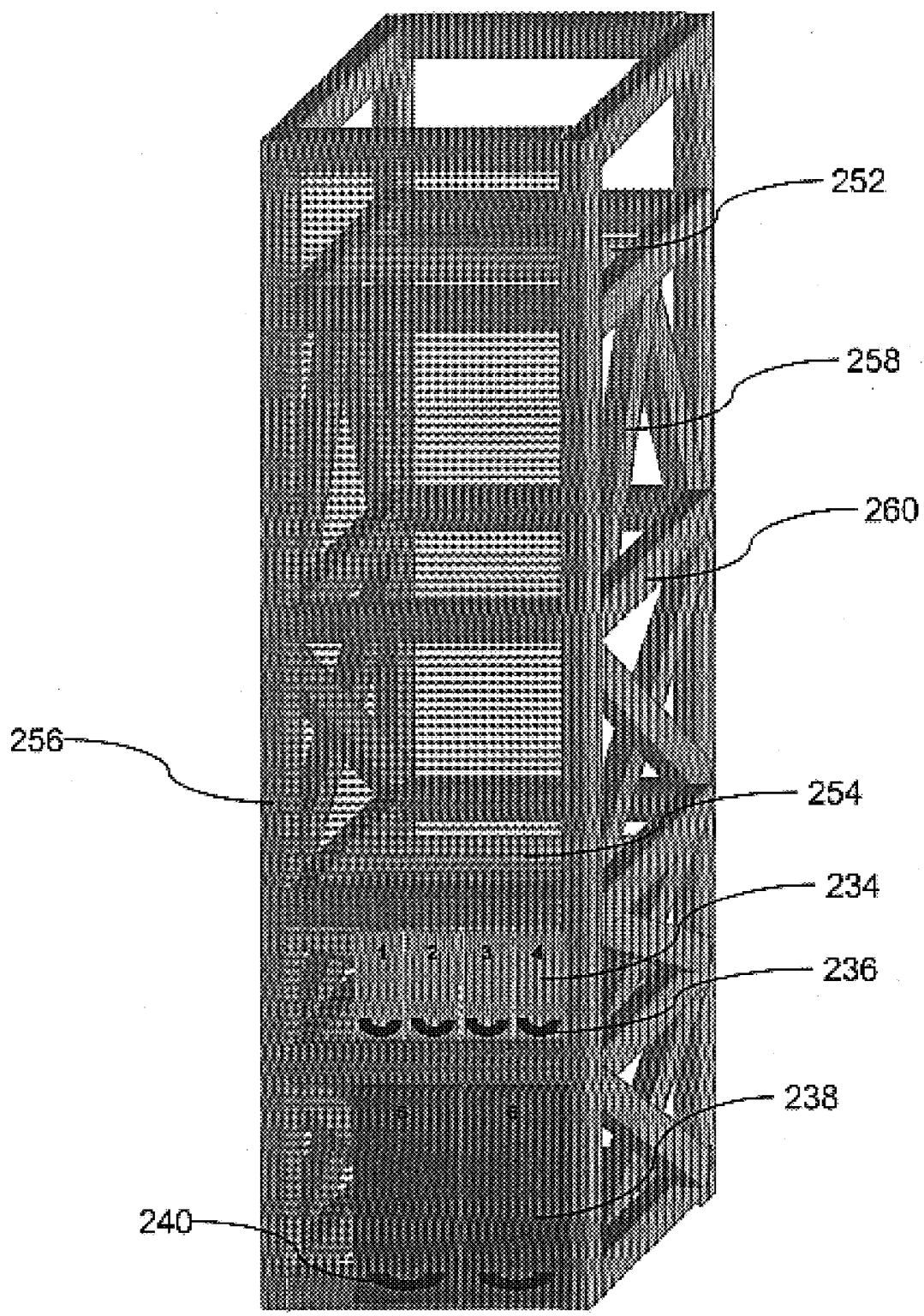
FIG. 5 is an exemplary structural frame of the SBU of FIG. 1.

An exemplary structural frame of an SBU 158 is shown in FIG. 5. Other designs for a structural frame are also possible. The structural frame of a SBU can comprise, for example, four vertical corner support beams 256—one at each corner of the SBU. Horizontal cross support beams 260 can run between the vertical support beams connecting the corner beams into a rectangle at the bottom, top, and at different heights throughout the structure. The structural frame of the SBU can be viewed as being divided into several vertical structural sections formed by the perpendicular intersections of the cross support beams 260 and the corner support beams 256. Because both the upper 252 and lower 254 support shafts can each run horizontally between a set of parallel cross support beams 260 which can run from the front corner support beams 256 to the back corner support beams 256, the sections of the structural frame, on both the left and right sides of the SBU, below the cross support beams 260 onto which the upper support shaft 252 can be mounted, can support the weight of all of the revolving bins and the articles contained therein. To provide additional support for the cross support beams 260 of the upper support shaft 252, each of the structural sections below those cross beams (on both of the sides of the SBU) can contain opposing angled sectional support beams 258, for example, forming an inverted "V" with the point of the "V" being located directly underneath the point in the cross support beam 260 of the upper support shaft 252 where the upper support shaft 252 can be mounted, and the ends of the "V" intersecting the points where the cross support beam 260 forming the bottom of that structural section can intersect the corner support beams 256 which form the sides of that structural section. The cross support beam 260 which formed the bottom of that structural section immediately supporting the upper support shaft 252 can be further supported, for example, by a set of opposing angled sectional support beams 258 running from the top corner to the opposite lower corner of their structural section intersecting each other to form an "X". Each structural section below the "V" section can contain angled sectional support beams 258 in an "X" formation to provide support from the ground up to the cross support beam 260 of the upper support shaft 252. The structural sections forming the front and back sides of the SBU 158 do not need to contain angled sectional support beams 258 as they can have a much more indirect role in supporting the weight of the revolving bins. Other support structures are possible without departing from the spirit of the invention.

In other embodiments, the upper support shaft 252 can be indirectly supported by a combination of additional support beams running directly underneath the upper support shaft 252 on the same vertical plane as the upper support shaft 252. The series of additional support beams of the other embodiments can consist of one or more support beams running perpendicular, parallel, and/or at an angle to the upper support shaft 252. The additional support beams of the other embodiments can be connected at their lowest point to cross support beams 260 on the sides of the SBU 158, located some distance below and running parallel to the cross support beams 260 of the upper support shaft 252. The additional support beams of the other embodiments can indirectly support the upper support shaft 252 by relieving the weight of the revolving bins weighing on the upper support shaft 252, by providing a tubular-shaped support component around, for example an upper spindle (262 as shown in FIGS. 6 & 7).

Figure 6:
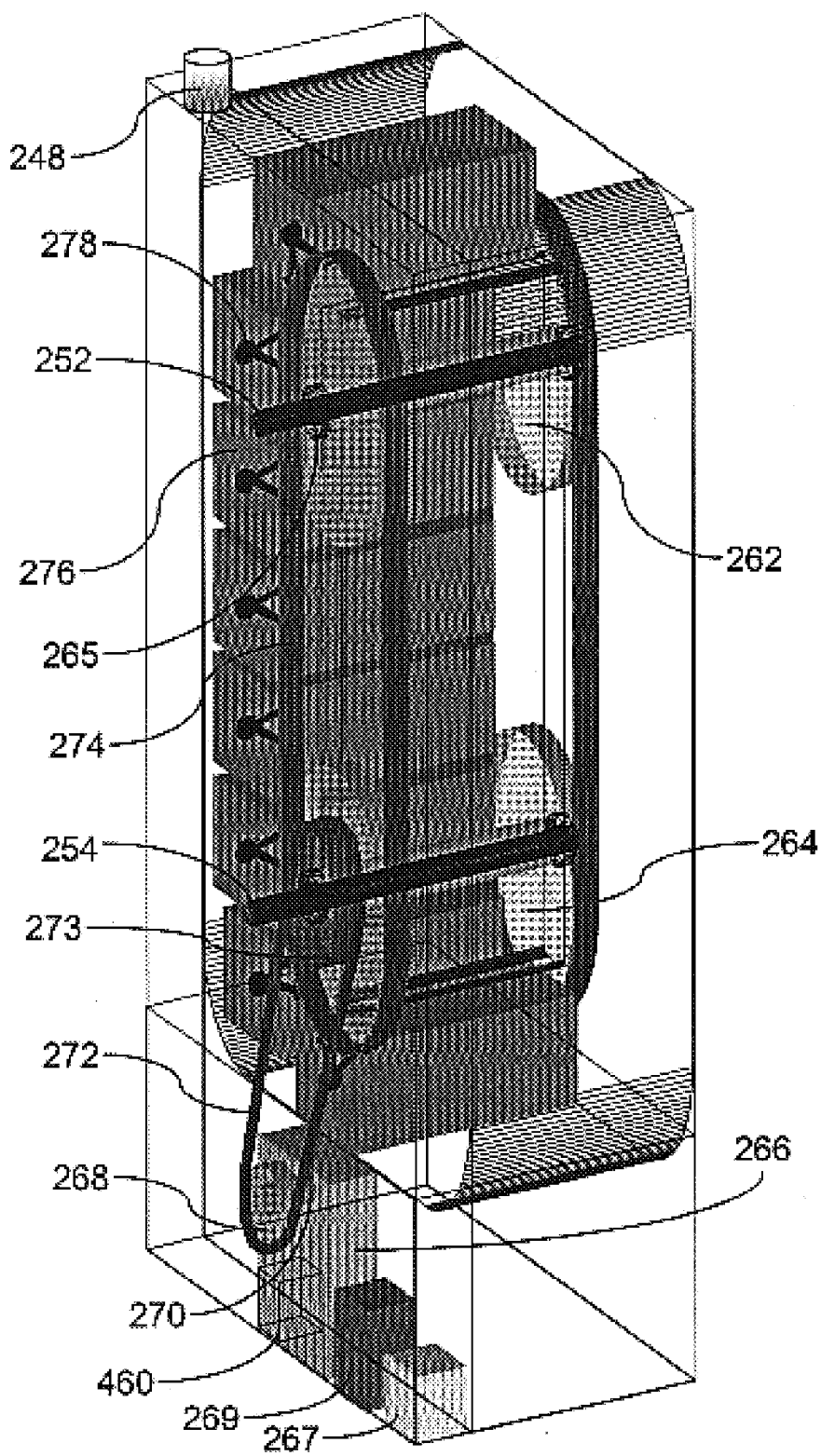
FIG. 6 is a diagram of a partial cut-away view of the interior components of the SBU of FIG. 1.
Figure 7:
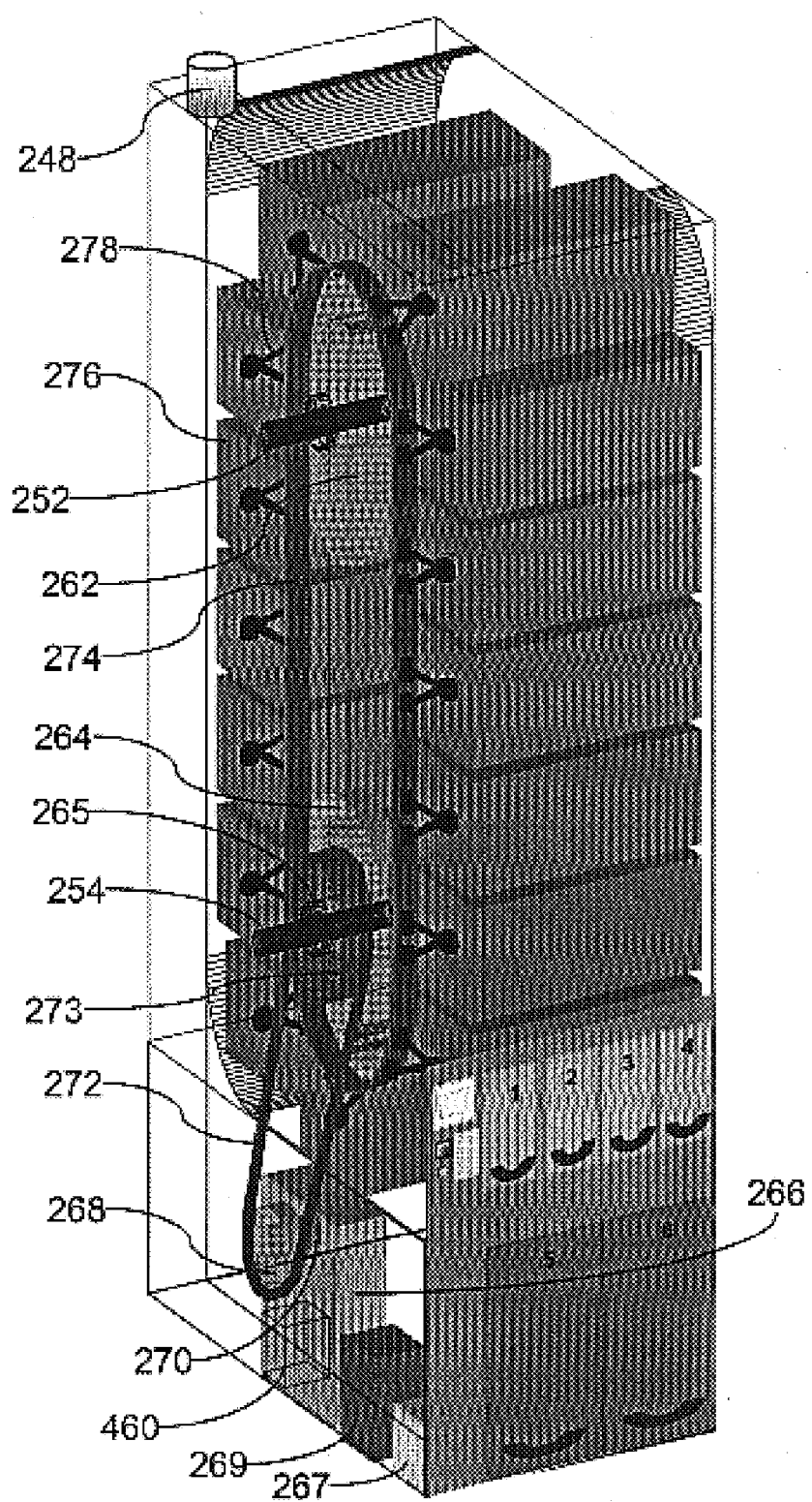
FIG. 7 is a diagram illustrating the interior components of the SBU of FIG. 1.

There is shown in both FIG. 6 and FIG. 7 the interior components of a SBU 158. To allow for a better view of the SBU components involved in moving the revolving bins, the SBU 158 in FIG. 6 is shown without any exterior panels and without a number of revolving bins that would be located in the front half of the SBU 158. FIG. 7 shows a similar view of the SBU 158, but includes a full set of revolving bins and a partial cutaway view of the lower section of the front exterior panel 230, including the SBU components located there. An upper spindle 262 and a lower spindle 264 can each be formed, for example, by two sprockets connected to each other by a hollow shaft. Each of the sprockets comprising the spindles (262 and 264) can have a hole in its center, measuring the same diameter as the opening of the hollow shaft. The upper spindle 262 can be fitted around the upper support shaft 252 and the lower spindle 264 can be fitted around the lower support shaft 254. The surfaces between the support shafts (252 and 254) and the spindles (262 and 264) can be lubricated to reduce friction and enable the spindles (262 and 264) to revolve around the support shafts (252 and 254) with only minimal resistance. A bin drive sprocket 273 can be adjoined, for example, to the left sprocket of the lower spindle 264. The bin drive sprocket 273 can have a different diameter than the spindle sprocket to which it is adjoined, but the bin drive sprocket 273 can have a hole in its center, measuring the same diameter as the hole in the center of its adjoined spindle sprocket. The spindles (262 and 264) can be fixed from moving in a lateral direction upon their respective support shafts (252 and 254)

by shaft collars 265 which can be secured to the support shafts (252 and 254) just outside the outer edge of each spindle sprocket just outside the outer edge of the bin drive sprocket 273 for the spindle sprocket having the adjoined bin drive sprocket 273).

A first bin drive chain 274 can be fitted around the sprockets on one side of the upper 262 and lower 264 spindles in a closed-loop. A second bin drive chain 274 can be fitted around the sprockets of the other side of the spindles (262 and 264) in a closed-loop. The two bin drive chains 274 can have a parallel orientation to each other and can function to rotate the upper spindle 262 when the lower spindle 264 rotates, thereby enabling the two spindles (262 and 264) to be rotated in a synchronized manner with respect to both speed and direction. A motor drive chain 272 can be fitted around a motor drive sprocket 268 and the bin drive sprocket 273 in a closed-loop. The motor drive sprocket 268 can be adjoined to a motor shaft 270 which can be a rotating component of a SBU motor 266. The motor shaft 270 can extend from the SBU motor 266 and can function to rotate in either a clockwise or a counter-clockwise direction when powered by the SBU motor 266. The motor controller 460 can be housed with the SBU motor 266 and can function to initiate the SBU motor 266 to rotate the motor shaft 270 and its adjoined motor drive sprocket 268 in either a clockwise or a counter-clockwise direction. When the motor drive sprocket 268 is rotated in one direction it can cause the motor drive chain 272 to revolve around the motor drive sprocket 268 and the bin drive sprocket 273, causing the bin drive sprocket 273 to rotate in the same direction. The rotation of the bin drive sprocket 273 can cause the lower spindle to rotate in the same direction, thereby causing the bin drive chain 274 to rotate around the sprockets of the upper 262 and lower 264 spindles. A bin bracket 278 can be connected to a revolving master bin 276 and can also be mounted onto a bin drive chain 274, for example, at two points. A set of bin brackets 278 located in parallel to each other on each side of a revolving master bin 276 can function to suspend the revolving master bin 276 from the two bin drive chains 274, thereby causing the revolving master bin 276 to revolve around the upper 262 and lower 264 spindles within the SBU 158. The motor controller 460 can also function to stop the SBU motor 266 and activate a brake (not shown separately from the motor) to stop the movement of the SBU motor 266 with the level of precision commonly found in the state of the art of motor driven positioning systems. When the motion of the SBU motor 266 is stopped, the movement of the motor shaft 270 and all the sprockets and drive chains of the bin movement system of the SBU 158 can be stopped. A desired speed and precision of movement of the revolving bins 276 can be achieved by using a different combination of sizes of the bin drive sprocket 273 and the motor drive sprocket 268 and by gearing down the SBU motor 266.

The composition of the exemplary SBU 158 of FIG. 6 and FIG. 7 demonstrates a set of revolving bins 276 which can be moved about an axis having a vertical orientation, but it should be understood that other embodiments of a SBU 158 can be possible consistent with the invention, in which other arrangements of moving bins can be possible. The other arrangements of moving bins in the other embodiments of a SBU 158 can include, but are not limited to horizontally moving bins, bins moving about an axis having an angular orientation, and combinations of either or both of these with bins moving about a vertical axis. In addition to other embodiments in which bins can revolve about axis's having different orientations, another embodiment can have moving bins that can rotate about an axis instead of revolving about an axis, wherein the orientation of each moving bin can change as it can be rotated about an axis. For example, a set of rotating bins could be attached to a bin drive chain in a fixed manner and the bins could be right-side up when moving up or down the front side of a vertical axis and upside-down when moving up or down the back side of the vertical axis.

In the embodiment depicted in FIG. 6 and FIG. 7, a configuration bolt controller 267 and a SBU lock controller 269 can also be located within the SBU 158 and can be wired to the plurality of automated bin door configuration bolt mechanisms (not shown in FIG. 6 or FIG. 7) and bin door locking mechanisms (not shown in FIG. 6 or FIG. 7) located within the SBU 158 respectively. The wiring (not shown) connecting the motor controller 460, the configuration bolt controller 267, and the SBU lock controller 269 to the CDC processing server 450 can be bundled together and can run up the inside of the SBU 158, for example, fastened to the back left corner support beam (not shown in FIG. 6 or FIG. 7), to extend out of the SBU 158 through the exterior wiring duct 248. The wiring supplying power to the components of a SBU 158 can also be configured to follow the same path up to the exterior wiring duct 248 as the wiring connecting the components to the CDC processing server 450. The wiring arrangement shown is not intended to limit the invention and other arrangements are possible.

Figure 8:
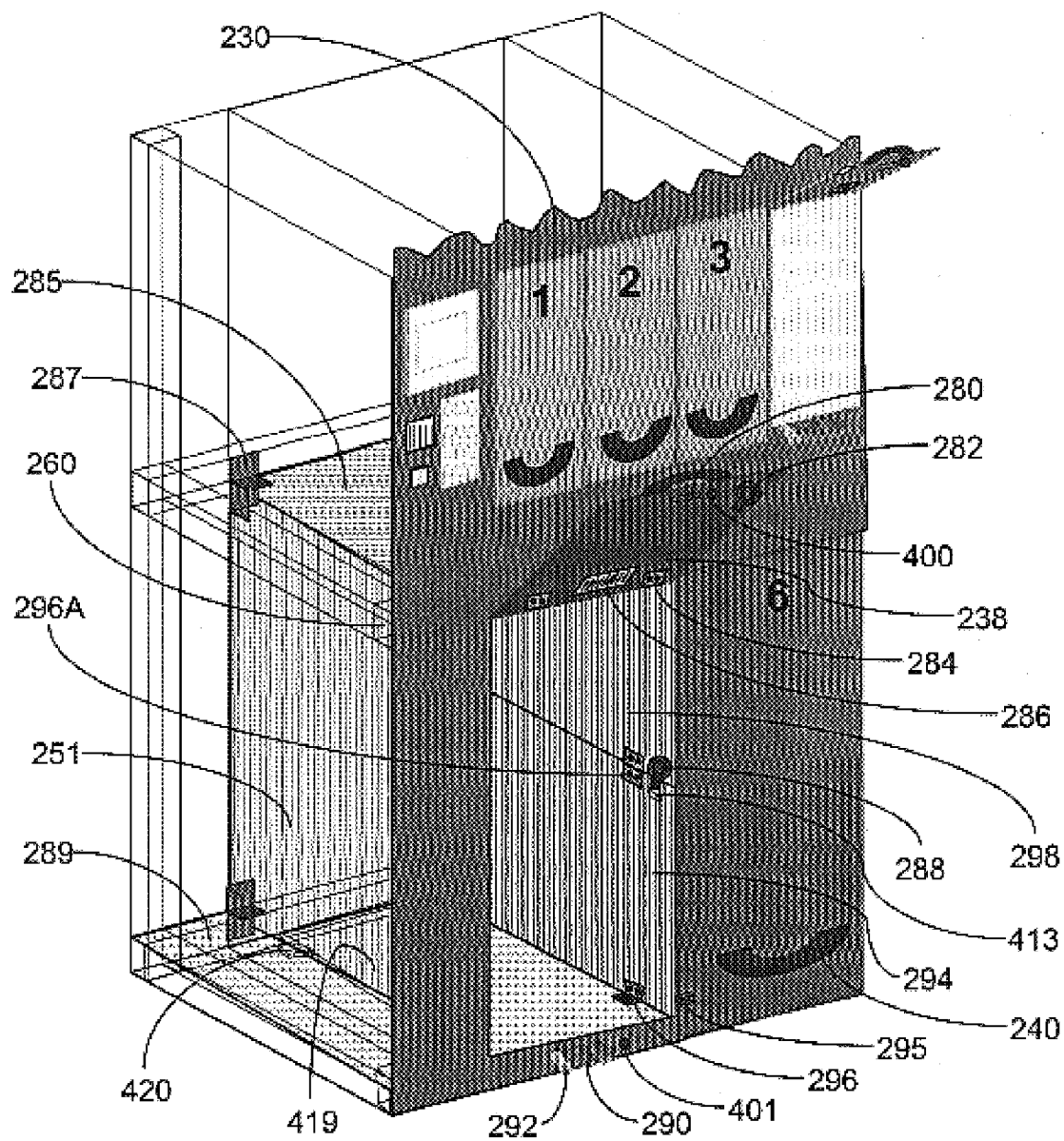
FIG. 8 is diagram of a stationary bin of the SBU of FIG. 1.

The components of an exemplary stationary bin of the SBU of FIG. 1 are shown in FIG. 8. Referring to FIG. 8, the SBU 158 can have two stationary bin doors 238—a left door and a right door. The left stationary bin door 238 is shown open and raised above the opening of the stationary bin, while the right stationary bin door 238 is shown closed against the SBU frame. A stationary bin door handle 240 can be attached near the lower edge on the outside surface of a stationary bin door 238. A stationary bin door 238 can either be attached to the cross support beam 260 which runs across the front of the SBU 158, just above the stationary bin or to the front exterior panel 230 by a set of bin door hinges 284. A bin door identifier label 286 can be affixed to the inside surface of the stationary bin door 238 and a bin door catch slot 280 can be an opening cut into the inside surface of the stationary bin door 238, centered just above the stationary bin door's 238 bottom edge. A bin door configuration cam 282 can be located on the inside surface of the stationary bin door 238 near the door's side edge. The bin door configuration cam 282 can be used to attach the stationary bin door 238 to an adjacent stationary bin door 238 by sliding its cam bolt into a bin door configuration cam slot 295 built into the side of the adjacent stationary bin door 238. The bin door configuration cam 282 can be located, for example, on the right side of a first stationary bin door 238 and its corresponding bin door configuration cam slot 295 can be located on the left side of a second stationary bin door 238 adjacent to the first stationary bin door 238 on its right side. A door component of a bin door sensor 400 can be built into each stationary bin door 238 near its bottom edge, for example, having a surface exposed through an opening on the inside surface of the bin door 238. In one embodiment of a SBU 158, a frame component of a bin door sensor 401 can be located below the stationary bin opening, for example, built into the SBU frame, facing outward from the front of the lowest cross support beam 260 at the bottom of the SBU, at the location where the area of the stationary bin door 238 containing the door component of the bin door sensor 400 can rest when the stationary bin door 238 is closed. A bin door locking mechanism 290 and a bin door opening mechanism 292 can also be built into the same cross support beam 260 as the frame component of the bin door sensor 401. The front exterior panel 230 can have openings to allow, for example, the bin door locking mechanism 290 and bin door opening mechanism 292 to extend out beyond the front surface of the front exterior panel 230, and to allow the frame component of the bin door sensor 401 to be exposed through the front exterior panel 230.

Figure 9:
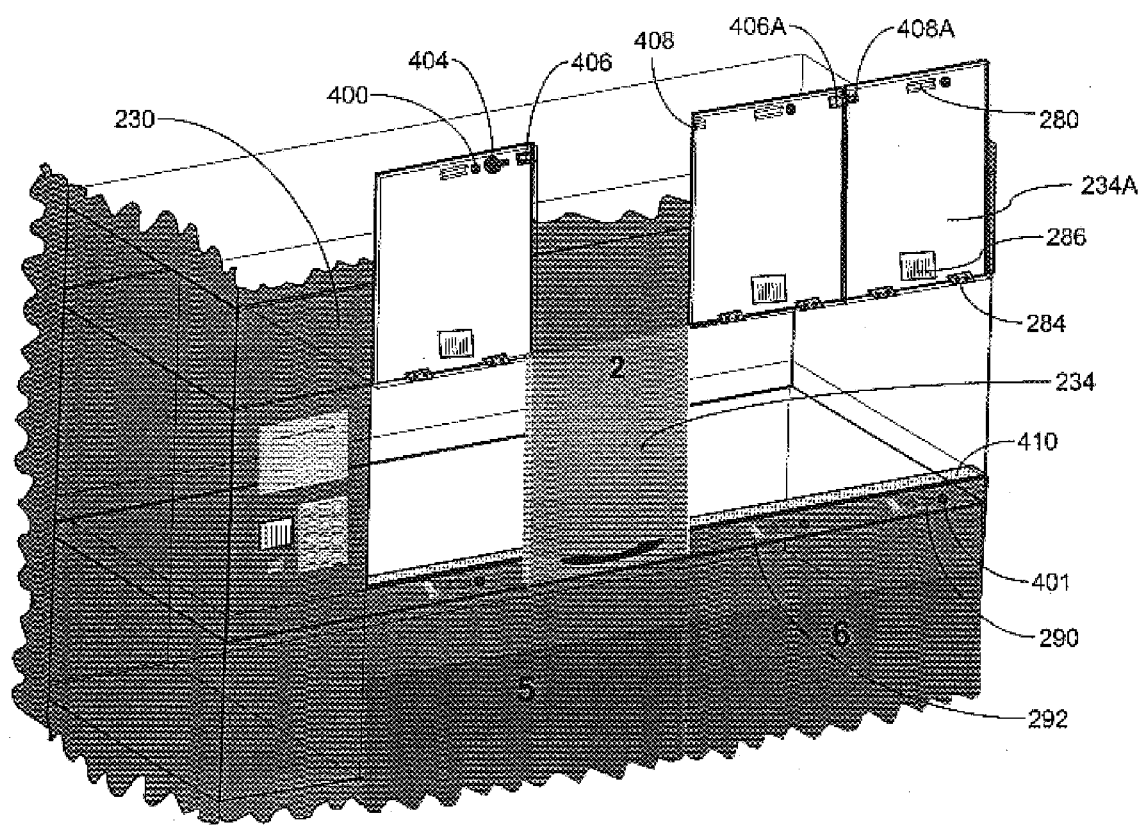
FIG. 9 is a diagram illustrating the revolving bin doors of the SBU of FIG. 1.

In another embodiment, the lowest front cross support beam 260 can be recessed back from the front of the SBU and the bin frame sensor 401, bin door locking mechanism 290, and bin door opening mechanism 292 of a stationary bin door 238 can be located in front of the recessed cross support beam 260, for example in a bin door frame component housing (not shown for a stationary bin in FIG. 8, but shown as 410 for a revolving bin in FIG. 9). The bottom-front cross support beam 260 can be recessed a short distance from the front edge of the SBU 158 and adjoined to the lowest left and right side cross support beams 260 instead of being adjoined to the inside surfaces of the left-front and right-front corner support beams 256. In the embodiment having the recessed bottom front cross support beam 260, the bin door frame component housing in which the frame component of the bin door sensor 401, the bin door locking mechanism 290, and the bin door opening mechanism 292 can be located, can be located behind the front exterior panel 230 and the components (401, 290, and 292) can extend or be exposed through the front exterior panel 230. In either embodiment, a stationary bin bottom panel 289 can be attached to the top surface of the bottom-front cross support beam 260 with the front edge of the stationary bin bottom panel 289 aligned up against the front exterior panel 230 where the opening for the stationary master bin can be cut away from the front exterior panel 230. The wiring connecting the frame component of the bin door sensor 401 and the bin door locking mechanism 290 to the CDC processing server 450 and SBU lock controller 269 respectively, can run through the bin door frame component housing, which can be located between the recessed front cross support beam 260 and the front exterior panel 230, to the side of the SBU where the SBU lock controller 269 and the exterior wiring duct 248 can be located. In the embodiment in which the components can be built into the bottom-front cross support beam 260, the wiring can run through a conduit built into the bottom-front cross support beam 260. Other wiring arrangements are also possible without departing from the spirit of the invention.

The stationary bin bottom panel 289 can stretch across the area of the bottom of the SBU 158, attached to the top surface of the bottom-front and bottom-back cross support beams 260 to reach up against the side of each of the corner support beams 256. One or more additional support components (not shown) measuring the same height as the cross support beams 260, for example, a metal pipe formed in the shape of an oval can be located underneath the stationary bin bottom panel 289 to provide additional support for the stationary bin bottom panel 289 in its effort to hold the weight of large, bulky articles. Additional support components underneath the stationary bin bottom panel 289 can be optional as they may not be necessary depending upon the height of the cross support beams 260, the thickness, density, and surface area of the stationary bin bottom panel 289, and the maximum weight of articles expected to be placed in the stationary bin. The stationary bin bottom panel 289 can be attached to the cross support beams 260 and/or to other stationary bin panels by fasteners (not shown) and/or stationary bin corner brackets 287.

A stationary bin configuration dividing panel (CDP) (294 and 298) can be attached to the stationary bin bottom panel 289 by a first set of CDP hinges 296 (only one CDP hinge 296 of the first set of, for example, two CDP hinges 296 can be seen in the exemplary SBU 158 of FIG. 8). A CDP (294 and 298) can be an adjustment dividing mechanism used to configure a master bin of a SBU (either a stationary or a revolving master bin 276). The stationary bin CDP (294 and 298) can be constructed, for example, as two panel sections hinged together by a second set of CDP hinges 296A—a lower panel section 294 and an upper panel section 298 (only one CDP hinge 296A of the second set of, for example, two CDP hinges 296A can be seen in the exemplary SBU 158 of FIG. 8). The exemplary SBU 158 shown in FIG. 8 can have one CDP (294 and 298) built into its one stationary master bin, with the CDP (294 and 298) shown locked into a dividing position. A CDP cam lock 288 can be a key operated mechanism in which a cam bolt can be moved between at least two different positions by turning the key. A CDP dividing slot 413 can be an opening in the side of the lower panel section of the CDP 294. A set of CDP cam locks 288, which can be built into the side of the upper panel section of a CDP 298, can be locked into a set of corresponding CDP dividing slots 413 located opposite the CDP cam locks 288 (only one CDP cam lock 288 and CDP dividing slot 413 of each set can be seen in the exemplary SBU 158 of FIG. 8). Another set of CDP cam locks 288 (not shown in FIG. 8) can be built into the other side of the upper panel section of a CDP 298 and can be locked into a set of corresponding bin panel dividing slots (not shown in FIG. 8, but shown similarly as 412 in FIG. 12 in describing CDP related components of a revolving bin) which can be openings in the top panel of the stationary bin 285. When a stationary bin CDP is positioned in a consolidating position (not shown in FIG. 8) both sets of CDP cam locks 288 can be locked into bin panel consolidating slots 420 (only one consolidating slot 420 of one set of consolidating slots 420 can be seen in the exemplary SBU 158 of FIG. 8) to secure the two sections of the stationary bin CDP (294 and 298) into a recessed CDP holding region 419 within the stationary bin bottom panel 289.

The stationary bin top panel 285 can be attached to the bottom surface of the next highest set of front and back cross support beams 260 located above the aforementioned bottom-front and bottom-back cross support beams 260. The stationary bin top panel 285 can be attached to the cross support beams 260 and/or to other stationary bin panels by fasteners and/or stationary bin corner brackets 287. The stationary bin top panel 285 can measure the same depth front-to-back as the bottom stationary bin panel 289, but it can be shorter in width from side-to-side, stretching for example, from the inside edge of the cross support beams on the right side of the SBU structural frame to right edge of the front exterior panel 230 where the opening, for the stationary bins, in the front of the SBU 158 ends. A stationary bin back panel (not shown in FIG. 8, but shown as 250 in FIG. 2) can be attached to the cross support beams 260 at the back of the SBU 158 to which the top 285 and bottom 289 stationary bin panels can be attached, to the back-right corner support beam 256, and/or to the other stationary bin panels by fasteners and/or stationary bin corner brackets 287. A first stationary bin side panel 251 forming the left side of the stationary master bin can be attached to the cross support beams 260 to which the top 285 and bottom 289 stationary bin panels can be attached, at both the front and back of the SBU 158, and/or to the other stationary bin panels by fasteners and/or stationary bin corner brackets 287. A second stationary bin side panel (not shown) forming the right side of the stationary master bin can be attached, for example, to different support beams (260 and 256)—the bottom-right cross support beam 260, the next highest cross support beam 260 above the bottom-right one, and the front-right and back-right corner support beams 256—and/or to the other stationary bin panels by fasteners and/or stationary bin corner brackets 287.

The stationary bin corner brackets 287 can have different sections that can be attached to the stationary bin panels and/or the support beams (260 and/or 256). The sections of the stationary bin corner brackets 287 can be adjoined to each other perpendicularly and each section can have at least one hole through which a fastener can be used to attach the corner bracket 287 to either a support beam and/or a stationary bin panel. Each corner bracket 287 can be shaped differently depending upon which stationary bin panels it is attaching to which support beams. The corner brackets 287 which can be attached to the front cross support beams 260 can be shaped in such a way as to not have any of their sections extending behind where the stationary bin doors 238 fall against the frame of the SBU 158, including for example, having one or more sections less than the corner brackets 287 which can be attached to the back cross support beams 260.

A compartment for housing components of the SBU 158 such as the SBU motor 266, motor controller 460, configuration bolt controller 267, and SBU lock controller 269 (shown in FIG. 6 and FIG. 7), can be formed between the left stationary bin side panel 251 and either a left side exterior panel 232 or the frame of another SBU 158 adjacent to the left of the current SBU 158. Alternately, one or more additional cross support beams (not shown) can be adjoined or attached between the bottom-front and the bottom-back cross support beams 260 and/or the next highest set of front and back cross support beams 260 above the bottom set, for example, at the point where the stationary bin ends and the compartment for housing the aforementioned components of the SBU 158 begins. The additional cross support beams of this alternative can provide support for the left stationary bin panel 251 in addition to the support that can be provided by the stationary bin corner brackets 287.

The SBU shown in the exemplary embodiment of FIG. 8 has one stationary bin CDP (294 and 298) attached to the stationary bin bottom panel 289 at the center point between the two stationary bin side panels 251, but in other embodiments more than one stationary bin CDP (294 and 298) can be used to divide a stationary bin. In still another embodiment, one or more stationary bin CDP's (294 and 298) can be attached to the stationary bin top panel 285 in a similar manner as described for attaching a CDP to the stationary bin bottom panel 289, for example: a first set of CDP hinges 296 can be used to attach the upper panel section of the CDP 298 to the stationary bin top panel 285; a second set of CDP hinges 296 can be used to attach the upper panel section 298 to the lower panel section 294 of the CDP; CDP dividing slots 413 can be located in the sides of the upper panel section 298 of the CDP; CDP cam locks 288 can be built into the sides of the lower panel section of the CDP 294; bin panel dividing slots can be located in the stationary bin bottom panel 289; and bin panel consolidating slots 420 can be located in a recessed CDP holding region 419 which can be located in the stationary bin top panel 285. The CDP (294 and 298) attached to the stationary bin top panel 285 can serve the same purpose as one attached to the stationary bin bottom panel 289.

There is shown in FIG. 9 a diagram illustrating a set of revolving bin doors 234/234A and related components for an exemplary SBU 158. A door component of a bin door sensor 400 can be located on the interior surface of a revolving bin door 234A near the bottom edge of the bin door 234A. Because three of the revolving bin doors 234A are shown in FIG. 9 fully opened, in an inverted position above the opening in the front exterior panel 230 for the revolving bin doors 234/234A, the interior side of those three bin doors 234A is shown and the bottom edge of the bin doors 234A is shown above the top edge, which can be hinged to the front exterior panel 230 by a set of bin door hinges 284. A bin door catch slot 280 can be a rectangular opening in the surface of the interior side of the bin door 234A, for example, centered just above the bottom edge of the bin door 234A (shown underneath the bottom edge of the inverted bin door 234A). A bin door positioning cam 404 can be built into, for example, the left most revolving bin door 234A. It can be operated, for example, by the same type of key that can be used to switch a CDP cam lock 288 between its different positions. The cam bolt of the bin door positioning cam 404 can be locked into the bin door positioning slot (not shown in FIG. 9, shown in FIG. 1 as 405) of the SBU to hold the set of revolving bin doors 234/234A in the open position.

An automated bin door configuration bolt mechanism 406/406A can be built into, for example, the right side of the first revolving three bin doors 234/234A (moving from left to right) of the exemplary SBU 158 shown in FIG. 9 having four revolving bin doors 234. The automated bin door configuration bolt mechanism 406/406A can be located, for example, near the bottom edge of the revolving bin door 234/234A and can be wired to a configuration bolt controller 267 through wiring which can run through the interior of the revolving bin door 234/234A in which it is located, through an opening (not shown) near the top edge of the bin door 234/234A, and into an interior wiring duct (not shown) which can be located on the inside surface of the front exterior panel 230 above the opening in the front exterior panel 230 for the revolving bin doors 234/234A. A bin door configuration bolt slot 408/408A can be an opening, for example, in the left side of the second, third, and fourth revolving bin doors 234/234A (moving from left to right) of the four bin doors 234/234A shown in the exemplary SBU 158 of FIG. 9. The bin door configuration bolt slots 408/408A of a set of revolving bin doors 234/234A can be located opposite from the automated bin door configuration bolt mechanisms 406/406A at a similar distance from the bottom edge of the bin doors 234/234A. The configuration bolt of the automated bin door configuration bolt mechanism 406/406A can be in either a consolidating position—located completely inside the interior of the automated bin door configuration bolt mechanism 406—or a dividing position—extended out of the automated bin door configuration bolt mechanism 406A of a first bin door 234A and locked into the bin door configuration bolt slot 408A of a second adjacent bin door 234A, for example, to the right of the first bin door 234A.

A bin door identifier label 286 can be affixed to the interior surface of the revolving bin doors 234/234A, for example, centered near the top edge of the bin door 234/234A. A bin door identifier label 286 affixed to the interior surface of a revolving bin door 234/234A can be similar to the bin door identifier label 286 affixed to the interior surface of a stationary bin door 238 in its composition, but the bin identifier information printed on each one can differ. Referring to FIGS. 10A and 10C in addition to FIG. 8 and FIG. 9, the bin door identifier label 286 of a stationary bin can contain a bin identifier, for example, in barcode format comprising the SBU Id, the Master Bin Id, and an identifier of the bin door 238—which can be a component of the Configuration Code of the Bin Inventory record 1300. The bin door identifier label 286 of a revolving bin 276 can contain a bin identifier, for example, in barcode format comprising the SBU Id and an identifier of the bin door 234/234A—which can be a component of the Configuration Code of the Bin Inventory record 1300. The bin identifier on a bin door identifier label 286 of a revolving bin door 234/234A does not contain a Master Bin Id, because the master bin 276 to which that bin door identifier label 286 can refer when scanned by a barcode scanner can differ as the set of revolving bins 276 can be moved. A storage locker bin identifier can be referred to as a bin identifier (or Bin Id). The programs of the automated system of storage locker bins which reference the information read from the bin door identifier label 286 of a revolving bin door 234/234A can determine the Master Bin Id of the revolving bin in the loading/unloading position by referencing a Load Position Master Bin Id field of a SBU Settings record 1314 having the SBU Id matching the SBU Id scanned from the bin identifier on the bin door identifier label 286. Although a bin identifier on the bin door identifier label 286 of a revolving bin does not have a Master Bin Id, it can still be considered and referred to as being the bin identifier of the specific bin located in the loading position behind the revolving bin door 234/234A that can be scanned, because at the time when it is scanned the bin identifier on the scanned bin door identifier label 286 can be used along with information from the SBU Settings table 1314 to identify one specific bin. Alternatively, in another embodiment each specific dividable section of a revolving bin 276 can have a label containing its unique identifier—SBU Id, Master Bin Id, and an identifier of the bin door 234/234A that can be located in front of that specific bin section. In the embodiment where each bin section is labeled with a specific bin identifier, the revolving bin doors 234/234A would not need to have a bin door identifier label 286. It should readily be understood that the identifiers are generic terms and in no way limit the scope of the invention.

A frame component of a bin door sensor 401 can be located inside a bin door frame component housing 410, which can be attached or adjoined to the interior surface of the front exterior panel 230 just below the edge of the opening in the front exterior panel 230 for the revolving bin doors 234. The bin door frame component housing 410 can extend back perpendicularly from the front exterior panel 230, for example, forming a flat shelf to bridge the short distance between a revolving bin and the front exterior panel 230 of the SBU 158. The bin door frame component housing 410 and a flat shelf-like appendage (not shown) which can be attached perpendicularly to the front exterior panel 230 above the bin door frame component housing 410 in a parallel orientation can function to prevent a revolving bin 276 in the loading/unloading position from rotating with respect to its bin brackets 278. The frame component of a bin door sensor 401 can be exposed through an opening in the front exterior panel 230 which can be aligned with the door component of a bin door sensor 400 when the bin door 234/234A is closed. Wiring which can run through the bin door frame component housing 410 and through the exterior wiring duct 248 can connect the frame component of the bin door sensor 401 to the CDC processing server 450. The bin door sensor (400 and 401) can function to register a closed status when checked by the CDC processing server 450 if the two components of the bin door sensor—the door component 400 and the frame component 401—are in contact or in close proximity of each other. It can function to register an open status when checked if the two components of the bin door sensor (400 and 401) are separated from each other. It should be understood that other types and arrangements of sensor components can be utilized consistent with the spirit of the invention to provide an indication of whether a bin door is in a closed or an open position.

A bin door locking mechanism 290 and a bin door opening mechanism 292 can be located within the bin door frame component housing 410 and can both extend out through openings in the front exterior panel 230. The bin door locking mechanism 290 can be a two-pronged component, with each prong having a head with an angled front edge at the end of a relatively narrow extension appendage. The extension appendages of the prongs can be fitted within in a track residing in a base section of the bin door locking mechanism 290. The prongs can slide laterally within the base's track toward and away from each other. The base section of the bin door locking mechanism 290 can be housed completely inside the bin door frame component housing 410 and the prongs can extend out of an opening in the front exterior panel 230. A spring-based mechanism can be used to maintain a normal state in which each prong is pushed out away from the other prong as far as possible within the base section. Upon receiving an electronic signal from a SBU lock controller 269, the bin door locking mechanism 290 can contract its two prongs toward each other in an unlocking motion. Following the contraction, the spring-based mechanism within the bin door locking mechanism 290 can move the two prongs back into their natural state extended apart from each other. The bin door opening mechanism 292 can be a spring-loaded cylinder which extends out from a base located in the bin door frame component housing 410 through an opening in the front exterior panel 230 to a distance slightly beyond the end of the prongs of the bin door locking mechanism 290. The spring of the bin door opening mechanism 292 can function to naturally extend the cylinder out of the base to its full length. When force is applied to the end of the cylinder, the spring of the bin door opening mechanism 292 can become compressed and the cylinder can be pushed within a chamber inside its base to a point where the cylinder no longer extends out of its base. This compression can occur when the bin door 234/234A corresponding to the bin door opening mechanism 292 is closed. When the bin door 234/234A is unlocked, the spring can extend out to its natural state, extending the cylinder out from its base and pushing the bin door 234/234A beyond the edge of the bin door locking mechanism 290. It should be understood that other types and arrangements of components can be utilized consistent with the spirit of the invention providing they are capable of locking and unlocking a bin door, with at least the unlocking being controlled by an electronic means.

In contrast to the revolving bin doors 234A shown in an opened position, one of the revolving bin doors 234 is shown in a closed position. The revolving bin door 234 in the closed position can fit over top of the bin door locking mechanism 290, the bin door opening mechanism 292, and the frame component of the bin door sensor 401, for example, with the bin door locking mechanism 290 fitting inside and locking within the bin door catch slot 280, the bin door opening mechanism 292 being compressed between its base component and the bin door 234, and the frame component of the bin door sensor 401 positioned opposite the door component of the bin door sensor 400 (although none of the aforementioned components can be seen for the closed bin door 234 shown in FIG. 9).

Figure 11:
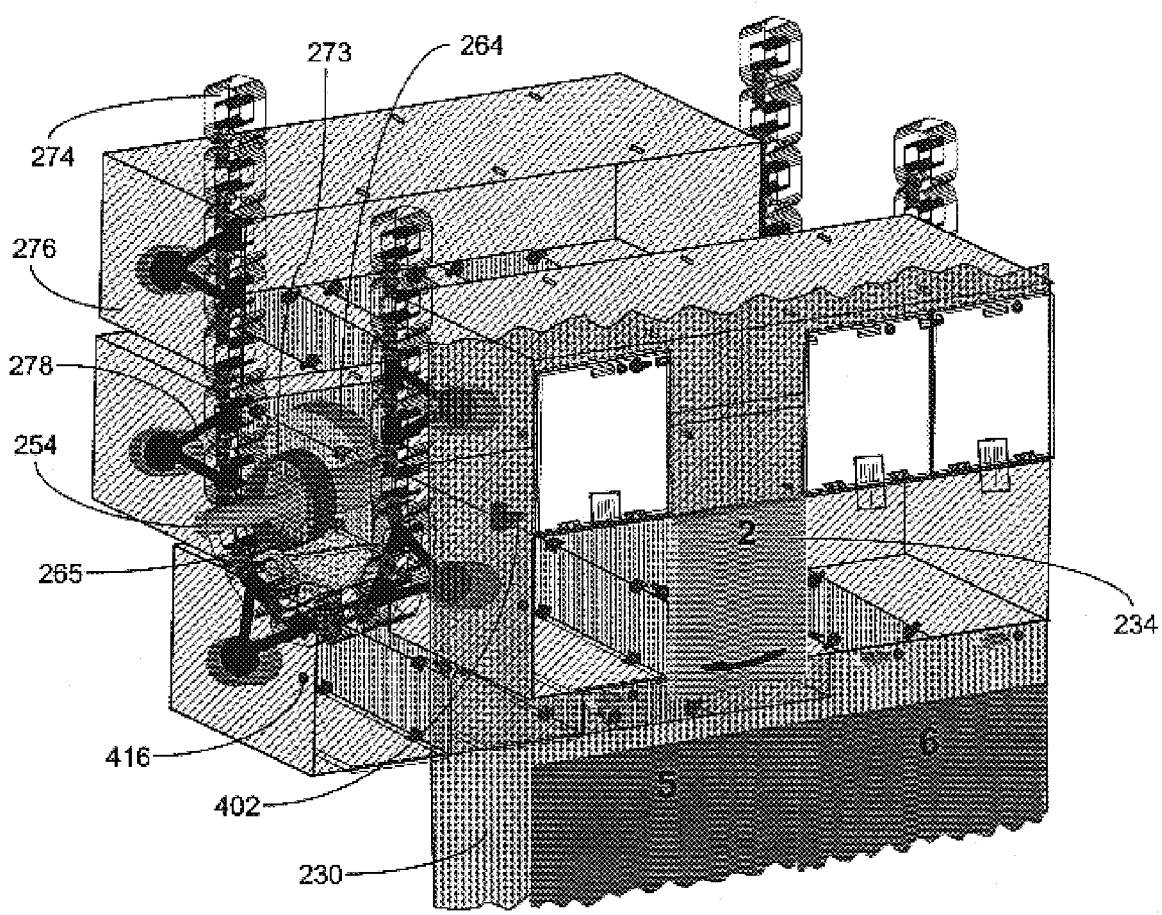
FIG. 11 is a diagram of a partial cut-away view illustrating a set of revolving bins within the SBU of FIG. 1.
Figure 11A:
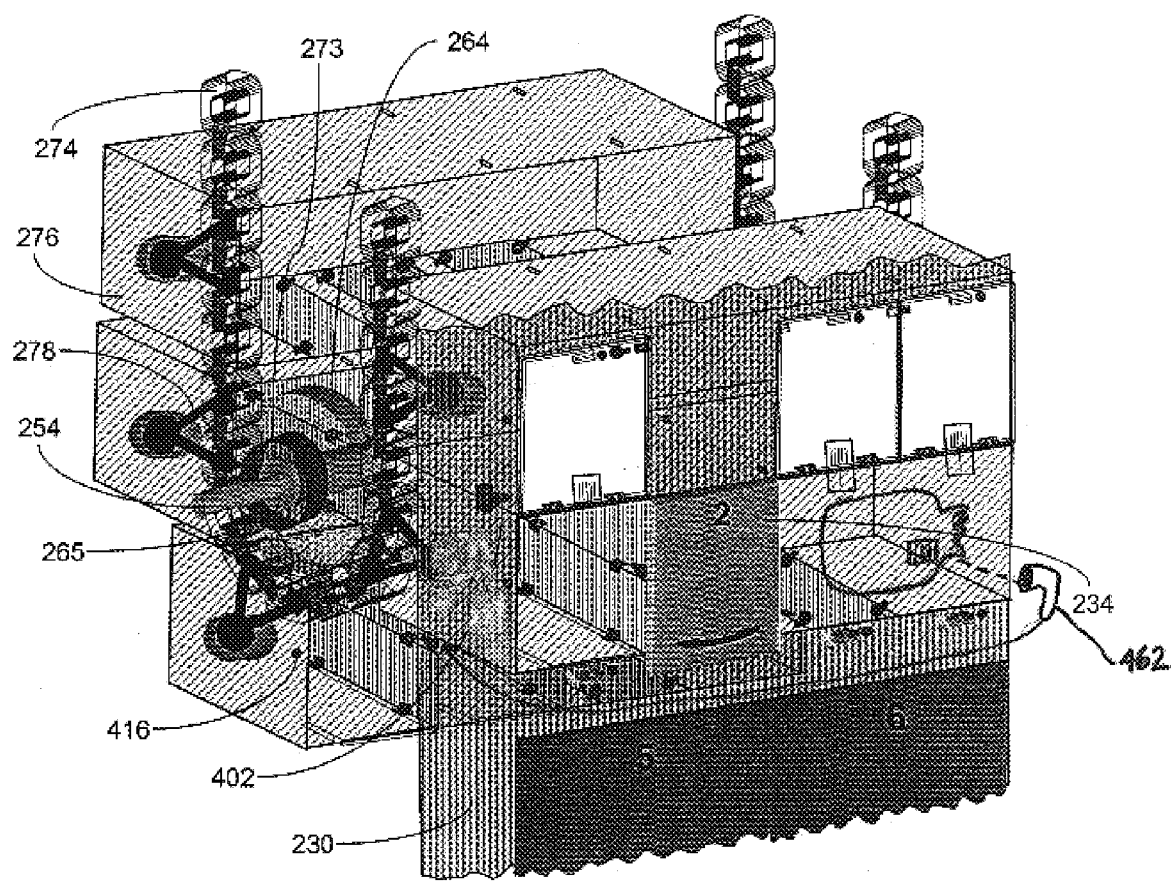
FIG. 11A is a diagram of a partial cut away view illustrating a set of revolving bins within the SBU of FIG. 1 and illustrating the scanning of an article identifier.
Figure 11B:
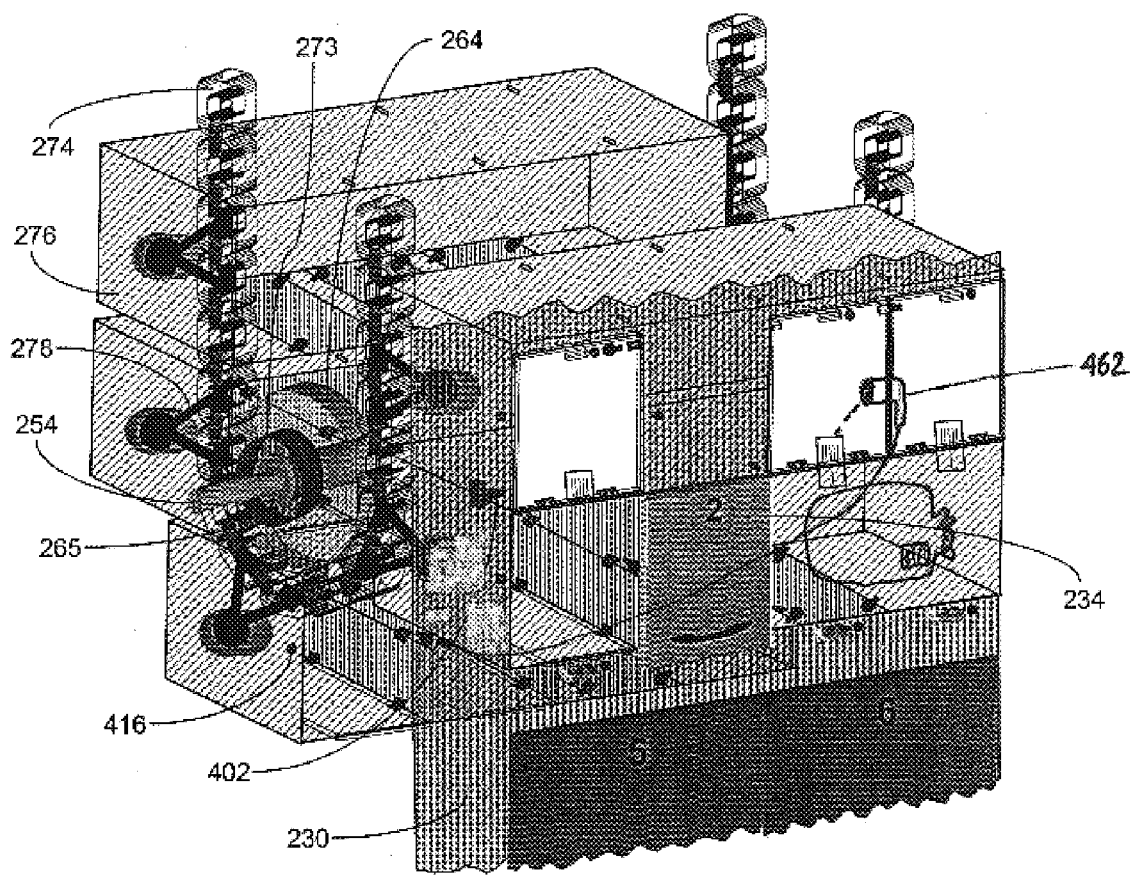
FIG. 11B is a diagram of a partial cut away view illustrating a set of revolving bins within the SBU of FIG. 1 and illustrating the scanning of a bin identifier.

FIG. 11A and FIG. 11B depict one embodiment of a close-up view of a subset of the revolving bins 276, the bin movement drive system residing within an exemplary SBU 158, and a scanner 462. The revolving bins 276 located behind the front exterior panel 230 and the revolving bin doors 234 can be seen in more detail in this illustrative drawing. The bin brackets 278 that connect the revolving bins 276 to the bin drive chain 274 can also be seen in more detail behind the partial cutaway view of the front exterior panel 230 (the front exterior panel 230 is depicted in a semi-transparent manner in this illustrative figure to allow the revolving bin components behind it to be seen). The lower spindle 264, bin drive sprocket 273, lower support shaft 254, and shaft collar 265 can also be seen as parts of the bin movement drive system within the SBU 158. Additionally, a scanner 462 can be connected to the SBU scanner port 242 for identifying a delivered article and a bin in which a delivered article can be stored. The scanner 462 can identify the article by scanning its article identifier and can identify the storage locker bin by scanning the bin door identifier label 286 of the bin door 234 corresponding to that storage locker bin. The Loading Program 356 can associate the scanned article identifier with the scanned storage locker bin identifier.

A bin movement counting sensor 402 can be attached to the interior surface of the front exterior panel 230, for example, to the left of the revolving bins 276 just above the top of the revolving bin located in the loading/unloading position (behind the set of revolving bin doors 234). The bin movement counting sensor 402 can work, for example, in conjunction with a bin count sensor 416 located on the exterior side of a revolving bin 276 to signal the motor controller 460 each time the set of revolving bins 276 has been moved enough of a distance in either direction to have positioned a different revolving bin 276 into the loading/unloading position. After the motor controller 460 initiates the SBU motor 266 to turn the motor drive sprocket 268 in either a clockwise or a counter-clockwise direction, the revolving bins 276 can be moved in either a clockwise or a counter-clockwise direction around the vertical axis formed by the upper 262 and lower 264 spindles. As the bins move around the vertical axis in either direction, a bin count sensor 416, which can be mounted on the side of the revolving bin 276, can be moved past the bin movement counting sensor 402. Each time a bin count sensor 416 is moved past the bin movement counting sensor 402, the bin movement counting sensor 402 can send a signal to the motor controller 460 to indicate that the set of revolving bins 276 has moved one unit of distance. The motor controller 460 can include a bin movement counting function, which can keep track of the number of bins that have been moved into the loading/unloading position, following the time when the motor controller 460 initiated the SBU motor 266 to turn in a particular direction. Thus the bin movement counting sensor 402 can provide the information necessary for the motor controller 460 to determine when the set of revolving bins 276 have been moved a particular distance in a particular direction. After determining that the revolving bins 276 have been moved a particular distance in a particular direction, the motor controller 460 can interrupt the supply of power to the SBU motor 266 and/or can actuate a brake (not shown separately from the SBU motor component which is depicted in FIG. 6 and FIG. 7) to stop the SBU motor 266 (and/or the motor drive sprocket 268). The bin movement counting sensor 402 can thereby provide the motor controller 460 with the information it needs to stop the set of revolving bins 276 with enough precision that a particular revolving bin 276 can be positioned behind the revolving bin doors 234, with the top and bottom of the revolving bin 276 aligned with the top and bottom edges of the revolving bin doors 234 respectively.

Alternatively, the bin movement counting sensor 402 can communicate with the CDC processing server 450, which can act as an intermediary between it and the motor controller 460. In this alternative the bin counting function can be provided by a program running on the CDC processing server 450 which can then communicate with the motor controller 460, sending a command to stop the SBU motor 266. It should also be readily understood by someone skilled in the art, that other arrangements of locating a bin movement counting sensor 402 and bin count sensors 416 can be consistent with the function of the exemplary arrangement described. Furthermore in other embodiments of a SBU 158 other means can be employed for achieving sufficient precision in positioning a particular revolving bin 276 into the loading/unloading position, including but not limited to: using motor sensors (not shown) to measure units of movement and determining a unit of movement by tracking the duration of time that the SBU motor 266 has operated in a particular direction. The embodiment in which motor sensors can be used can function by having one or more motor sensors located within the SBU motor 266 to signal the motor controller 460 upon each revolution or fractional revolution of the motor shaft 270 or a fly wheel (not shown) to provide the motor controller 460 with a count of more detailed units of movement than the movement of one revolving bin 276 moving into the loading/unloading position. In the embodiment in which the duration of time that the SBU motor 266 has operated can be measured, standard units of time per bin movement distance traveled can be calculated, including the time it takes for the motor to begin its movement and the time it takes for the motor to be brought to a stop, to develop a bin movement time table precise enough to position a revolving bin 276 into the loading/unloading position with uniform consistency. Due to the time needed to get the motor moving and the time needed to slow the motor to a complete stop, the time needed to move the revolving bins 276 two units of distance, for example, may be less than twice the time needed to move them one unit of distance.

Figure 12:
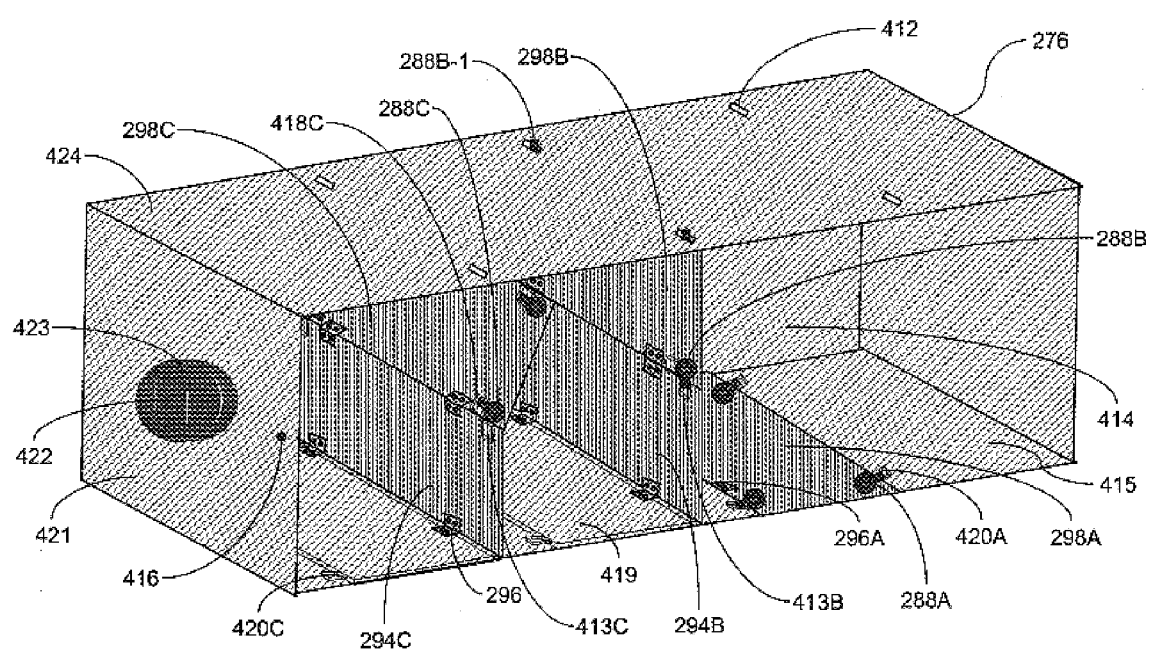
FIG. 12 is a diagram illustrating the structure of the revolving bin as shown in FIG. 11.

The structure of an exemplary revolving bin 276 is shown in FIG. 12. The revolving bin 276 can comprise different bin panels, for example, a revolving bin back panel 414, a revolving bin top panel 424, two revolving bin side panels 421, and a revolving bin bottom panel 415. The bin panels comprising the outer structure of a revolving bin 276 can be made of metal or a durable composite and can be adjoined to each other, for example welded to each other, or attached to each other, for example secured to each other using brackets (not shown) and/or fasteners (not shown), such as machine screws. The top revolving bin panel 424 can have sets of bin panel dividing slots 412 which can receive the cam bolts of corresponding sets of CDP cam locks 288 when they are locked into the dividing position. In the illustrative embodiment shown in FIG. 12, there are three sets of bin panel dividing slots 412, with two slots 412 in each set. A bin count sensor 416 can be located on one of the revolving bin side panels 421, for example on the left bin side panel 421. A bin bracket connector base component 423 can be adjoined or attached to the exterior surface of each revolving bin side panel 421, and a rotating bin bracket connector 422 can be fitted within each bin bracket connector base component 423. The components on the exterior surface of the right-side revolving bin side panel 421 cannot be seen in FIG. 12 due to the angle of perspective.

A rotating bin bracket connector 422 can have a connector at one end that can attached to a bin bracket 278 in a fixed manner. The other end of the rotating bin bracket connector 422 can have a circular base component that can rotate within the bin bracket connector base component 423 into which it can be fitted. The bin bracket connector base component 423 can be a circular housing attached or adjoined to the revolving bin side panel 421 in a fixed manner. It can contain a circular chamber within which the base component of the rotating bin bracket connector 422 can rotate easily, facilitated for example, by a machine lubricant. The two rotating bin bracket connectors 422 on each side of the revolving bin 276 can function with their associated bin brackets 278 and bin bracket connector bases 423 to rotate the revolving bin 276 in small adjustment increments to allow it to maintain a substantially fixed disposition, in which its bottom panel 415 remains at the bottom of the structure approximately parallel to the ground, as it revolves around the vertical axis of the bin drive chain 274 in either direction.

Other arrangements of bin connector components can be utilized in alternate embodiments to achieve the necessary rotation adjustment of the revolving bins 276 to maintain their substantially fixed disposition as they revolve around the vertical axis of the bin drive chain 274. In a first alternate embodiment, an arrangement of ball bearings can be utilized inside the circular chamber of the bin bracket connector base component 423 to facilitate the rotation of the base of the rotating bin bracket connector 422 with ease. In a second alternate embodiment, the end of the rotating bin bracket connector 422 connected to the bin bracket 278 can be connected in such a way as to allow it to rotate within the bin bracket 278. In the second alternate embodiment, the rotating bin bracket connector 422 can rotate on either of its sides. In a third alternate embodiment, the rotating bin bracket connector 422 can be connected to the bin bracket 278 in the same manner as described in the second alternate embodiment, but the base component of the rotating bin bracket connector 422 can be attached to the bin bracket connector base 423 in a fixed manner, allowing only the end fitted within the bin bracket 278 to rotate. In a fourth alternate embodiment, a rotating bin bracket connector 422 can be connected directly to a bin drive chain 274 without using a bin bracket 278 as an intermediary. In this fourth alternative, the rotating bin bracket connector 422 can function to rotate as necessary within its bin bracket connector base component 423 to maintain the substantially fixed disposition of the revolving bin 276.

The composition and function of configuration dividing panels (CDP's) (294 and 298) in a revolving bin 276 can be similar to that of a stationary bin although the dimensions of the panel sections that comprise each CDP (294 and 298) can differ in size between a stationary bin and a revolving bin 276. It should be assumed that any of the components directly related to the functioning of a CDP (294 and 298) as described for a revolving bin 276 can also be components of a CDP (294 and 298) of a stationary bin, even if not specifically described or visible in FIG. 8.

One recessed CDP holding region 419 can be located within the structure of the revolving bin bottom panel 415 for each CDP (294 and 298) located within the revolving bin 276. Viewing FIG. 12 from right to left, a first CDP 298A can be seen locked into the consolidating position within its recessed CDP holding region 419. Only the upper panel section 298A of the CDP can be seen as the lower panel section (not shown) is folded underneath the upper panel section 298A. Two sets of CDP cam locks 288A which can be built into the upper panel section 298A of the CDP—one set near its top edge (shown to the right) and the other set near its bottom edge (only one of the set is shown to the left)—can be locked into two corresponding sets of bin panel consolidating slots 420A—one set located in the right side of the recessed CDP holding region 419 and the other set located in the left side. The first CDP 298A can be considered in the consolidating position, because when it is locked into the recessed CDP holding region 419 in the revolving bin bottom panel 415 the two sections of the master bin 276 on either side of where the CDP 298A can be attached to the revolving bin bottom panel 415 are consolidated into one larger bin extending from the right revolving bin side panel 421 to a second CDP (294B and 298B) that is in the dividing position, which can be located in the center of the master bin 276. One CDP hinge 296A of the set of CDP hinges 296A, which can attach the upper panel section 298A of the CDP to the lower panel section of the CDP can be seen attached to the upper panel section 298A residing within the recessed CDP holding region 419. The other set of CDP hinges attaching the first CDP to the revolving bin bottom panel 415 is not visible as it can be folded underneath the lower panel section within the recessed CDP holding region 419.

The second CDP (294B and 298B) is shown in the dividing position separating the master bin 276 into two different bins. Its upper 298B and lower 294B panel sections are hinged to each other, and a set of CDP cam locks 288B, which can be built into the upper panel section near its bottom edge, can lock into a corresponding set of CDP dividing slots 413B to form a fixed relational position between the two panel sections (294B and 298B)—a vertical plane, with one panel section 298B on top of the other 294B. The cam bolts of the CDP cam locks 288B, each fitting in a corresponding CDP dividing slot 413B can act as a structural support within the CDP to prevent the two panel sections (294B and 298B) from folding when a force is applied against them. The two sections of the CDP (294B and 298B) configured to act as one solid divider can be anchored to the bottom panel 415 of the revolving bin 276 by a set of CDP hinges 296 attached, for example, to the bottom of the recessed CDP holding region 419 at its right edge. The CDP (294B and 298B) can be anchored to the revolving bin top panel 424 by the cam bolts of a set of CDP cam locks 288B-1 locked into a corresponding set of bin panel dividing slots 412 located in the revolving bin top panel 424.

A third CDP (294C and 298C) is shown in transition between the consolidating and the dividing positions. Its lower panel section 294C is shown extending up from its recessed CDP holding region 419 in a vertical orientation. While its upper panel section 298C is shown with an angled orientation upward toward the right side of the master bin 276. Both sets of the CDP cam locks 288C of the third CDP (294C and 298C) can be positioned with their cam bolts in CDP configuration slots 418C. A CDP configuration slot 418C can be an opening in the side the upper panel section 298 of a CDP adjacent to its corresponding CDP cam lock 288. CDP configuration slots 418C can function to hold the cam bolt of a CDP cam lock 288 completely within the CDP upper panel section 298 while the panel sections of a CDP (294 and 298) are being moved. The bin panel consolidating slots 420C, CDP dividing slots 413C, and bin panel dividing slots 412 corresponding to the CDP cam locks 288C of the third CDP (294C and 298C) can all be empty as the third CDP (294C and 298C) is being moved between its two positions—the consolidating position and the dividing position. The invention is not so limited to the number of CDP's (294 and 298) shown in FIG. 8 and FIG. 12 or the number of bin doors (238 or 234) shown in FIG. 8 and FIG. 9.

In another embodiment, CDP cam locks 288, CDP dividing slots 413, and CDP configuration slots 418C can be comprised by the upper 298 and lower 294 panel sections (for either a revolving bin 276 and/or a stationary bin) in a different manner than depicted in FIG. 12. CDP cam locks 288 can be mounted on top of one surface of the upper CDP panel section 298, located near the top and bottom edges of the upper panel section 298 in a location similar to the embodiment depicted in FIG. 12. The cam bolts of the CDP cam locks 288 can reside on top of the surface of the CDP (294 and 298) (the same surface that the CDP cam locks 288 can be mounted upon) and can slide between a configuring position underneath a configuration slot appendage (not shown) mounted on top of the surface of the upper panel section 298 (the same surface that the CDP cam locks 288 can be mounted upon) and a dividing position underneath a dividing slot appendage (not shown) mounted on top of the surface of the lower panel section 294. The configuration slot appendage can function as a CDP configuration slot 418C and the dividing slot appendage can function as a CDP dividing slot 413. Each of the two appendages can be closed on all sides except for an opening that can be located at the edge of the CDP panel section (294 or 298). The opening can be, for example, slightly longer than the length of the cam bolt which can slide between the appendages. Furthermore, when the CDP (294 and 298) is configured into the dividing position, the two appendages can form an arc approximately the size of a quarter circle. In this embodiment, the bin bottom panels (415 and/or 289) can be flat, without recessed CDP holding regions 419, but they can have openings in them sized to allow the dividing slot appendages to fit through them and allow the CDP lower panel section 294 to rest flatly against them when in the consolidating position. The CDP upper panel section 298 can rest flatly on top of the CDP lower panel section 294 when the CDP (294 and 298) is in the consolidating position slightly above the remaining surface of the bin bottom panel (415 and/or 289), and the configuration slot appendage can extend slightly above the CDP upper panel section 298 aligned with a consolidating slot appendage into which the cam bolt of the CDP cam lock 288 can be locked when in the consolidating position. In this manner, there can be four such consolidating slot appendages mounted on top of the bin bottom panel (415 and/or 289) one for each CDP cam lock 288 on the surface of the CDP upper panel section 298. The cam bolts of the two CDP cam locks 288 which can be mounted near the top edge of the CDP upper panel section 298 can be moved from a configuration position underneath their configuration slot appendages into bin panel dividing slots 412 in the bin top panel (424 and/or 285) to lock the CDP (294 and 298) into the dividing position. The bin panel dividing slots 412 in this embodiment can have a similar composition and function as the ones in the embodiment depicted in FIG. 12. Other embodiments can include different arrangements of CDP's in both revolving master bins 276 and/or stationary master bins including, but not limited to ones which are composed of only one panel section, ones which are not hinged to the bin panels of the master bin, ones which divide the master bin horizontally, at an angled orientation, or some combination of vertically, horizontally, and/or at an angled orientation. In this manner, it is possible for a bin configuration adjustment to reconfigure the dimensions of a master bin in a way which may not be able to be described as either consolidating or dividing, as it may result in a master bin containing the same number of bins as it had prior to the adjustment, with each bin having a similar volume to which it had prior to the configuration adjustment, although with different dimensions.

Figure 13:
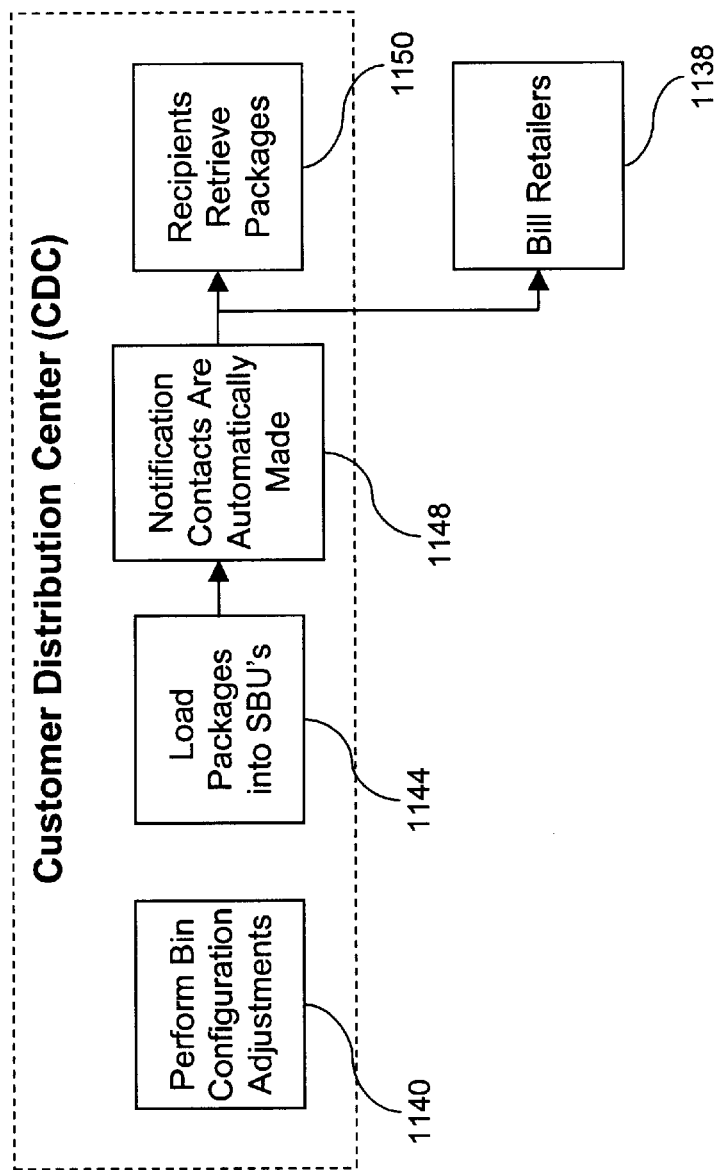
FIG. 13 is a diagram illustrating exemplary processing functions related to an automated system of storage locker bins.

There is shown in FIG. 13, exemplary processing steps that can be used to efficiently deliver packages and/or other articles in bulk to a destination centralized pickup location for recipients. An entity that can deliver packages and/or other articles in bulk to a destination centralized pickup location can be referred to as a shipper. After articles such as packages have been delivered in bulk to a destination centralized pickup location, they can be loaded into storage locker bins of an automated system of storage locker bins, step 1144. The loading step 1144 can trigger automatic notifications of delivery to the recipients, step 1148. Following the notification step 1148, the retailers from which a recipient ordered the items within a bulk delivered package can then be billed as shown in step 1138, and the recipients can then retrieve their packages from the automated system of storage lockers, step 1150. The illustrative steps of the exemplary process can include an optional step of performing bin configuration adjustments to bins of an automated system of storage locker bins, step 1140. The step of performing bin configuration adjustments 1140 is not directly related to the other steps depicted in FIG. 13, as bin configuration adjustments are generally not made for specific packages being delivered in bulk, but can be made in batches to adjust the quantity of bins of particular sizes to better accommodate future deliveries of bulk delivered packages.

Although FIG. 13 and subsequent figures discuss bulk delivered packages being loaded into, retrieved from, and/or triggering electronic notifications from an automated system of storage locker bins, it should be understood that other articles delivered in bulk and/or packages or other articles which may not have been delivered in bulk can also be loaded into, retrieved from, and/or can trigger electronic notifications from the automated system of storage locker bins. A destination centralized pickup location can also be referred to throughout this disclosure as a Customer Distribution Center (CDC). Generally one automated system of storage locker bins can be installed at each CDC, although other arrangements where one automated system of storage locker bins is split between more than one CDC and where more than one automated system of storage locker bins is installed at one CDC can be possible. Each automated system of storage locker bins can have its own processing server 450, which can communicate with and control the actions of one or more SBUs 158 and one or more entrance stations 172. A SBU 158 can contain one or more storage locker bins. Storage locker bins can also be referred to throughout this disclosure as bins, revolving bins 276, and/or stationary bins. The bins of a SBU 158 can be configured to different sizes using one or more configuration dividing panels (CDP's) (294 and 298) located within a bin's structure. The size of a bin can be tracked and referred to by a data element called Bin Size. The bin structures of a SBU 158 can also be referred to throughout this disclosure as master bins, and the discrete subsections of a master bin that can be created when CDP's (294 and 298) can be positioned into either dividing or consolidating positions can be referred to as storage locker bins or bins. A master bin of a SBU 158 can be stationary or moveable. If a master bin is stationary its bins can be referred to as stationary bins. If a master bin is moveable its bins can be referred to as moveable bins or revolving bins 276. A SBU 158 can be located within a temperature-controlled area within a CDC as well as in a non-temperature-controlled area. The data representing storage locker bins can include a data element called Temperature Code to differentiate between the bins of a SBU 158 located in a temperature-controlled area from the bins of a SBU 158 located in a non-temperature-controlled area.

One embodiment of an automated system of storage locker bins can include a first function to enable a shipper to reserve a number of storage locker bins of a particular Bin Size and Temperature Code in aggregate for a future delivery of packages. Alternatively, an external system can be given access to the database of the storage system to enable it to reserve quantities of storage locker bins. With reference to FIG. 10A, the database access can include, but is not limited to read/write access to the following data tables and read-only access to the following exemplary data views: a Bin Inventory table 1300, a Bin Availability data view 1301, a Bin Reservation table 1302, a Reserved Bins data view 1303, a Pending Bin Configuration Adjustments table 1304, and an Unreserved Bins data view 1305. A result of the function enabling a shipper to reserve storage locker bins can be one or more new records being added to the Bin Reservation table 1302 for the shipper. In another embodiment, a shipper can also reserve specific bins within the storage system in addition to reserving quantities of bins in aggregate, using either the storage system directly or using an external system.

An additional output from the first function can include data tracking a quantity of bins of a particular Bin Size and Temperature Code that were not available to be reserved. A second function of the automated system of storage locker bins can determine a number of bin configuration adjustments that could be made to available storage locker bins to increase the number of storage locker bins of a particular Bin Size and Temperature Code available to receive packages. The second function can try to create additional storage locker bins to satisfy the quantities of bins of the Bin Size and Temperature Code that were unable to be reserved by the first function. The result of the second function can include adding new records to and/or updating records on the Pending Bin Configuration Adjustments table 1304 and Bin Reservation table 1302, updating records on the Bin Inventory table 1300, and creating a Configuration Adjustments Report to enable workers to make bin configuration adjustments, step 1140. Alternatively, the second function can be executed by an external system having access to the database of the automated system of storage locker bins, such as the aforementioned external system executing the first function.

Bin configuration adjustments can also be referred to as storage locker bin configuration changes. The following illustrative description and examples discuss how data can be recorded and updated, for example, in the Bin Inventory record 1300 to track bin configuration adjustments. Each subsection of a physical bin structure can be referred to as a bin and the physical bin structure can be referred to as a master bin. Thus with reference to the Bin Inventory table 1300 of FIG. 10A, if a master bin is divided into two or more bins, each subsection or bin can have the same Master Bin Id for one of its data attributes. The bins can also have Configuration Codes and Bin Sizes that identify the manner in which they have been divided. A Configuration Code can numerically describe which subsections comprise a bin, of the possible number of subsections within a master bin. Each subsection of a revolving master bin can be numbered, for example, from left to right starting with a value such as "1". Each subsection of a stationary master bin can be numbered, for example, from left to right starting with the number equal to the highest revolving bin subsection number, plus one. A Configuration Code can, for example, consist of only the numbers of the master bin subsections that comprise the bin, moving from left to right. The Bin Size of any revolving bin can be equal to the number of its subsections. For example, a bin with a Configuration Code of "234" can have a Bin Size of "3". The Bin Size of any stationary bin can be equal to its number of subsections+the largest possible Bin Size of a revolving bin. For example, if the largest possible Bin Size of a revolving bin is "4", a stationary bin with a Configuration Code of "6" can have a Bin Size of "5". Each bin within a CDC can be tracked on the Bin Inventory table 1300 in the database of that CDC's processing server 450. The Bin Inventory record 1300 of each bin can contain a unique Bin Id, which can be derived by, for example, concatenating, its SBU Id+its Master Bin Id+its Configuration Code.

The following two illustrative examples can illustrate how different configurations of a master bin can be tracked on the Bin Inventory table 1300. In the first illustrative example, a revolving master bin 276—Master Bin Id "02" of SBU Id "A01"—can be divided into three bins. Bin Id "A01-02-0012" can encompass the left half of the master bin 276 and can have a Bin Size of "2". Bin Id "A01-02-0003" can encompass the third quarter of the master bin 276, just to the right of Bin Id "A01-02-0012", and can have a Bin Size of "1". Bin Id "A01-02-0004" can encompass the right-most quarter of the master bin 276 and can have a Bin Size of "1". The Configuration Codes of the three bins respectively can be as follows: "12", "3", "4". In the second illustrative example, a stationary master bin—Master Bin Id "S1" of SBU Id "A01"—can be configured as one bin, consisting of both master bin subsections. Bin Id "A01-S1-0056" can encompass the whole stationary bin, can have a Bin Size of "6", and a Configuration Code of "56."

Figure 14:
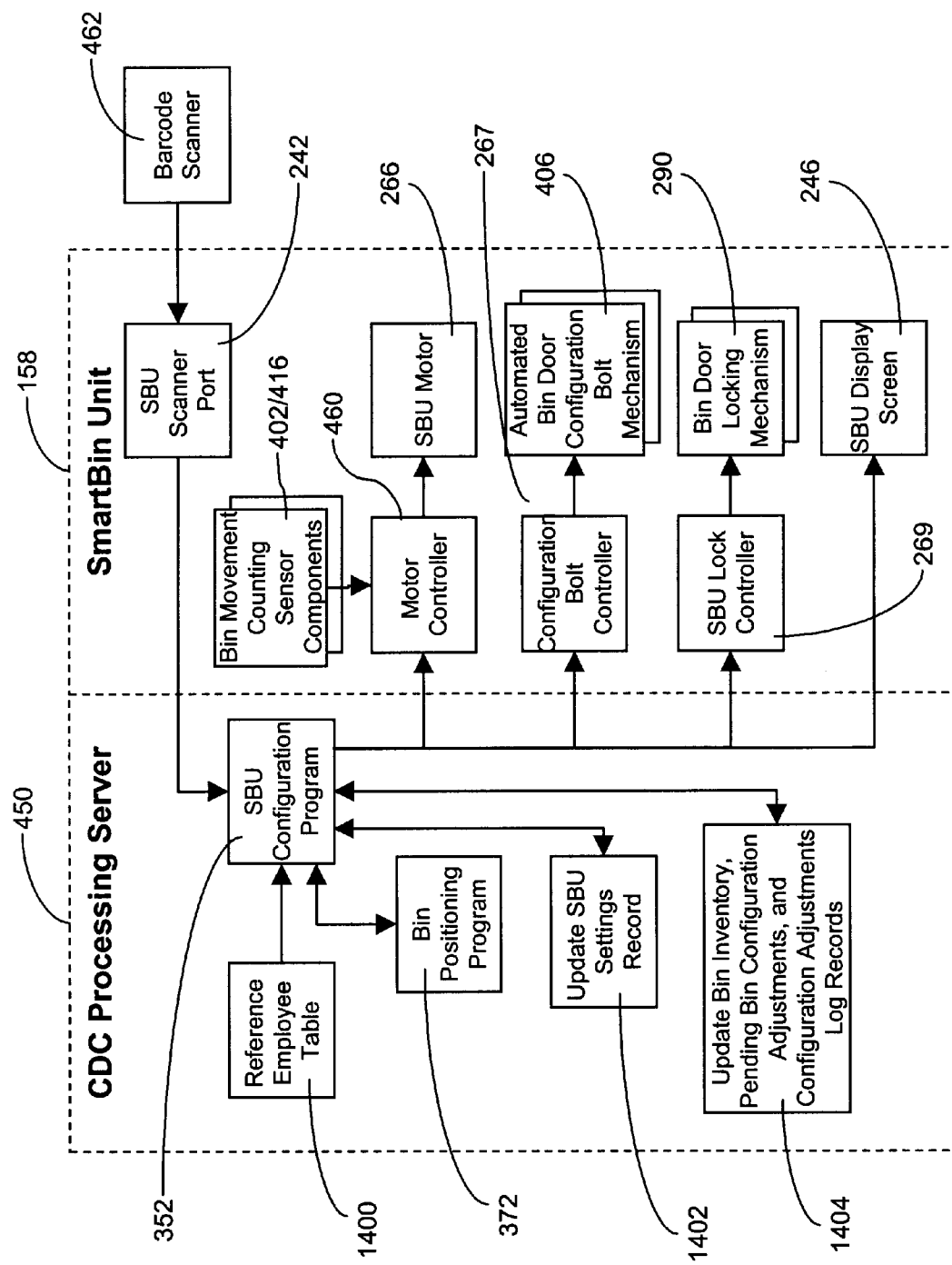
FIG. 14 is a diagram illustrating an exemplary flow of the programs, data functions, and electronic components of an automated system of storage locker bins that can be utilized in performing bin configuration adjustments to the SBU of FIG. 1.

There is shown in FIG. 14, a diagram having an exemplary flow of programs, data functions, and electronic components of an automated system of storage locker bins that can be utilized in performing bin configuration adjustments to SBUs 158. A different Configuration Adjustments Report can be printed for each shipper executing the function to print a Configuration Adjustments Report. The Configuration Adjustments Reports can be printed on a CDC printer 446 and can include a shipper identifier to denote for which shipper's workers the report has been printed. A worker can use the Configuration Adjustments Report to make the necessary bin configuration adjustments, step 1140. The Configuration Adjustments Report can guide a CDC worker to the SBUs 158, upon which the worker can make configuration adjustments, by listing them in SBU Id order. A CDC worker can, for example, wear a hands-free barcode scanning device 462 as the worker takes the report to each listed SBU 158. The CDC worker can, for example, connect the scanning device 462 into the scanner port 242 of the first SBU 158 listed on the report, scan their employee id card to identify themselves as the worker configuring the current SBU 158, and scan the first barcode next to a Master Bin Id, listed underneath the SBU Id on the report. A scanning device 462 does not have to be connected into the scanner port 242 of the SBU 158 upon which it is performing a bin configuration adjustment (or loading). It can be connected to any scanner port 242 of any SBU 158 that is a part of the automated system of storage locker bins. The scanning device 462 merely needs a connection to the storage system to operate, and it can know which SBU 158 to act upon based upon the SBU Id of the barcode scanned from either the Configuration Adjustments Report (for a bin configuration adjustment) or the SBU identifier barcode label 245 (for loading an article). The scanner 462 could also be a wireless scanner, which can communicate to a remote device or server. A SBU Configuration Program 352 of the automated system of storage locker bins can be initiated on the CDC processing server 450, and the program 352 can reference the employee table to validate the scanned employee id card, step 1400. Under each SBU Id on the Configuration Adjustments Report, Master Bin Id's can be listed in ascending order, for example, with stationary master bins preceding revolving master bins 276. In one embodiment of a SBU 158, the SBU 158 can have only one stationary master bin, which can contain only one CDP (294 and 298), but because other embodiments may feature more than one stationary master bin and/or may feature stationary master bins with more than one CDP (294 and 298), in this disclosure both stationary master bins and their CDP's (294 and 298) can be referred to in a more general plural sense, rather than as one specific master bin or CDP (294 and 298). If more than one bin configuration adjustment is to be made to one master bin, each bin configuration adjustment can be listed separately. For example, the Master Bin Id can be listed more than once under its SBU Id. The new Configuration Codes of the bins to be created within the master bin can be listed next to each Master Bin Id on the report, along with a barcode that can be used to trigger the database changes associated with the configuration action.

A worker using a Configuration Adjustments Report to make bin configuration adjustments, step 1140, can perform each bin configuration adjustment by scanning a barcode on the report corresponding to a particular master bin of a SBU 158 to update the bin configuration data tracked, for example, in the Bin Inventory record 1300, and then by using a configuration key to reposition the CDP's (294 and 298) of that master bin. Where the bin configuration adjustment is being performed on a stationary master bin, the worker can also use the configuration key to reposition the bin door configuration cam 282 to achieve the desired bin configuration, ensuring that the bin doors are configured to open consistent with the size of each configured stationary bin.

A worker can use, for example, a configuration key to reposition the cam bolts of the CDP cam locks 288 of a CDP (294 and 298), repositioning and locking the CDP (294 and 298) into one of its two positions—a dividing position or a consolidating position. The CDP cam lock 288 and configuration key can be similar to the lock and key mechanism used to open and close vending machines. Configuration keys can be constructed in such a manner as to be used interchangeably between the CDP cam locks 288, bin door configuration cams 282, and bin door positioning cams 404 of many SBUs 158 within a CDC or across multiple CDC's. The design of the configuration key can allow a worker with a key to make bin configuration adjustments to many SBUs 158, step 1140, while preventing someone without a configuration key from changing a bin's configuration, even if the door of the bin has been opened.

In one embodiment (the one depicted in FIG. 8 and FIG. 12), there can be many possibilities of forming a new bin configuration from an existing one, but no matter what the bin configuration is at the start and end of a bin configuration adjustment, every bin configuration adjustment can be classified as either a dividing bin configuration adjustment or a consolidating bin configuration adjustment. The barcode of a dividing bin configuration adjustment can contain, for example, a configuration type identifier, followed by the Bin Id of the bin to be divided, followed by the Configuration Code of each bin resulting from the bin configuration adjustment, in a barcode format which can be parseable. When the barcode of a dividing bin configuration adjustment is scanned, the SBU Configuration Program 352 can parse the data in the barcode, use the configuration type identifier to determine that the configuration action is a dividing one, and use the Bin Id to select the Bin Inventory record 1300 of the bin being divided. The program 352 can create two or more new Bin Inventory records 1300 from the selected Bin Inventory record 1300, before deleting the selected record 1300, step 1404. Each new Bin Inventory record 1300 can have the same values as the deleted Bin Inventory record 1300, except for the Configuration Code, Bin Id, and Bin Size fields. The Configuration Code on the first record 1300 created can be set to the value of the first Configuration Code, listed after the Bin Id, in the scanned report barcode. The Configuration Code on subsequently created records 1300 can be set to the value of each subsequent Configuration Code, listed after the first one, in the scanned report barcode. The Bin Id on each new record 1300 can be derived, for example, by concatenating SBU Id+Master Bin Id+Configuration Code. Bin Size on new records 1300 created for revolving bins can be set to the number of digits in the Configuration Code. Bin Size on new records 1300 created for stationary bins can be set to the number of digits in the Configuration Code added to the value of the largest possible revolving Bin Size.

The parseable barcode of a consolidating bin configuration adjustment can contain, for example, a configuration type identifier, followed by the Configuration Code of the new bin resulting from the bin configuration adjustment, followed by the Bin Id of each bin within the master bin to be consolidated, in a barcode format. When the barcode of a consolidating bin configuration adjustment is scanned, the program 352 can parse the data in the barcode, use the configuration type identifier to determine that the configuration action is a consolidating one, and use the Bin Id's to select the Bin Inventory records 1300 of the bins being consolidated. The program 352 can create one new Bin Inventory record 1300 from the selected Bin Inventory records 1300, before deleting the selected records 1300, step 1404. The new Bin Inventory record 1300 can have the same values as the deleted Bin Inventory records 1300, except for the Configuration Code, Bin Id, Bin Size, and Status fields. The Configuration Code on the new record 1300 can be set to the value of the Configuration Code, listed after the configuration type identifier, in the scanned report barcode. The Bin Id on the new record 1300 can be derived, for example, by concatenating SBU Id+Master Bin Id+Configuration Code. Bin Size on the new record 1300 can be set for a revolving or stationary bin based on the Configuration Code in a manner that can be consistent with the way it can be set for a dividing bin configuration adjustment. Status can be set to a value such as "available".

As each dividing bin configuration adjustment is made to the Bin Inventory table 1300 the program 352 can update the Pending Bin Configuration Adjustments table 1304 to offset the amount of pending bin configuration adjustments by the amount of bin configuration adjustments actually made, step 1404. It can reduce the Quantity of the Pending Bin Configuration Adjustments record 1304, having the Bin Size and Temperature Code of the newly created Bin Inventory records 1300, by the number of new bins created. It can increase the Quantity of the Pending Bin Configuration Adjustments record 1304, having the Bin Size and Temperature Code of the deleted Bin Inventory records 1300, by the number of records deleted. The Pending Bin Configuration Adjustments table 1304 does not have to be updated as consolidating bin configuration adjustments are made, because pending consolidating bin configuration adjustments can be tracked by the Status on specific Bin Inventory records 1300, instead of on Pending Bin Configuration Adjustments records 1304. With reference to FIG. 10B, the program 352 can also add a new record to a Configuration Adjustment Log table 1306 to track each bin configuration adjustment made, using the data from the scanned report barcode and the scanned employee id, step 1404. A Configuration Adjustment Id can be derived, for example, by concatenating the value of the first Bin Id listed in the scanned report barcode+the current date. Configuration Type can be set to the value of the configuration type identifier. The value of Bin Id 1 through Bin Id 4 can be set to the value of each Bin Id listed in the barcode, in the sequence that it is listed. The value of Configuration Code 1 through Configuration Code 4 can be set to the value of each Configuration Code listed in the barcode, in the sequence that it is listed. Employee Id can be set to the value on the scanned employee id card, and Configuration Date/Time can be set to the current date/time.

When the barcode of a stationary master bin listed on a Configuration Adjustments Report is scanned, the program 352 can unlock the bin doors 238 of the stationary master bin and display the Master Bin Id and the desired Configuration Codes on the SBU display screen 246. The program 352 can separate the Master Bin Id and each individual Configuration Code with, for example, hyphens, when displaying them on a SBU display screen 246. The program 352 can unlock the bin doors 238 (refer to FIG. 8) by sending unlock commands to the SBU lock controller 269, which can interpret the commands and trigger, for example, the bin door locking mechanisms 290 of both stationary bin doors 238 to unlock. With the stationary bin doors 238 open, a worker can use a configuration key to reposition the CDP's (294 and 298) of the stationary master bin to achieve the bin configuration dictated by the Configuration Codes listed on the Configuration Adjustments Report and the SBU display screen 246. The worker can also use a configuration key to reposition the cam bolt of a bin door configuration cam 282 into either a dividing or consolidating position to align the configuration of the stationary bin doors 238 with the new bin configuration. Unlike the bin door configuration bolts of automated bin door configuration bolt mechanisms 406 on revolving bin doors 234, which can be moved electronically by the programs of the automated system of storage locker bins, the cam bolts of a bin door configuration cam 282 on a stationary bin door 238 can be moved manually. When a CDP (294 and 298) has been moved in place to divide a stationary bin, the cam bolt of the bin door configuration cam 282 between the two bin doors 238 on either side of that CDP (294 and 298) should be in the dividing position—for example, vertical, completely within the structure of one of the two stationary bin doors 238. When a stationary bin CDP (294 and 298) is folded down and locked into the consolidation position, the cam bolt of the bin door configuration cam 282, between the two stationary bin doors 238 on either side of where that CDP (294 and 298) is hinged, should be in the consolidating position—for example, horizontal, overlapping into the bin door configuration cam slot 295 within the structure of the stationary bin door 238 adjacent to the stationary bin door 238 into which it is built.

With reference to FIG. 10C, when the barcode of the first revolving master bin of a SBU 158 listed on a Configuration Adjustments Report is scanned, the program 352 can move the master bin 276 of the scanned report barcode into the unloading position (the unloading/loading position of a revolving bin or master bin 276 can be with the open front side of the master bin 276 lined up with the SBUs revolving bin doors 234), move the bin door configuration bolts of the automated bin door configuration bolt mechanism 406 to consolidate the revolving bin doors 234 to form one solid bin door across the entire revolving master bin 276, update the values on a SBU Settings record 1314 of the current SBU 158, step 1402, and unlock the revolving bin doors 234. The SBU Configuration Program 352 can call or cause to be called, a Bin Positioning Program 372 and can use program logic similar to an Unloading Program 370 to position and unlock revolving bins 276. A difference between how the SBU Configuration Program 352 works as compared to the Unloading Program 370 can be in how it determines which bins 276 to move and unlock. The SBU Configuration Program 352 can determine which bins 276 to move from the Master Bin Id associated with one or more of the Bin Id's in the scanned report barcode, and it can unlock all the revolving bin doors 234. The Unloading Program 370 can determine which bin to move and which revolving bin doors 234 to unlock from the information entered on the SBU keypad 244 by the package recipient. After the Bin Positioning Program 372 determines the required bin movement to position the revolving master bin 276 to be configured into the loading/unloading position, the SBU Configuration Program 352 can send a motor command to the motor controller 460 to move the revolving bins 276 the needed distance in the most efficient direction to position the revolving master bin to be configured into the loading/unloading position. The motor controller 460 can interpret the command, initiate the SBU motor 266 to turn in the most efficient direction, increment a count of signals as it receives them from the bin movement counting sensor components 402/416, and stop the movement of the revolving bins 276 when the bins have been moved the distance indicated in the motor command. After sending the motor command, the SBU Configuration Program 352 can send bin door configuration commands to the configuration bolt controller 267 to reposition the configuration bolts of the automated bin door configuration bolt mechanisms 406 as necessary. The configuration bolt controller 267 can interpret the commands and can trigger the automated bin door configuration bolt mechanisms 406 accordingly. After moving the master bin into the unloading position and unlocking the revolving bin doors 234, the SBU Configuration Program 352 can display the Master Bin Id and the desired Configuration Codes on the SBU display screen 246. The worker can open the consolidated bin doors 234, lift them up against the front panel 230 of the SBU, and use a configuration key to lock them into an open position by repositioning the cam bolt of the bin door positioning cam 404 to fit into the bin door positioning slot 405. The worker can use a configuration key to reposition the CDP's (294 and 298) of the revolving master bin 276 to achieve the bin configuration dictated by the Configuration Codes listed on the Configuration Adjustments Report and the SBU display screen 246.

Like the Unloading Program 370, whenever the SBU Configuration Program 352 moves the revolving bins 276 and the bin door configuration bolts of the automated bin door configuration bolt mechanisms 406, it can update the current SBUs 158 record on the SBU Settings table 1314 to account for the movements, step 1402. It can set Load Position Master Bin Id to the Master Bin Id of the bin moved to the unloading position and Door Configuration Code to the value that describes the current setting of each automated bin door configuration bolt mechanism 406. The Door Configuration Code can be an alphanumeric value, consisting of zeros and ones. It can have as many characters as there can be automated bin door configuration bolt mechanisms 406, and each character can represent an automated bin door configuration bolt mechanism 406 starting from left to right.

Zeros can be used, for example, to denote that an automated bin door configuration bolt mechanism 406 is in the dividing position. Ones can be used, for example, to denote that an automated bin door configuration bolt mechanism 406 is in the consolidating position.

The worker can continue to scan the barcodes underneath the SBU Id on the report and make the bin configuration adjustments to each master bin 276 as directed on the Configuration Adjustments Report and the SBU display screen 246. The SBU Configuration Program 352 can move a SBU's bins 276 regardless of whether the revolving bin doors 234 of that SBU 158 are closed. After all bin configuration adjustment changes for a SBU 158 are complete, the worker can, for example, scan a confirmation barcode, which can be listed on the last report line underneath the SBU Id, to confirm that all the bin configuration adjustments listed for that SBU 158 have been made. Upon receiving a confirmation tone and a confirmation message on the SBU display screen 246 for example, the worker can use a configuration key to unlock the revolving bin doors 234 from the open position. Confirmation tones and/or error tones can be sounded by a program of the automated system of storage locker bins through, for example, a barcode scanner 462. The worker can then lock the revolving bin doors 234 by firmly pushing them closed. The worker can then proceed to the SBUs 158 indicated by the other SBU Id's listed on the Configuration Adjustments Report, scanning their employee id card and making bin configuration adjustments on each one until the end of the report is reached. After all the bin configuration adjustments listed on the Configuration Adjustments Report have been made and confirmed, the SBU Configuration Program 352 can terminate.

A Configuration Adjustments Report can be split between two or more CDC workers making the bin configuration adjustments. Each worker can scan their employee id card before starting to make configurations to a SBU 158, allowing the program 352 to track the worker who made each bin configuration adjustment on the Configuration Adjustment Log table 1306.

In a further aspect of the invention, after a delivery shipment of bulk delivered packages has been received into a CDC by at least one CDC worker, a CDC worker can, for example, connect a hands-free barcode scanning device 462 to a CDC workstation 447 which can be capable of running programs of the automated system of storage locker bins. The worker can, for example, initiate a Loading Guide Report Program to run on the CDC workstation 447 and can use the hands-free barcode scanning device 462 to scan their employee id card and a barcode listed underneath the current CDC on a Delivery Shipments Report for the current CDC to accept the delivery shipment. The Delivery Shipments Report can be a report containing information about a delivery shipment bound for a CDC that could have been received from the driver delivering the delivery shipment of bulk delivered packages.

The Loading Guide Report Program can read the report barcode and parse the information it contains according to its standard format. The barcode on the Delivery Shipments Report can contain a Delivery Shipment Id, the Temperature Code, and the number of packages in the delivery shipment of each Package Size. The number of packages of each size can be listed in the barcode, for example, in increasing Package Size sequence, using a standard number of digits per Package Size. Due to the nature of how packages can be transported, packages received in the same delivery shipment can have the same Temperature Code. Packages having a Temperature Code value such as "refrigerated" or "freezer" can arrive in temperature-controlled vehicles that can maintain the temperature conditions required by each of those types of packages, while packages having a Temperature Code value such as "standard" can arrive, for example, in non-temperature controlled tractor-trailers. The Loading Guide Report Program can search the Bin Inventory table 1300 for the count of records of each Bin Size having the Temperature Code of the delivery shipment and a Status such as "available", and can compare that count of available bins against the package counts of each corresponding Package Size from the Delivery Shipments Report barcode to create a Loading Guide Report. Referring to FIG. 10B, the Loading Guide Report Program can read a High-Availability Bins data view 1307 before searching the Bin Inventory table 1300, so that it can search the Bin Inventory table 1300 for SBUs 158 having a large number of available bins, first, before searching for other SBUs 158 having less availability. Both data sets (SBU Id's with high availability and other SBU Id's) can be selected in SBU Id sequence. The automated system of storage locker bins can maintain the High-Availability Bins data view 1307 dynamically as the underlying Bin Inventory table 1300 is updated. The High-Availability Bins data view 1307 can list, for example, the SBU Id, Temperature Code, and Available Quantity of bins for SBUs 158 which have a quantity of available bins greater than a target number considered to indicate high availability (such as more than 50% of its bins are available). The setting for the number or percentage of bins available to be considered as indicating a high availability can be configurable and can be set differently on each automated storage system of locker bins. As the Loading Guide Report Program creates the Loading Guide Report, it can save the listing of SBU Id's needed to accept the packages of the smallest Package Size. In searching for SBU Id's to accept packages of each increasing Package Size, the Loading Guide Report Program can search the saved list of SBU Id's first, before searching selected SBU Id's with high bin availability, and then searching other SBU Id's. SBU Id's can be added to the list being saved for the report, during the search for bins of each Package Size, if the search for that Package Size is not satisfied by the existing saved list. The Loading Guide Report Program can print the Loading Guide Report as the final saved list of SBU Id's, in SBU Id sequence, once it has finished its search for all Package Sizes of the delivery shipment. The Loading Guide Report can list, for example, the total quantity of available bins of each Bin Size for each SBU Id that it lists.

In addition to printing the Loading Guide Report, the Loading Guide Report Program, can also for example, open a remote connection with an external system, such as an RDC processing server 448, of the regional distribution center (RDC) from which the bulk delivered packages of the delivery shipment could have been sent. After connecting to the RDC processing server 448, the Loading Guide Report Program can update data in the RDC's database to confirm, for example, that the packages of the delivery shipment have been received. Alternatively, an external system, such as the one running on the RDC processing server 448 can be given access to the database of the automated system of storage locker bins to enable it to create a Loading Guide Report. The database access can include, but should not be limited to read-only access to the following data tables and data views, for example, a Bin Inventory table 1300 and a High-Availability Bins data view 1307.

Figure 15:
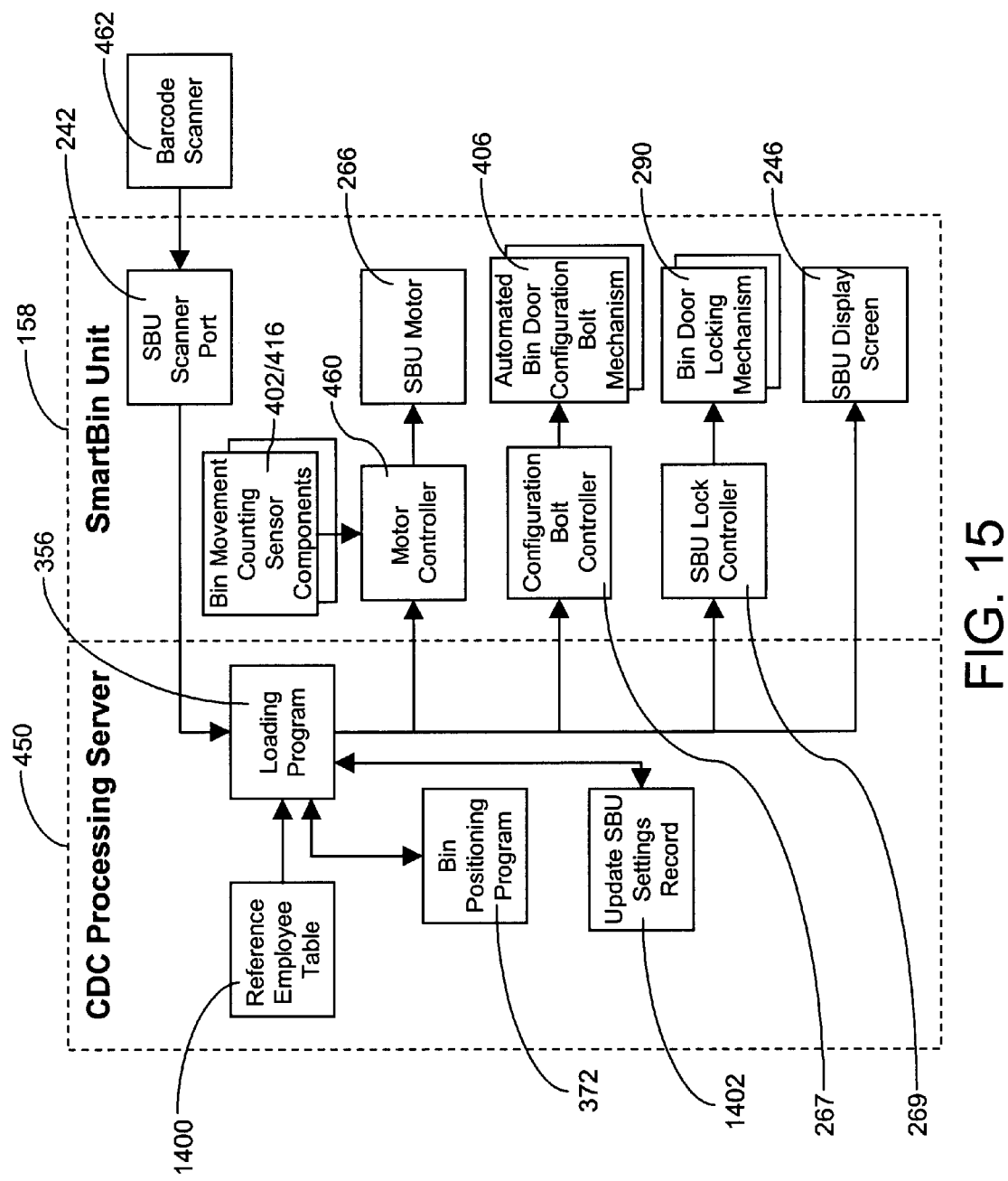
FIG. 15 is a diagram illustrating an exemplary flow of the programs, data functions, and electronic components of an automated system of storage locker bins that can be utilized in preparing the SBU of FIG. 1 to have bulk delivered packages or articles loaded into its revolving bins.

There is shown in FIG. 15, a diagram having an exemplary flow of programs, data functions, and electronic components of an automated system of storage locker bins that can be utilized in preparing a SBU 158 to have bulk delivered packages or articles loaded into its bins. Following the receipt of a delivery shipment of bulk delivered packages at a CDC, the bulk delivered packages can be loaded into the SBUs 158 as illustrated in step 1144 of FIG. 13. CDC workers can use the Loading Guide Report to guide them to the SBUs 158 with a high availability of bins or they can simply attempt to load packages into any SBU 158 they choose. To load the bulk delivered packages into a SBU 158, a CDC worker can, for example, connect a hands-free scanning device 462 into a SBU's scanner port 242 and can scan, for example, their employee id card and the SBU identifier barcode label 245 to activate a Loading Program 356 of the automated system of storage locker bins to run on the CDC processing server 450. The Loading Program 356 can reference the employee table to validate the scanned employee id card, step 1400. After validating the scanned employee id card, the Loading Program 356 can determine which revolving master bin 276 is closest to the loading position and has at least one available bin, so that it can move that bin into the loading position. To select the closest bin with a Status value such as "available", the Loading Program 356 can select the record from the SBU Settings table 1314 having the SBU Id scanned from the SBU identifier barcode label 245. With reference to FIG. 10C and FIG. 10D, the Loading Program 356 can use, for example, the value in the Load Position Master Bin Id field of the selected SBU Settings record 1314, to select all the Master Bin After Movement values for that master bin from a Master Bin by Movement table 1316. The Loading Program 356 can use each selected Master Bin After Movement value, in the sequence in which the fields can be listed on the Master Bin by Movement table 1316 (it can be sequenced by the lowest absolute value of a movement), to search the Bin Inventory table 1300 for the first record having, for example, the current SBU Id, a Status value such as "available", and a Master Bin Id value matching the selected Master Bin After Movement value. The first Bin Inventory record 1300 it finds meeting that criteria can contain the closest available bin. Once the Master Bin Id of the closest available bin is determined, the Loading Program 356 can call or cause to be called, a Bin Positioning Program 372 to determine the movement needed to position the selected master bin into the loading position. The Loading Program 356 can pass the Load Position Master Bin Id value for the current SBU 158 and the Master Bin Id value of the selected master bin (the one for the closest available bin) to the Bin Positioning Program 372 as inputs. The Bin Positioning Program 372 can use the input values to search a Bin Movement table 1315 for the movement required to move the selected master bin into the loading position. The Loading Program 356 can send a motor command to the motor controller 460 to move the revolving bins by the movement value returned from the Bin Positioning Program 372. Upon receiving the motor command, the motor controller 460 can interpret the command and control the SBU motor 266, using feedback that it can receive from the bin movement counting sensor components (402 and 416) to move the revolving bins in the most efficient direction to position the selected master bin into the loading position.

The Loading Program 356 can read a Door Configuration Code value from the SBU Settings record 1314 it had selected for the current SBU 158 and can determine the bin door configuration commands needed to move the configuration bolts of the automated bin door configuration bolt mechanisms 406 to consolidate all the revolving bin doors 234 to form one solid bin door across the entire revolving master bin 276. The Loading Program 356 can send the needed bin door configuration commands to the automated bin door configuration bolt mechanisms 406 on the revolving bin doors, and the bin door configuration bolts can be moved accordingly. In referring to sending a bin door configuration command to an automated bin door configuration bolt mechanism 406 in this disclosure, a program can be sending the command directly to the automated bin door configuration bolt mechanism 406 through wiring connecting each SBU 158 to the CDC processing server 450 or it can actually be sending the command to a configuration bolt controller 267, which in turn, can interpret the command and initiate the action through a wired connection to the automated bin door configuration bolt mechanism 406. If a configuration bolt controller 267 is used, it can be centralized to control all the automated bin door configuration bolt mechanisms 406 in a CDC or specific to a single SBU 158 or a group of SBUs 158. The program 356 can update the values on the SBU Settings record 1314 of the current SBU to reflect the bin movement and the bin door configuration bolt movement, step 1402. The program 356 can send an unlock command to the bin door locking mechanism 290 of each revolving bin door 234 to unlock all of the revolving bin doors 234. In referring to sending an unlock command to a bin door locking mechanism 290 in this disclosure, a program can be sending the command directly to the bin door locking mechanism 290 through wiring connecting each SBU 158 to the CDC processing server 450 or it can actually be sending the command to a SBU lock controller 269, which in turn, can interpret the command and initiate the action through a wired connection to the bin door locking mechanism 290. If a SBU lock controller 269 is used, it can be centralized to control all the bin door locking mechanisms 290 in a CDC or specific to a single SBU 158 or a group of SBUs 158. The program 356 can also send, for example, a display command to display the Master Bin Id and Configuration Codes of the master bin in the loading position, on the SBU display screen 246. The Loading Program 356 can also check the Status of the Bin Inventory records 1300 for the current SBU's stationary bins to determine if one or more of them have a Status such as "available". The Loading Program 356 can send an unlock command to the bin door locking mechanism 290 of one or more of the stationary bin doors 238, as needed, to unlock the bin doors 238 corresponding to available stationary bins.

Figure 16:
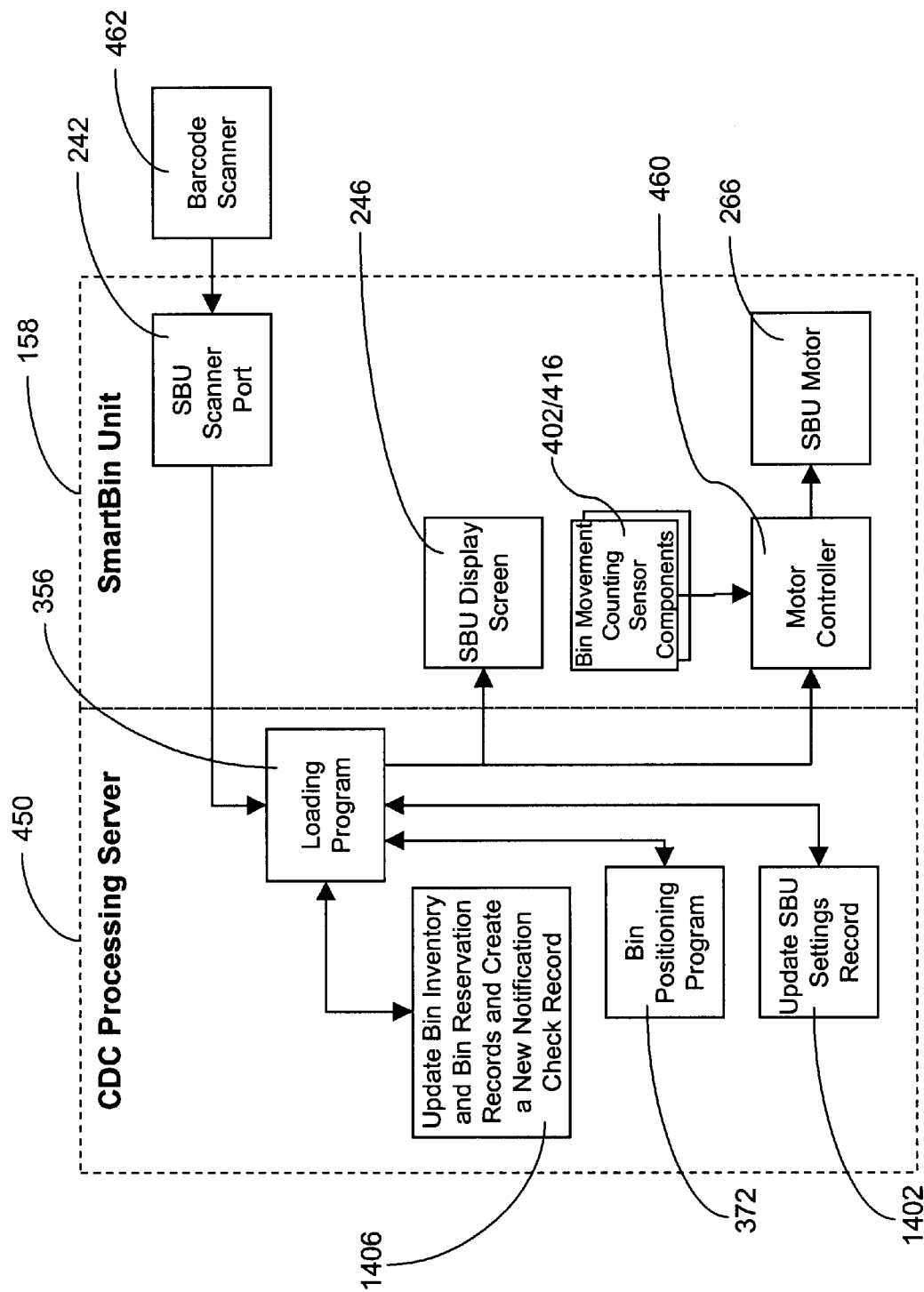
FIG. 16 is a diagram illustrating an exemplary flow of the programs, data functions, and electronic components of an automated system of storage locker bins related to loading articles into the SBU of FIG. 1.

There is shown in FIG. 16, a diagram having an exemplary flow of programs, data functions, and electronic components of an automated system of storage locker bins that can be utilized to load articles, such as bulk delivered packages, into the bins of a SBU 158. The loading of packages into the bins of the automated system of storage locker bins can be considered random in that a worker loading the packages does not need to find any specific bin for a specific package. The fact that any package having a size that is physically able to fit into the size of an available stationary bin or an available revolving bin in the loading position enables a worker to load a large quantity of packages rapidly, as the worker does not need to know anything about the package being loaded and can simply scan a package label and a bin door identifier label 286 (containing a bin identifier) as they place the package into the bin to quickly load packages with almost no opportunity for making an error.

A CDC worker can open the set of consolidated revolving bin doors 234 that the Loading Program 356 unlocked, lifting them up against the front exterior panel 230 of the SBU 158 and can insert a configuration key into the bin door positioning cam 404 on one of the doors 234 to lock the doors 234 into the open position—fully open, against the SBU 158, above the bin door openings of the revolving bins 276—with the cam bolt of the bin door positioning cam 404 locking into the bin door positioning slot 405. The worker can take a bulk delivered package, scan the package identifier of the barcode on its package label, and place it, for example, into the left-most available bin with the package tie handle facing out or to one side of the bin. An article identifier can be referred to as a package identifier (or Package Id). The worker can then scan the bin identifier of the barcode on the bin door identifier label 286 located on the inside of the bin door 234 of the bin in which the bulk delivered package was loaded. The worker can be using the barcode scanner 462 that was connected to the SBU scanner port 242 when the Loading Program 356 was initiated on the CDC processing server 450 to scan the package label and the bin door identifier label 286. In one embodiment, if a bin is configured to span across more than one revolving bin door 234, the bin door identifier label 286 on the left-most bin door 234 corresponding to the bin must be scanned. The Loading Program 356 can, for example, sound an error tone and/or display an error message, if a bin door identifier label 286 other than the leftmost one of an available bin gets scanned, or if a bin door identifier label 286 of a bin that already contains a package gets scanned, or if two package labels get scanned consecutively, or if two bin door identifier labels 286 get scanned consecutively. When a loading error occurs, the program 356 can also clear its memory of the package identifier (Package Id) that may have been scanned in the transaction prior to the error. If the bulk delivered package gets loaded successfully when a package label and then a bin door identifier label 286 are scanned, the Loading Program 356 can for example, sound a confirmation tone and/or display a message on the SBU's display screen 246, confirming that the package was loaded successfully. Confirmation tones and/or error tones can be sounded by a program of the automated system of storage locker bins through, for example, a barcode scanner 462.

As each bulk delivered package gets loaded into a SBU bin, the Loading Program 356 can update the Bin Inventory 1300 and Bin Reservation tables 1302 of the automated system of storage locker bins, and can create a new record on a Notification Check table 1310 of the automated system of storage locker bins, step 1406. The Loading Program 356 can read, for example, a Customer Id, embedded in the Package Id on the scanned package label, and can use it to select the Customer table record 1256 corresponding to the bulk delivered package. A Customer Id as referred to throughout this disclosure can be a data element containing an identifier of the recipient, and the Customer table 1256 can contain records with information specific to a recipient. The recipient may or may not also be a customer who ordered an item contained within the package destined for the recipient, but even when the recipient and the ordering customer are not the same person or entity, a Customer Id can be an identifier of the recipient. The Loading Program 356 can use the Employee Id on the scanned employee id card to select the ePD Shipper Id from the Employee table 1308. The Loading Program 356 can read the SBU Id and a bin door identifier, in the barcode on the scanned bin door identifier label 286, and can use that SBU Id to search the SBU Settings table 1314 to determine which master bin is in the loading position. The Loading Program 356 can then select the Bin Inventory record 1300 of the bin in which the bulk delivered package was loaded, by selecting the Bin Inventory record 1300 having the SBU Id of the scanned bin door identifier label 286, a Master Bin Id equal to the value of the Load Position Master Bin Id field on the SBU Settings record 1314 having that SBU Id, and a Configuration Code that contains the bin door identifier of the scanned bin door identifier label 286. The Loading Program 356 can update the selected Bin Inventory record 1300, for example: Package Id can be set to the value of the barcode scanned on the package label; Customer Id can be set to the Customer Id value embedded in the Package Id; PIN can be set to the value on the selected Customer record 1256; Status can be set to a value such as "loaded"; Delivery Employee Id can be set to the value scanned from the barcode on the employee id card; ePD Shipper Id can be set to value from the selected Employee record 1308; and Delivery Date/Time can be set to the current date/time, step 1406. The Loading Program 356 can select, for example, the Bin Reservation record 1302 having the Bin Size, Temperature Code, and ePD Shipper Id of the Bin Inventory record 1300 which it just updated and a Status such as "new", and can decrement its Quantity by one, step 1406. If more than one Bin Reservation record 1302 gets selected using Bin Size, Temperature Code, and ePD Shipper Id, the Loading Program 356 can update the one with the earliest Reservation Date/Time. When the Quantity of a Bin Reservation record 1302 reaches zero, the Loading Program 356 can set its Status to a value such as "filled". The Loading Program 356 can also create a new record on the Notification Check table 1310 by writing the Customer Id that was embedded in the Package Id on the new record 1310, step 1406.

If there is another available bin in the master bin in the loading position, after a bulk delivered package gets loaded, the worker is able to load another bulk delivered package using the same steps just described. When all the bins in the current master bin 276 are filled after a bulk delivered package is loaded, the Loading Program 356 can move the revolving bin structure 276 to position the closest remaining master bin 276, having at least one available bin, into the loading position. The Loading Program 356 can, for example, repeat the processing performed to move the closest available bin into the loading position, including calling or causing to be called, the Bin Positioning Program 372 to determine the movement needed to position the closest remaining available bin into the loading position and issuing a motor command to the motor controller 460. The motor controller 460 can work with the SBU motor 266 and the bin movement counting sensor components (402 and 416) to move the revolving bins 276 according to the determined motor command. In one embodiment, the program commands are not issued to move bin door configuration bolts or unlock revolving bin doors 234 as the Loading Program 356 subsequently positions each master bin 276 into the loading position, because the revolving bin doors 234 can already be locked into the open position. The worker can continue to load bulk delivered packages into available bins in this manner until the SBU 158 no longer has any available revolving bins.

Workers can also load bulk delivered packages into a SBU's 158 stationary bins by placing the bulk delivered package in the stationary bin, scanning its package label, and scanning the bin door identifier label 286 of the bin. In one embodiment, stationary bin doors 238 are not locked into or out of a loading position using a bin door positioning cam 404 and configuration key. When loading bulk delivered packages into a stationary bin, a worker can hold the stationary bin doors 238 open while placing the package into the stationary bin. Unlike the loading of bulk delivered packages into revolving bins, the Loading Program 356 does not confirm the bulk delivered package as being successfully loaded into a stationary bin until its stationary bin doors 238 get pushed closed to lock the stationary bin. After the program makes the updates to the Bin Inventory 1300 and Bin Reservation 1302 records and creates the new Notification Check record 1310 for the bulk delivered package (in the same manner as described for updating/creating records when packages are loaded into revolving bins), step 1406, it can display a message, for example, on the SBU display screen 246 to prompt the worker to close the bin door, and it can check the state of the bin door sensor components (400 and 401) (of the bin in which the bulk delivered package was loaded) to determine if the bin door or bin doors 238 have been closed. The Loading Program 356 can, for example, sound an error tone and display an error message if any scanning action is done before the bin doors 238 of the stationary bin into which the bulk delivered package was loaded, have been closed. When that bin door or bin doors 238 get closed, the Loading Program 356 can, for example, sound a confirmation tone and display a confirmation message on the SBU display screen 246. Other audio, or visual alerts may be utilized. A worker is not required to close the bin doors 238 of a stationary bin, unless a package has been loaded into that stationary bin. A stationary bin can be allowed to remain empty as the Loading Program 356 terminates.

When the Loading Program 356 unlocks bin doors (234 or 238) at its start, the bin doors (234 or 238) can be pushed out to rest upon bin door locking mechanisms 290, and the bin door locking mechanisms 290 can be set back into a locked position. The SBU bin door lock (for both revolving bins and stationary bins) can consist of, for example, three components: a two-pronged bin door locking mechanism 290 which can extend from the SBU frame, a bin door catch slot 280 in the bin door (234 or 238) into which the bin door locking mechanism 290 can fit to form the lock, and a spring-loaded bin door opening mechanism 292 which can extend outward from the SBU frame in its natural state when it is not compressed. In one embodiment, the SBU bin door locks may only be capable of unlocking a bin door (234 or 238). In this embodiment, a closed bin door can always be a locked bin door, and the lock movements that can be triggered by programs of the automated system of storage locker bins do not actually perform the locking function. A person applying pressure to the bin door (234 or 238) to close it can be the action that locks a bin door (234 or 238). It should be noted while the embodiment of the SBU bin door locks described can contain the specified components, other combination of components are possible without departing from the spirit of the invention.

When a SBU bin door (234 or 238) gets closed and locked, the prongs of the locking mechanism 290 can fit inside the bin door catch slot 280 and the heads of each prong can extend around the side edges of the catch slot 280 hooking it into a locked position. The spring action of the bin door opening mechanism 292 can be constantly trying to extend outward into its natural uncompressed position. Because the bin door opening mechanism 292 can be situated between the bin door (234 or 238) and its base component on the SBU frame, when the bin door opening mechanism 292 moves from a compressed state into its natural uncompressed state, it can push the bin door (234 or 238) away from the SBU frame. The bin door locking mechanism prongs 290, when hooked around the side edges of the catch slot 280, can prevent the bin door opening mechanism 292 from extending into an uncompressed state, as they can hold the bin door (234 or 238) into place against the SBU frame, forcing the bin door opening mechanism 292 to be compressed. When the bin door lock receives an unlock command from the CDC processing server 450, it can contract the two prongs of the locking mechanism 290 toward each other, into an unlocked position, where the prong heads 290 can be completely within the catch slot 280, no longer extending beyond the catch slot's 280 side edges. Since the prongs 290 no longer remain in position to secure the bin door (234 or 238), the spring action of the bin door opening mechanism 292 can then extend away from the SBU frame, pushing the bin door (234 or 238) away from the SBU frame and beyond the front end of the prong heads 290. When the unlock command has finished contracting the prongs 290, the prongs 290 can be released back into the locked position. Even though the prongs of the bin door locking mechanism 290 can be in the locked position, however, the bin door (234 or 238) can be unlocked because it has already been pushed out beyond the front edge of the prong heads 290 and can be resting in an unclosed position against the prongs 290 and the bin door opening mechanism 292. When a person applies pressure to push the bin door (234 or 238) closed, the catch slot 280 of the bin door can push against the angled front edges of the prong heads 290, forcing them to contract in toward each other until they are narrow enough to fit inside the side edges of the catch slot 280. As the bin door (234 or 238) continues to move toward the SBU frame and the prong heads 290 have passed completely inside the catch slot 280, the prong heads 290 can extend outward to their normal position hooking around the inside edges of the catch slot 280 in the locked position. The bin door opening mechanism 292 can become compressed as the bin door (234 or 238) is closed. The bin door sensor, which can have a door component 400 located in the bin door, can for example, make an electrical connection to a sensor frame component 401 located within the SBU frame to register a closed status once the bin door (234 or 238) is flat against the SBU frame (in referring to the SBU frame, the reference can also include the front exterior panel 230 and the bin door frame component housing 410). While a sensor utilizing an electrical connection between a sensor component 400 located within the bin door and another sensor component 401 located within the SBU frame can be a preferred option of detecting that the revolving bin doors 234 of a SBU 158 are closed, other sensing/detecting technologies can be employed without departing from the spirit of the invention. It should be understood by one skilled in the art that other sensor arrangements are possible without departing from the spirit of the invention.

When there are no available revolving bins 276 or stationary bins remaining in a SBU 158, the Loading Program 356 can, for example, sound a message alert tone and display a message requesting the worker to close the revolving bin doors 234. The action of closing the revolving bin doors 234 of a SBU 158 while the Loading Program 356 is running for that SBU 158, can end the Loading Program 356 for that SBU 158. A CDC worker can turn a configuration key in the bin door positioning cam 404 to release the revolving bin doors 234 from the open position, and the revolving bin doors 234 can fall against their corresponding bin door locking mechanisms 290. The worker can push the revolving bin doors 234 firmly against their locking mechanisms 290 until they get locked into place. As the Loading Program 356 determines that all the revolving bin door sensors (400 and 401) are registering a closed status, it can, for example, sound a confirmation tone, display a confirmation message that the program has ended successfully, and terminate. A worker can then disconnect their hands-free scanning device 462 or other suitable scanning device 462 from the SBU scanner port 242 and can proceed on to the next SBU 158 listed on the Loading Guide Report. If the worker did not close all of the revolving bin doors 234 to end the program 356 successfully, the Loading Program 356 can, for example, sound an error tone and display an error message, indicating that one of the revolving bin doors 234 has not been closed properly. In one embodiment, this validation step can occur when that worker tries to scan their employee id card and the SBU identifier barcode label 245 of another SBU 158 to log into that SBU 158. In another embodiment, a worker can scan the SBU identifier barcode label 245 of a SBU 158 to switch from loading one SBU 158 to another without scanning their employee id card, and the Loading Program 356 can perform the validation step to ensure that all the revolving bin doors 234 of a SBU 158 have been closed properly at the time the SBU identifier barcode label 245 of another SBU 158 is scanned. CDC workers do not have to be restricted to loading bulk delivered packages into SBU bins in any particular order. Although a Loading Guide Report can be used as a guide to make the package loading process more efficient by pointing workers toward the SBUs 158 with the most available bins, CDC workers can load packages into any available SBU bin, whether or not the SBU 158 is listed on a Loading Guide Report.

Optionally, a program can be used to create an exception report that can compare the Package Id's of packages having a particular Delivery Shipment Id (the bulk delivered packages in a particular delivery shipment) against the Package Id's on the Bin Inventory table 1300 of the CDC having the CDC Id embedded within that Delivery Shipment Id (the bulk delivered packages that have been loaded into bins at the CDC where that delivery shipment was delivered). This exception report can be created at either the CDC by a CDC worker before leaving for another CDC or by a worker at the RDC from which the delivery shipment of packages was sent.

Figure 17:
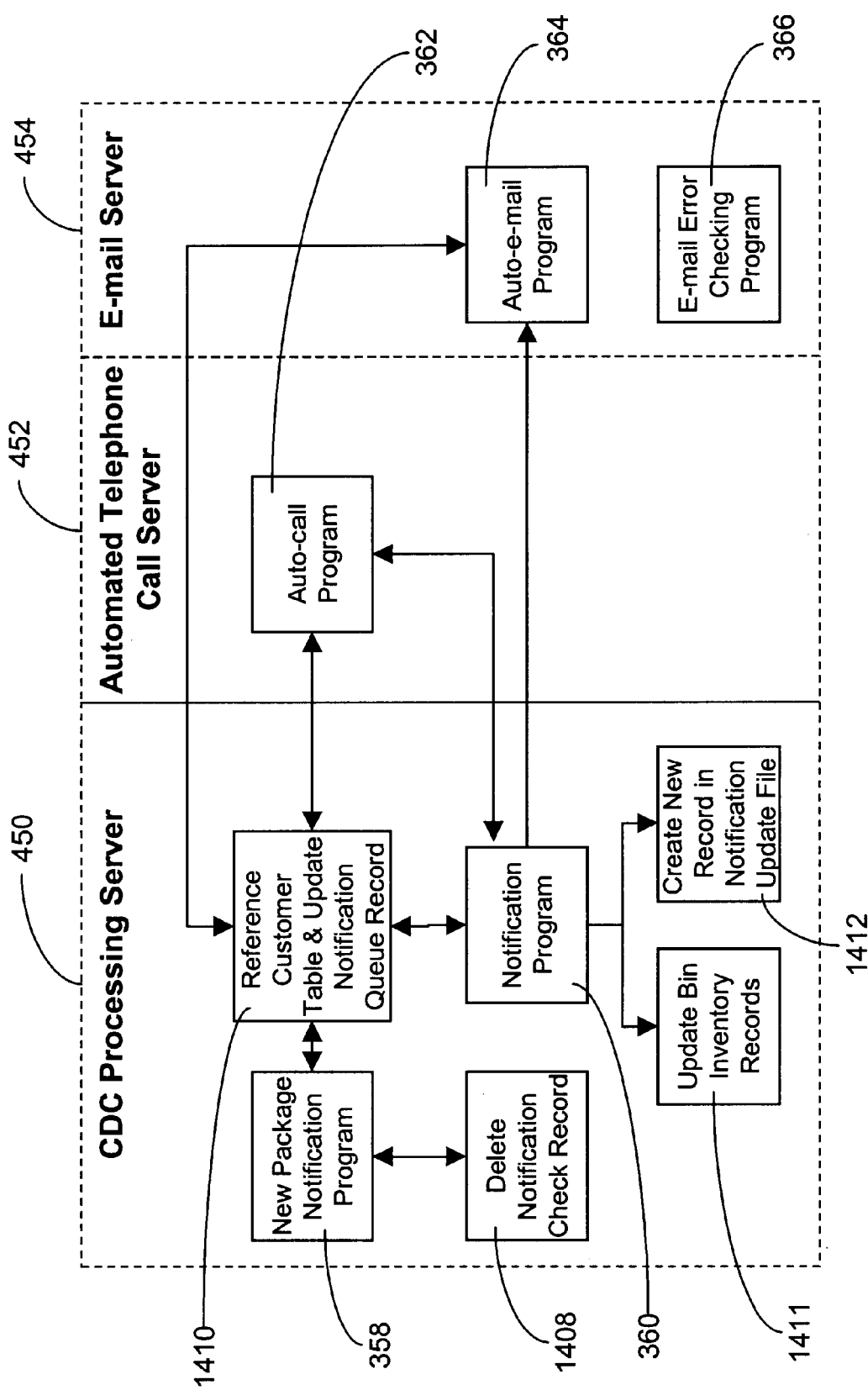
FIG. 17 is a diagram illustrating an exemplary flow of the programs and data functions of an automated system of storage locker bins related to sending electronic notifications to recipients.

There is shown in FIG. 17, a diagram having an exemplary flow of programs and data functions of an automated system of storage locker bins related to sending electronic notifications of delivery to recipients. Following the loading of bulk delivered packages into SBUs 158 as described in step 1144, notification contacts can be made according to step 1148. Recipients can receive electronic notification messages to alert them that bulk delivered packages have been delivered to a CDC for them. The electronic notification can be an automated message delivered by a telephone call, e-mail, facsimile machine, an alphanumeric pager, or any combination thereof. Several programs and tables can be employed by the automated system of storage locker bins to provide flexibility in the method and timing of sending electronic notification messages to recipients to alert or remind them that they have one or more bulk delivered packages ready to be picked up from a CDC. Recipients can be given a great number of choices in how and when they wish to be contacted by a shipper for bulk delivered package delivery notification. At a minimum, a recipient (which may or may not be the customer who ordered the items of the bulk delivered package) can be required to provide at least one phone number or e-mail address as their primary contact. A recipient can also provide secondary contact information and can choose to be contacted by both the primary and secondary contacts each time, or to be contacted using the secondary contact only when the primary contact fails. For each contact that a recipient provides to a shipper, the recipient can specify the type of contact (for example, a value such as "phone" for telephone, facsimile, or an alpha-numeric pager reached via a telephone number or a value such as "e-mail" for e-mail or an alpha-numeric pager reached via an internet address), the contact phone number or e-mail address, the frequency of which the recipient wishes to receive reminder messages after the initial notification message (which can be measured for example, in the number of hours between reminder messages), and if the contact type is a value such as "phone", the recipient can specify a calling window start time and end time. A recipient's notification preference information can be stored on their Customer record 1256, and can be updated, for example, through an interface connected to an ePD Billing & Maintenance application, which can be a web-page-based interface accessible by customers and recipients.

The programs and data functions related to triggering and automatically sending electronic notifications to recipients following the loading of packages destined for those recipients, as described herein, can be an integral part of the automated system of storage locker bins. In another embodiment, however, the automated system of storage locker bins may not trigger and automatically send or cause to be sent, the described electronic notifications directly, but data, such as package loading status information can be passed to another system, for example, grouped in batches at predefined time intervals, and the other system may trigger and/or send the electronic notifications.

A New Package Notification Program 358 can run as a service on a CDC processing server 450 or a remote server, to set up the information needed to trigger an electronic notification to a recipient. Referring to FIG. 10B, FIG. 10C, and FIG. 10D, the New Package Notification Program 358 can work with the Notification Check 1310 and Customer 1256 tables to create new and update existing records on a Notification Queue table 1311, step 1410. Records on a Notification Queue table 1311 can be used later by a Notification Program 360 to initiate an electronic notification to notify or remind a recipient to pick up at least one bulk delivered package at a CDC. The New Package Notification Program 358 can continually monitor and read the Notification Check table 1310 to find the Customer Id on records that were written as bulk delivered packages were loaded into SBUs 158. One Notification Check record 1310 can be created for each bulk delivered package that was loaded into a SBU 158 at a CDC. As the New Package Notification Program 358 reads each Customer Id on the Notification Check table 1310, it can search the Notification Queue table 1311 for a record having that Customer Id, to determine whether the recipient already has a record on the Notification Queue table 1311 or whether a new record should be added to the table for them. A recipient can already be on the Notification Queue table 1311 if the recipient was added for a different bulk delivered package that the recipient has not yet picked up. In one embodiment, a recipient may only have one Notification Queue record 1311 for a CDC at one time, and that record 1311 can remain until that recipient has unloaded all of their bulk delivered packages from the SBUs 158 of that CDC. If a recipient already has a record on the Notification Queue table 1311, the program 358 can update the recipient's existing record 1311, for example, by incrementing the Total Number of Packages field by one and setting the New Indicator field to a value such as "yes", step 1410. If the recipient does not already have a record on the Notification Queue table 1311, the New Package Notification Program 358 can use the Customer Id to select information from that recipient's record on the Customer table 1256, and create a new record for the recipient on the Notification Queue table 1311, step 1410.

The new record can be created on the Notification Queue table 1311 for the recipient, for example: the Customer Id can be set to the value on the current Notification Check record 1310; Record Date/Time can be set to the current date/time; Total Number of Packages can be set to "1"; New Indicator can be set to a value such as "Yes"; First Notification Date/Time, Last Primary Contact Date/Time, Last Secondary Contact Date/Time, and Next Contact Date/Time can have no value (depending upon the database management system a date/time field having no value can actually have a null value or an initialized date/time value); Number of Primary Attempts and Number of Secondary Attempts can be set to "0"; Next Primary Contact Date/Time and Next Secondary Contact Date/Time can have no value or can be set to the value of the Primary Calling Window Start Time and the value of the Secondary Calling Window Start Time (both from the Customer record 1256) respectively, depending upon the current time. If the current time precedes, for example, the value of the Primary (or Secondary) Calling Window Start Time field on the selected Customer record 1256, the value of the Next Primary (or Secondary) Contact Date/Time field on the Notification Queue record 1311 can be set to a date/time value consisting of the current date and the time of the Primary (or Secondary) Calling Window Start Time. If the current time is later than the Primary (or Secondary) Calling Window End Time field on the selected Customer record 1256, the value of the Next Primary (or Secondary) Contact Date/Time can be set to a date/time value consisting of the following date and the time of the Primary (or Secondary) Calling Window Start Time. If the current time is between the Primary (or Secondary) Calling Window Start Time and the Primary (or Secondary) Calling Window End Time, or if the primary (or secondary) contact does not have a calling window defined, the Next Primary (or Secondary) Contact Date/Time can have no value.

Whether the New Package Notification Program 358 updates an existing Notification Queue record 1311 or creates a new one when processing a Notification Check record 1310, it can delete the Notification Check record 1310 as part of its processing, step 1408. The program 358 can continue to read Notification Check records 1310 and perform the processing as previously described until there are no remaining records on the Notification Check table 1310. After it has processed and deleted all the records on the Notification Check table 1310, the New Package Notification Program 358 can monitor the Notification Check table 1310 for new records to process. The New Package Notification Program 358 can be configured to monitor the Notification Check table 1310 at predetermined intervals of time.

The Notification Program 360 is another program, which can run continuously on the CDC processing server 450 or on a remote server as a service. It can read the Notification Queue table 1311 and can, for example, compare the Next Contact Date/Time field of each record against the current date/time. If the Next Contact Date/Time has no value or a value prior to the current date/time, the Notification Program 360 can attempt to send an electronic notification to the recipient using the primary and/or secondary contact information. If the Next Contact Date/Time is later than the current date/time, the Notification Program 360 can skip the record and evaluate the next one. When the Notification Program 360 finishes reading the last Notification Queue record 1311 listed on the table, it can return to the first record on the table and repeat its processing to evaluate the remaining records on the table. If the Notification Program 360 is able to skip all the records listed on the Notification Queue table 1311 when making a full pass through the table to evaluate the records, it can begin another pass through the table to evaluate the records again, after optionally pausing for a predetermined amount of time. The length of time the Notification Program 360 pauses, if it pauses at all can depend upon how it is configured.

If the Notification Program 360 determines that an electronic notification should be sent to the recipient on a Notification Queue 1311 record, it can compare the Next Primary Contact Date/Time to the current date/time. If the Next Primary Contact Date/Time has no value or a value prior to the current date/time, the program 360 can use, for example, the value of the Customer Id field to select the Customer record 1256 of the recipient for which the notification is being sent, and can then use the data on the Notification Queue 1311 record and the selected Customer record 1256 to compile the input data needed to run either an Auto-call Program 362 or an Auto-e-mail Program 364. Before compiling the input data, the Notification Program 360 can evaluate the values of the Primary Contact Frequency field on the selected Customer record 1256 and the Last Primary Contact Date/Time on the Notification Queue record 1311. If the value of Primary Contact Frequency is zero and the Last Primary Contact Date/Time field has a value, the Notification Program 360 can skip the remaining processing steps involved in sending a notification message to the primary contact, and can evaluate the value of the Dual Notification Indicator on the Customer record 1256 to determine if it should compare the Next Secondary Contact Date/Time against the current date/time or begin processing the next Notification Queue record 1311. Recipients that specify that they do not wish to receive reminder notification messages after the first primary or secondary contact is made, can have a value of zero in the Primary (or Secondary) Contact Frequency field on their Customer records 1256.

If the value of the Primary Contact Frequency is not zero or if the Last Primary Contact Date/Time field has no value, the Notification Program 360 can calculate one input data value—the number of days since the first notification—by subtracting the First Notification Date/Time on the current Notification Queue record 1311 from the current date/time and rounding down to the number of whole days. The program can compile other input data values by selecting, for example, the Primary Contact Number/Address value from the Customer record 1256, the First Notification Date/Time, Total Number of Packages, and New Indicator values from the Notification Queue record 1311, the current date/time, and the value of the current CDC's address. The value of the current CDC's address can be pre-configured for the instance of the program 360 running on the CDC processing server 450 for the current CDC. If the value of Primary Contact Type on the selected Customer record 1256 is a value such as "phone", the Notification Program 360 can initiate the Auto-call Program 362 and pass it the compiled input data values. The Auto-call Program 362 can run on an automated telephone call server 452 and can use the Primary Contact Number/Address value to dial the recipient's phone number and play a pre-recorded message to notify or remind the recipient that there is at least one bulk delivered package at the CDC, ready to be picked up. The pre-recorded message can include at least the value of the current CDC's address, and can also include, but is not limited to, the current date/time, the value of the Total Number of Packages, an indication of whether or not a bulk delivered package has been delivered since the last notification message (determined from the New Indicator value), the number of days since the first notification (calculated as previously described), the First Notification Date/Time, general shipper policy information (including early pickup incentive discounts and late pickup penalties), contact information to submit questions, and other general information.

After the Notification Program 360 calls the Auto-call Program 362, it can increment the value of the Number of Primary Attempts by one on the Notification Queue record 1311, step 1410 and wait for the Auto-call Program 362 to finish its processing and return a confirmation output. If the Auto-call Program 362 returns an output indicating that an electronic notification message was sent successfully, the Notification Program 360 can update the Notification Queue record 1311, step 1410, for example: if the First Notification Date/Time has no value, it can be set to the current date/time; Last Primary Contact Date/Time can be set to the current date/time; Next Primary Contact Date/Time can be set to the current date/time plus the number of hours in the Primary Contact Frequency on the Customer record 1256 (adjusted to the next earliest Primary Calling Window Start Time if the calculated value does not fall between the Primary Calling Window Start Time and the Primary Calling Window End Time); Number of Primary Attempts can be set to zero; and if the value of the Dual Notification Indicator on the selected Customer record 1256 is a value such as "no", the Next Contact Date/Time can be set to the same value as the Next Primary Contact Date/Time field. The updates which can be made to the Notification Queue 1311 record by the Notification Program 360 can reset the record to trigger the sending of another electronic notification message to the Primary Contact Number/Address after the Primary Contact Frequency interval elapses.

In addition to updating the other fields on the Notification Queue record 1311 after receiving a successful confirmation output, the program 360 can evaluate the value of New Indicator field on the Notification Queue record 1311. If it is set to a value such as "yes", the program 360 can reset it to a value such as "no" and select records from the Bin Inventory table 1300 having a Status value such as "loaded" and a Customer Id equal to the value on the Notification Queue record 1311. The program 360 can update each selected Bin Inventory record 1300, for example, setting the Status to a value such as "notified" and Notification Date/Time to the value of the Last Primary Contact Date/Time, step 1411. The program 360 can also create, for example, a new record in a Notification Update data file for each Bin Inventory record 1300 it updates, writing the Package Id and Notification Date/Time from the updated Bin Inventory record 1300 to the data file, step 1412. If the New Indicator field being evaluated has a value such as "no", the program 360 can continue with its next processing step.

After updating the Notification Queue table 1311—step 1410, Bin Inventory table 1300 step 1411, and Notification Update data file records—step 1412, following the receipt of a successful confirmation output for a primary contact, the value of the Dual Notification Indicator on the selected Customer record 1256 can be evaluated. If the Dual Notification Indicator field has a value such as "no", the program 360 can proceed to process the next Notification Queue record 1311. If it has a value such as "yes" the Notification Program 360 can follow processing steps that can be similar to those described for sending an electronic notification message to the primary contact, except that the secondary contact information can be read and updated. One exception to secondary contact processing steps using secondary contact information can be that after a successful confirmation output is received by the Notification Program 360 for a secondary contact, the Notification Program 360 can update the Next Contact Date/Time to the same value as the Next Primary Contact Date/Time field, instead of the value of the Next Secondary Contact Date/Time field. In addition to when the Dual Notification Indicator for a recipient has a value such as "yes", there can be other situations in which the Notification Program 360 can use secondary contact information to send an electronic notification message. Those situations can include, but are not limited to: a situation where the Next Contact Date/Time and the Next Secondary Contact Date/Time are prior to the current date/time, but the Next Primary Contact Date/Time is later than the current date/time; and a situation where the output return received from the Auto-call Program 362 indicates that the primary contact attempt was unsuccessful.

If both the primary and secondary contact attempts are unsuccessful, the Notification Program 360 can proceed to process the next record listed on the Notification Queue table 1311. The Notification Program 360 can attempt to process the unsuccessful record 1311 again on each successive pass it makes through the Notification Queue table 1311, until the record 1311 gets updated as successful or the Number of Primary Attempts and Number of Secondary Attempts on the record 1311 reach a predefined limit. Once the predefined limits in the number of attempts fields are reached, the Notification Program 360 can reset the values in both number of attempts fields to zero and can reset the Next Contact Date/Time to a future date/time, which can be a predefined time interval ahead of the current date/time.

The Notification Program 360 can process primary and secondary contacts having a Primary (or Secondary) Contact Type value such as "e-mail" using the same processing steps as described for sending an electronic notification message for a contact having a Primary (or Secondary) Contact Type value such as "phone", except that it can initiate the Auto-e-mail Program 364 instead of the Auto-call Program 362 and it does not need to wait for a confirmation output return from the Auto-e-mail Program 364 before continuing its processing. The Notification Program 360 can assume notification e-mail messages to be sent successfully, and can update the Notification Queue table 1311—step 1410, Bin Inventory table 1300—step 1411, and Notification Update data file records—step 1412, in the same way as it would after receiving a successful confirmation output from the Auto-call Program 362, immediately after it initiates the Auto-e-mail Program 364. The Auto-e-mail Program 364 can run on an e-mail server 454 and can use the Primary (or Secondary) Contact Number/Address to send an e-mail message to the recipient. The same data input variables that can be passed to the Auto-call Program 362 can be passed to the Auto-e-mail Program 364 and the text of the prerecorded script used for the phone message can be the text of the e-mail message. The same updates can be made to the Notification Queue table 1311—step 1410, Bin Inventory table 1300—step 1411, and Notification Update data file records—step 1412, during processing. Although e-mail notification messages can be assumed to be sent successfully when transmitted, an E-mail Error Checking Program 366 can search the inbox of the internet account used by the Auto-e-mail Program 364 for returned e-mail error messages from unsuccessful e-mail transmissions. The Email Error Checking Program 366 can read the e-mail address reference in the returned e-mail error message, select the Customer table record 1256 containing that e-mail address value in either the Primary Contact Number/Address or Secondary Contact Number/Address, and create a record in a Notification Error data file containing the Customer Id, the e-mail address causing the error, and the Primary (or Secondary)

Contact Number/Address that did not cause the error. The Notification Error data file can later be used to contact recipients to correct invalid e-mail addresses.

In another embodiment the CDC processing server 450 can also serve as the e-mail server 454, eliminating the need for a separate e-mail server 454. If the CDC processing server 450 has the capability to generate telephone calls in the other embodiment, it can also serve as the automated telephone call server 452, eliminating the need for a separate automated telephone call server 452.

Figure 18:
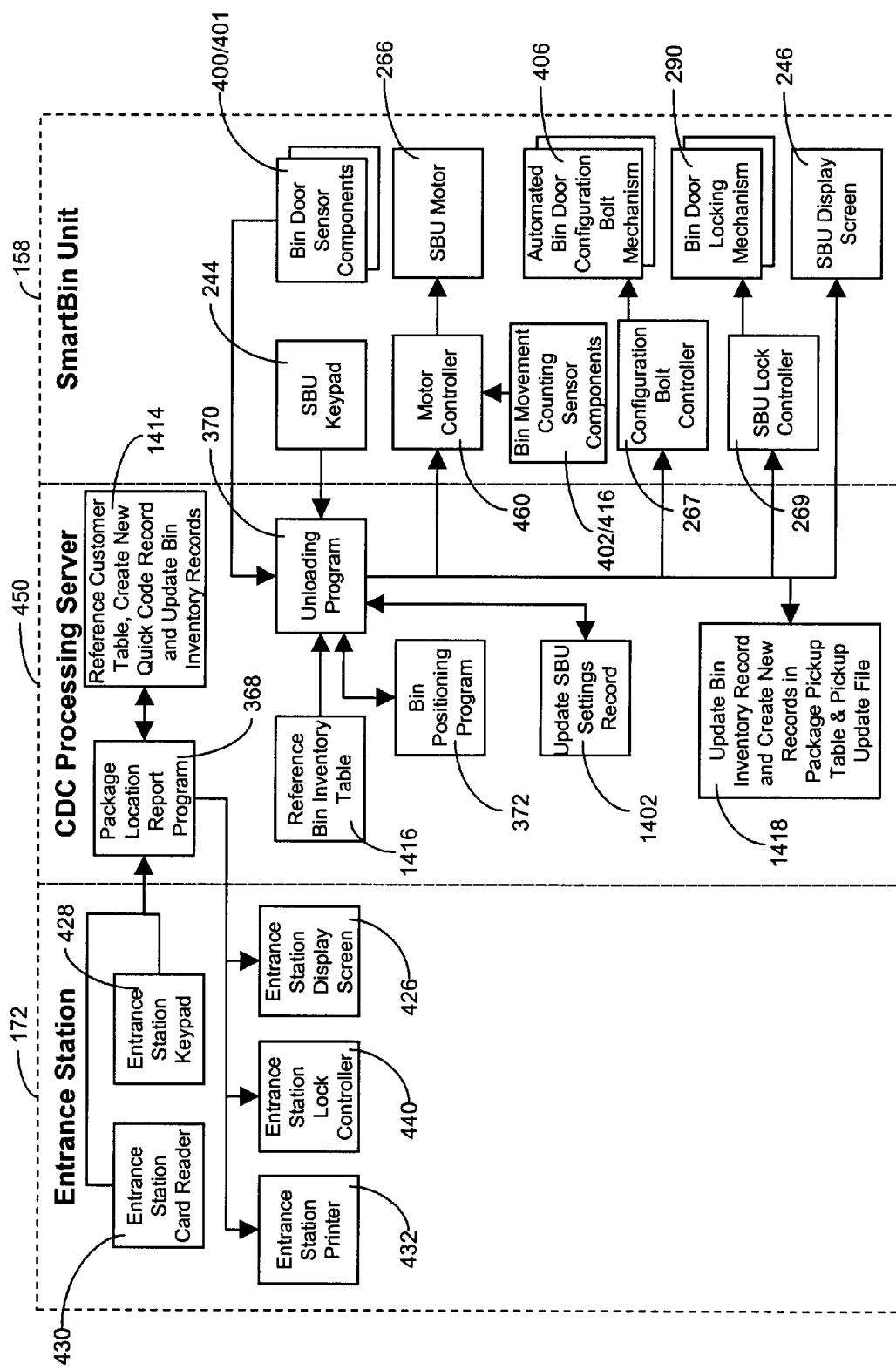
FIG. 18 is an illustrative diagram depicting a flow of the programs, data functions, and electronic components of an automated system of storage locker bins related to retrieving articles from the bins of the SBU of FIG. 1.

There is shown in FIG. 18, a diagram of an exemplary flow of programs, data functions, and electronic components of an automated system of storage locker bins related to retrieving a bulk delivered package or an article from the SBU of FIG. 1.

A recipient can retrieve (or pick up) one or more bulk delivered packages as described in step 1150. After receiving one or more notification phone calls, e-mails, or text page messages, a recipient can travel to the CDC identified in the notification message (the same CDC which the customer selected as the destination centralized pickup location when the customer ordered the items from retailers) to pick-up their bulk delivered packages. For illustration, the recipient can arrive at the CDC and enter the CDC through its main entrance. After entering the CDC, the recipient can proceed to one of the entrance stations 172 located in an inner entranceway area of the CDC. Each entrance station 172 can consist of the following components: a card reader 430, a keypad 428, a printer 432, a display screen 426, and an electronic locking door which can be controlled by an entrance station lock controller 440. The components can be wired to the CDC processing server 450 through connections, such as networking cables, to pass data from the card reader 430 and keypad 428 components to the CDC processing server 450 and to pass commands and data from the CDC processing server 450 to the display screen 426, printer 432, and lock controller 440 of the entrance station 172. In one embodiment, the entrance station printer 432 can be a tape printer that prints information on a roll of tape, such as adding machine tape. In other embodiments other types of printers of various sizes can be utilized as part of an entrance station 172, including thermal transfer, laser, ink jet, or dot matrix printers or any combination thereof.

The recipient can run their ePD customer access card through the entrance station card reader 430 and can key in their personal identification number (PIN) on the entrance station keypad 428. An ePD customer access card can have, for example, a magnetic data strip that can contain at least the recipient's Customer Id and can optionally include other data used for security validation or other purposes. The recipient's actions can initiate or cause to be initiated, an instance of a Package Location Report Program 368 to run on the CDC processing server 450. The Package Location Report Program 368 can validate the scanned card and entered PIN by using the Customer Id on the access card to select the Customer record 1256 and then comparing the entered PIN value against the PIN value on the selected Customer record 1256. If the entered PIN does not match, the Package Location Report Program 368 can, for example, sound an error tone and/or display an error message on the entrance station display screen 426 to indicate that the entered PIN is not valid for the access card. Alternately, other audio and or visual alerts can be used. Also, in another embodiment a fingerprint authentication device can be incorporated as part of an entrance station 172, and it can be used in place of an access card reader 430 and keypad 428, or in conjunction with either one or both of them, to authenticate the identity of a recipient. If the entered PIN matches, the Package Location Report Program 368 can search the Bin Inventory table 1300 for all the records that have a Customer Id equal to the one read from the access card. The Package Location Report Program 368 can generate and assign, for example, a Quick Code to all of the Bin Inventory records 1300 found for the recipient (having the Customer Id of the scanned access card), step 1414. The Quick Code can serve as a temporary alias for a recipient's Customer Id and can be a random number, for example, four digits in length. The automated system of storage locker bins can include a Quick Code Reset Program, which can be used to reset (delete all Quick Code records from) the Quick Code table 1313. The Quick Code Reset Program can be scheduled to run at a different frequency in each CDC. In one embodiment, the Quick Code Reset Program can be scheduled to reset the Quick Code table 1313 each night.

Prior to generating a new Quick Code for a recipient, the Package Location Report Program 368 can search a Quick Code table 1313 for the Customer Id read from the access card to determine if the recipient already has an active Quick Code. If the recipient had previously used their customer access card to enter the CDC, following the last time a Quick Code Reset Program had been run for that CDC, the recipient can already have an active Quick Code. If a recipient already has an active Quick Code, instead of generating a new Quick Code for the recipient, the Package Location Report Program 368 can read that active Quick Code from the record on the Quick Code table 1313 having that recipient's Customer Id and can write that active Quick Code to the Bin Inventory records 1300 selected using the recipient's Customer Id, step 1414. If the recipient's Customer Id is not found on the Quick Code table 1313, by the Package Location Report Program 368, the program 368 can generate a new random number as a Quick Code for the recipient, step 1414. In generating a random number for the Quick Code, the Package Location Report Program 368 can validate the combination of the recipient's PIN and the generated random number against the Quick Code table 1313 to ensure that the generated random number and PIN combination is not already active for another recipient. If the Package Location Report Program 368 finds the randomly generated number in combination with the same PIN number on the Quick Code table 1313 it can attempt to generate a different random number to combine with the recipient's PIN and can check it against the Quick Code table 1313 to ensure that the combination is not already in use for a different recipient. When the Package Location Report Program 368 generates a Quick Code number that is not already listed in combination with a PIN matching the current recipient's PIN on the Quick Code table 1313, it can create a new record on the Quick Code table 1313 by writing that number in the Quick Code field and writing the recipient's Customer Id and PIN to the Customer Id and PIN fields on the Quick Code table 1313, step 1414. The Package Location Report Program 368 can also write that Quick Code number to the Quick Code field of each Bin Inventory record 1300 it selected for that recipient, step 1414. Recording assigned Quick Code numbers to the Quick Code table 1313 can ensure that no two recipients will have the same combination of Quick Code and PIN at a given CDC over a certain time period until Quick Codes are reset.

After assigning Quick Codes to the Bin Inventory records 1300 selected for the recipient, the Package Location Report Program 368 can create a Location Report listing the Quick Code and all the SBU Id numbers of the selected Bin Inventory records 1300. The Location Report can be printed on the tape printer 432 at the entrance station 172 where the recipient inserted their ePD customer access card and entered their PIN number. The Location Report can be formatted to have, for example, the Quick Code printed on the top line next to a heading such as "Quick Code=", a blank second line, and a listing of each SBU Id on a separate line below an underlined header such as "SBU locations". The SBU locations can be listed in SBU Id sequence, and if a recipient has more than one bulk delivered package in a SBU 158, that SBU 158 can be listed once for each bulk delivered package that it holds for that recipient. After printing the report, the Package Location Report Program 368 can send a command to the lock controller 440 of that entrance station 172 to unlock and automatically open the entrance station door (442 and 436) for a short period of time, allowing the recipient to grab the report from the tape printer 432 and enter the CDC.

Basic information about using an entrance station 172 can be posted in the inner entranceway area near the entrance stations 172, including a message to tell recipients to press an instructions key on the entrance station keypad 428 to print detailed instructions on how to operate an entrance station 172, read a Location Report, and operate a SBU 158. When recipients press the instructions key on the entrance station keypad 428, the CDC processing server 450 can print a standard instructions report on the entrance station printer 432 listing the basic instructions on how to maneuver through the CDC.

Continuing with the illustrative example, after passing through the entrance station door (442 and 436), the recipient can walk through the aisles of the CDC using posted SBU location number range signs and/or SBU row identifier signs 249 to guide them to the SBUs 158 listed on their Location Report. Each SBU 158 can be labeled with a SBU identifier label 233 containing the readable SBU Id of the SBU 158. Upon arriving at each SBU 158 listed on their report, the recipient can key in the Quick Code listed on their report and their PIN using the SBU's keypad 244 to retrieve each bulk delivered package listed on their Location Report from an SBU 158. When the Quick Code and PIN are keyed in, the information can be passed through the SBU 158 and sent to the CDC processing server 450 along with the SBU Id of the SBU 158. An Unloading Program 370 of the automated system of storage locker bins can be initiated to run on the CDC processing server 450, and it can search the records on the Bin Inventory table 1300 having the SBU Id of the SBU 158 from which the data was sent. The Unloading Program 370 can search the Bin Inventory records 1300 corresponding to that SBU's bins for the Quick Code and PIN entered by the recipient, step 1416. The Unloading Program 370 can search for the Bin Inventory records 1300 corresponding to a SBU's stationary bins before searching for the records 1300 corresponding to its revolving bins 276. If the Unloading Program 370 finds a stationary bin's Bin Inventory record 1300 having a Quick Code and PIN that matches the values entered by the recipient, it can send a display command to the SBU display screen 246 to display the bin door number or numbers corresponding to the bin containing the recipient's bulk delivered package. The Unloading Program 370 can also send unlock commands to the SBU lock controller 269 to cause the bin door locking mechanisms 290 of one or more of the stationary bin doors 238 to unlock, opening one or more bin doors 238 of a stationary bin containing the recipient's bulk delivered package (the number of bin doors 238 which need to be opened can depend upon the configuration of the stationary bin). The Unloading Program 370 can also, for example, write a new record to a Package Pickup table 1312 and a Pickup Update data file, and can update the selected Bin Inventory record 1300 to initialize it as an available bin, step 1418.

The Package Pickup table 1312 of the automated system of storage locker bins can have all the same fields as the Bin Inventory table 1300 except for Status. It can also have two additional fields that are not on the Bin Inventory table 1300—CDC Id and Pick-up Date/Time. To create the new Package Pickup record 1312, the Unloading Program 370 can copy all the data from the Bin Inventory record 1300 except for Status, step 1418. On the new Package Pickup record, CDC Id can be set to the value of the current CDC in which the application is running, and Pick-up Date/Time can be set to the current date/time. The Unloading Program 370 can create the new Pickup Update data file record, step 1418, by writing the Package Id from the selected Bin Inventory record 1300 and the Pickup Date/Time as the current date/time. To initialize the Bin Inventory record 1300 as an available bin, the Unloading Program 370 can set its Status equal to a value such as "available" and can delete the values from the data fields related to the bulk delivered package—Customer Id, PIN, Quick Code, Package Id, Delivery Employee Id, Shipper Id, Delivery Date/Time, and Notification Date/Time, step 1418.

If the Unloading Program 370 locates a revolving bin's Bin Inventory record 1300 matching the Quick Code and PIN, it can call or cause to be called, the Bin Positioning Program 372 to determine the movement needed to position the master bin containing the recipient's bulk delivered package into the unloading position. Before calling the Bin Positioning Program 372, the Unloading Program 370 can determine which master bin is currently in the unloading position for the current SBU 158 by selecting the Load Position Master Bin Id value from the SBU Settings table 1314. The Unloading Program 370 can pass the values of the selected Load Position Master Bin Id and the Master Bin Id (from the selected Bin Inventory record 1300) of the bin containing the recipient's bulk delivered package to the Bin Positioning Program 372. The Bin Positioning Program 372 can use the Load Position Master Bin Id value to search a Bin Movement table 1315 for the movement required to move the master bin 276 containing the recipient's bulk delivered package into the unloading position. The Bin Movement table 1315 can show the movement needed to move the selected bin into the unloading position, relative to the unloading position if moving in a clockwise direction (when referring to bin movement in this disclosure, moving a SBU's front bins upward and back bins downward is considered a clockwise direction). For example, if the selected Master Bin Id is "05" and the Master Bin Id currently in the unloading position is "03", the movement needed to move Master Bin Id "05" into the unloading position can be "−2". Since master bins can be numbered in the clockwise direction, Master Bin Id "05" can be two positions beyond the unloading position in the clockwise direction in this example, and would need to be moved counterclockwise for a distance of two positions. In another example, where the SBU 158 has a total of eighteen bins, the selected Master Bin Id is "17" and the Master Bin Id in the unloading position is "03", the required movement needed to move Master Bin Id "17" into the unloading position can be "4", because "17" can be four positions away from the unloading position in the counterclockwise direction and therefore would need to be moved four positions in the clockwise direction to reach the unloading position. If the master bin containing the recipient's bulk delivered package is already in the unloading position the Bin Positioning Program 372 can calculate the required movement to be "0" and bypass the step of sending a motor command to the motor controller 460 of the SBU 158.

After determining the movement required to move the master bin 276 containing the recipient's bulk delivered package into the unloading position, the Unloading Program 370 can check all the bin door sensors (400 and 401) on the revolving bin doors 234 to make sure that all the revolving bin doors 234 are in the closed position before moving the master bins 276. If any of the revolving bin doors 234 are not fully closed (and thus locked), the Unloading Program 370 can display a message on the SBU's display screen 246 to request the recipient to close the revolving bin doors 234. The SBU 158 can continue to display the message and refrain from performing any other actions until the doors 234 are closed. Once all the revolving bin doors 234 are in the closed position, the Unloading Program 370 can send a motor command, with the bin movement calculated by the Bin Positioning Program 372, to the motor controller 460 to move the selected master bin 276 into the unloading position. The motor controller 460 can control the SBU motor 266 to move the selected revolving master bin 276 into the unloading position, using the feedback signals that it receives from the bin movement counting sensor components (402 and 416) to determine when the selected master bin 276 is in the unloading position.

The program 370 can also send a display command to the SBU display screen 246 to display the bin door identifier number or numbers corresponding to the bin containing the recipient's bulk delivered package. The program 370 can also send configuration commands to a configuration bolt controller 267 to reposition the bin door configuration bolts of one or more automated bin door configuration bolt mechanisms 406, arranging the bin door configuration bolts into the correct sequence for the Configuration Code of the selected bin. The Unloading Program 370 can check the value of the Door Configuration Code field on the SBU Settings record 1314 having the current SBU Id to find the current configuration of the revolving bin doors 234, and can compare it to the Configuration Code on the Bin Inventory record 1300 of the bin containing the recipient's bulk delivered package to determine the needed configuration commands. If the configuration bolts are already in a workable sequence for the selected bin, then configuration commands may not need to be sent. When the SBU motor 266 and automated bin door configuration bolt mechanisms 406 have completed their actions successfully, the Unloading Program 370 can send unlock commands to the SBU lock controller 269 to cause the bin door locking mechanisms 290 of one or more of the revolving bin doors 234 corresponding to the configuration of the selected bin to unlock, opening the doors 234 of the bin containing the recipient's bulk delivered package. After successfully unlocking the revolving bin doors 234, the Unloading Program 370 can create and update records in a manner consistent with the way it does when it unlocks a stationary bin, writing a new record to the Package Pickup table 1312 and the Pickup Update data file, and updating the Bin Inventory record 1300 to initialize it as an available bin, step 1418. The Unloading Program 370 can also update the SBU Settings table 1314 when it unlocks a revolving bin, setting the Load Position Master Bin Id equal to the Master Bin Id value of the selected bin and the Door Configuration Code to the value which describes the current position of the bin door configuration bolts, step 1402.

If the SBU 158 gets listed on the recipient's Location Report more than once, indicating that there is more than one bulk delivered package for that recipient in that SBU 158, the recipient can re-enter the Quick Code and PIN for each bulk delivered package listed to retrieve the bulk delivered packages one at a time. This can ensure that the recipient makes an effort to receive each bulk delivered package and can eliminate the potential problems of opening several bins from one recipient action. An example of such a problem being that a recipient can retrieve fewer bulk delivered packages than the number released from a SBU 158 and can leave one or more bulk delivered packages behind, which could be taken by another person.

The programs and tables of the automated system of storage locker bins can track information that can be used by shippers to administer financial incentives when bulk delivered packages get picked up early or financial penalties when bulk delivered packages get picked up late. The data used to track recipient pick up activity can be captured on the Package Pickup table 1312 as recipients remove their bulk delivered packages from SBU bins. Pickup Date/Time can be compared against Notification Date/Time on the Package Pickup table 1312 to determine how long a bulk delivered package remained in a SBU bin following delivery notification. A running total of the net cumulative incentive discount or penalty charge can be calculated and tracked for each shipper or in total across all shippers, for a customer or recipient, in a field such as an ePD Account Balance field on a Customer record 1256.

If a recipient accidentally locks a SBU bin with their bulk delivered package still inside, for example, by pushing it closed when trying to retrieve the bulk delivered package from the SBU 158, the recipient can open the bin again, for example, by pressing a "re-open" key or key sequence on the SBU keypad 244 and then keying in their Quick Code and PIN again. The reopen feature can re-open a bin on a SBU 158 that the recipient had previously opened, using the same entered Quick Code and PIN. When the recipient presses the "re-open" key or key sequence, the SBU 158 can send a re-open request including the SBU Id and the entered Quick Code and PIN to the CDC processing server 450. A Re-open Program of the automated system of storage locker bins can be initiated and can search the Package Pickup table 1312 for a record matching the SBU Id, Quick Code, and PIN sent from the SBU 158. If the recipient had retrieved more than one bulk delivered package from the SBU 158, the Re-open Program can select all the records 1312, and process them in sequence of Pick-up Date/Time starting with the latest one. The Re-open Program can function in the same way as the Unloading Program 370 with some exceptions. Instead of reading data from the Bin Inventory table 1300, the Re-open Program can read data from the Package Pickup table 1312. The Re-open Program doesn't need to update a Bin Inventory record 1300 to initialize it. The Re-open Program doesn't write new records to the Package Pickup table or the Pickup Update data file. Also, after the Re-open Program finds the Bin Id on the Package Pickup table 1312, it can check the Status of that Bin Id on the Bin Inventory table 1300 prior to taking any action. If the Status is a value such as "available", "re-open", or "configuration reserved" the Re-open Program can perform the actions required to re-open the bin. If the Status does not equal a value such as "available", "re-open", or "configuration reserved" the Re-open Program can check the next selected Package Pickup record 1312 if more than one was selected, until it finds one having a corresponding Bin Inventory record 1300 with a Status value such as "available", "re-open", or "configuration reserved". If the Re-open Program cannot find a Bin Id on a selected Package Pickup record 1312 which has the appropriate status on its corresponding Bin Inventory record 1300, the Reopen Program can, for example, sound an error tone and/or displays an error message indicating that there are no bins in the SBU 158 corresponding to the entered Quick Code and PIN.

The re-open feature can be used when a recipient mistakenly pushes the bin door (234 or 238) closed when trying to retrieve their bulk delivered package. In that situation, the Re-open Program can re-open a stationary bin or a revolving bin that is already in the unloading position. If the recipient does not use the re-open feature immediately after closing the bin door (234 or 238) (if they are unaware of the re-open feature and confused as to what to do), they can come back at a later time and use the re-open feature to retrieve their bulk delivered package. If a recipient does come back to use the re-open feature at a later time, the Re-open Program can move the bin containing the recipient's bulk delivered package to the unloading position before unlocking the bin, if the bins have been moved since the recipient originally tried to retrieve the bulk delivered package. When loading bulk delivered packages into a SBU 158, if a CDC worker comes across a bin having a bulk delivered package in it and a Bin Inventory record 1300 with a Status value such as "available", the worker can update the Status of the Bin Inventory record 1300 corresponding to the bin, changing it from a value such as "available" to a value such as "re-open". The worker can, for example, scan a "re-open" status update barcode on their scan commands sheet, the package label barcode of the bulk delivered package already in the bin, and the bin door identifier label 286 of the bin containing the bulk delivered package to cause the Loading Program 356 to update the Bin Inventory record 1300 corresponding to that bin to reflect that the bulk delivered package has been 'reloaded' with a Status value such as "re-open". In this situation, the CDC worker should not remove the bulk delivered package and load another bulk delivered package into the bin. If the bulk delivered package becomes lost, the next worker to load a bulk delivered package into a bin which previously contained a bulk delivered package that a recipient has claimed to have not retrieved can be easily identified.

Following the notification update step 1148, the retailer billing step 1138 can occur. The retailer billing step 1138 can be performed by a system which can be external to the automated system of storage locker bins. At least a part of the information needed for the retailer billing step 1138 can be provided by the automated system of storage locker bins, as the Notification Update data file that was created by the storage system when notification contacts were made in step 1148 can be sent from the CDC processing server 450 to the RDC server 448 or another external server which can be used to bill retailers for delivered items, at predefined intervals. While the billing function itself may be out of the scope of the current invention, it should be noted that the information provided by the storage system of the current invention can provide information, which can enable a customer who ordered items within delivered package, a recipient of the package, a retailer who sold the items in the package, and/or another party, associated with sending the items of the package to the CDC for the recipient, to be billed for the delivered items of a package for which an electronic notification has been sent to a recipient.

In another embodiment of the invention, a wireless network architecture can be used at a CDC to connect SBUs 158 and/or entrance station 172 components to a CDC processing server 450. The type of technology enabling a wireless network at a CDC can be radio frequency (RF), home RF, Bluetooth, WAP, and/or any other suitable type of wireless networking technology. An in-building wireless system employing, for example, TDMA, CDMA, AMPS or GSM can be used. One example of using a wireless network architecture can involve using a RF system in a CDC. In this exemplary embodiment, a CDC worker can use a hands-free scanner 462 connected to the CDC processing server 450 of a CDC via a RF system. The worker can scan their employee id card to log in to the Loading Program 356 and can then scan a SBU identifier barcode label 245 on the outside of one of the SBUs 158. The worker can then scan package labels followed by bin door identifier labels 286 as the worker loads bulk delivered packages into that SBU 158. The Loading Program 356 can function in the same way in response to the scans of a scanning device 462 connected via a wireless network in this embodiment, as it would to the scans of a physically connected scanning device 462 in the main embodiment. The wireless aspect of this exemplary embodiment can allow a CDC worker to load bulk delivered packages into the bins of many SBUs 158 without needing to plug and unplug a network connector in and out of the scanner port of each SBU 158. Where the scanning device 462 can have a unique identity that can be associated with it and transmitted through the wireless network to the Loading Program 356, the program 356 can allow a CDC worker to load packages into different SBUs 158 without having to physically connect to the SBU 158 or having to re-scan their employee id card at each SBU 158. The Loading Program can associate the loading actions at each of those SBUs 158 with their Employee Id from the first time that the employee id was scanned and associated with the unique identity of the scanning device 462. These two features—not needing to physically connect the scanning device 462 to the SBU 158 and not needing to rescan the employee id for each SBU 158—can both be enabled as part of an embodiment in which a wireless data architecture is used in a CDC, or each feature can be enabled without the other in other separate embodiments.

In a further embodiment of the invention, each moveable master bin 276 (whether moveable in a revolving or rotating motion) can have its own set of bin doors 234 and bin door locking mechanisms 290 built into it. Wiring could run from the SBU lock controller 269 to the bin door locking mechanisms 290 built into each moving bin. The wiring connected to each bin door locking mechanism 290 could be bundled together into a single bundle of wiring that could run along one side of the set of moving bins and extend from the set of moving bins at one point to connect to the SBU lock controller 269. The wiring bundle could be long and flexible enough to allow for the fixed point, at which it can be connected to the set of moving bins, to rotate around the axis with the moving bins. Alternately, a mechanism can be employed in this embodiment to push the bin doors 234 locked and closed as the moveable bins are moved from the loading/unloading position to ensure that the doors 234 are closed and locked as the moveable bins are moved around an axis. Bin door sensors (400 and 401) would not be needed for the moving bins of this alternative of this embodiment, although they could still be utilized on the stationary bins of an SBU of this alternative of this embodiment.

Figure 19:
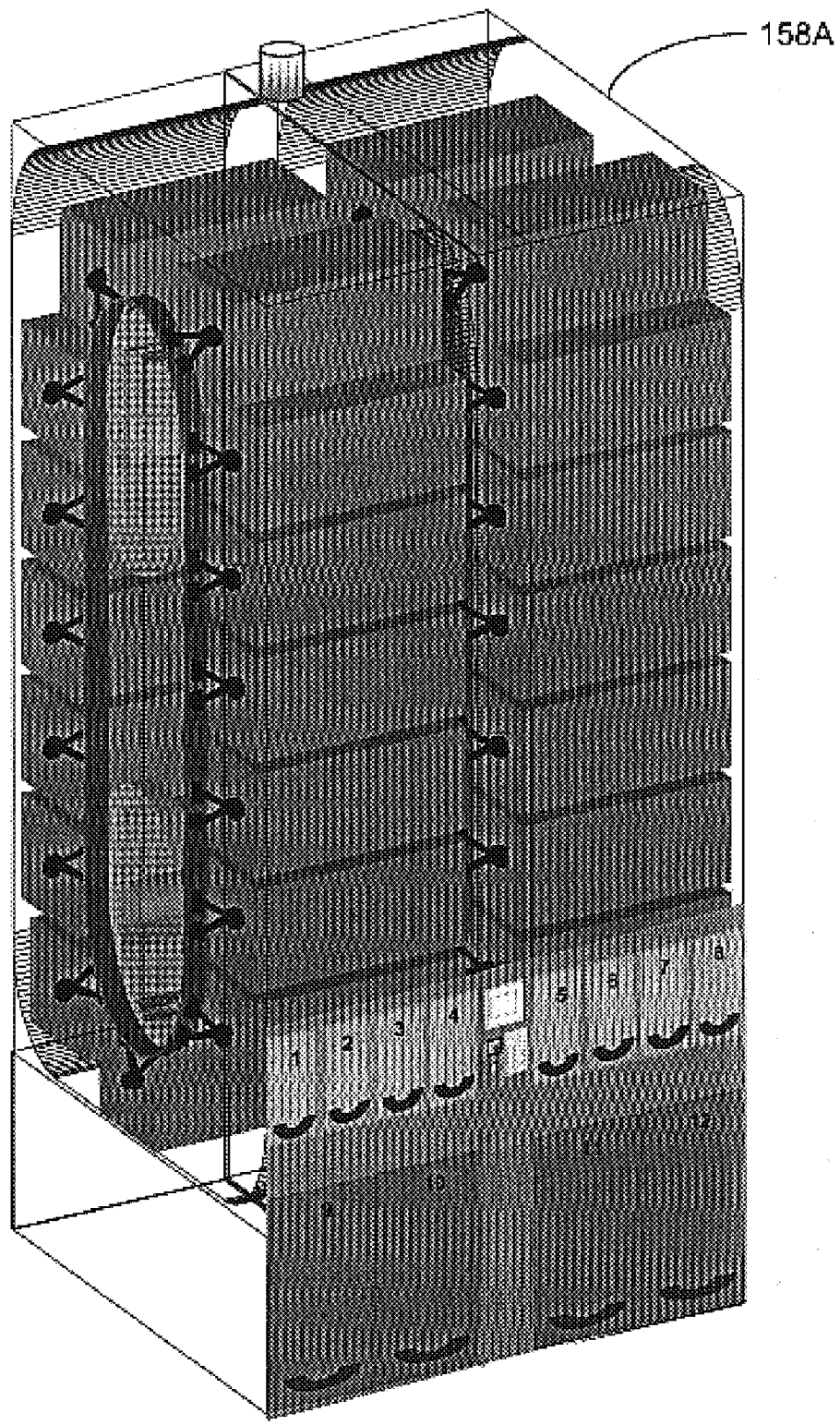
FIG. 19 is a diagram illustrating the interior components of an alternate embodiment of a SBU containing two sets of moving storage locker bins and two sets of stationary storage locker bins.

Yet a further embodiment of the invention is shown in FIG. 19. A SBU 158A can be formed, for example, by two sets of revolving bins and stationary bins. Each set of revolving bins can be controlled by the same motor and motor controller. The bin door locking mechanisms and automated bin door configuration bolt mechanisms of the bin doors of each set of bins can be controlled by one SBU lock controller and one automated configuration bolt controller, respectively. The motor and controller components of the SBU 158A of this embodiment can be located, for example, between two sets of stationary bins which can each be located below a set of revolving bins. The SBU 158A can have one SBU scanner port, one SBU keypad, and one SBU display screen. Each set of revolving bins can have its own set of upper and lower spindles moveable by its own set of bin drive chains and a motor drive chain. The motor can have two different motor shafts—one for each set of revolving bins. The motor can be controlled to move one of its two motor shafts in a specified direction for a specified distance depending upon the location of a revolving bin that is being moved into a loading/unloading position.

In still a further embodiment of the invention, Bin Inventory table records 1300 can exist for every possible bin configuration. There can be an Active Status field on the Bin Inventory table 1300, which can be used to activate and deactivate each record by changing its value from a value such as "inactive" to a value such as "active" and vice versa. As the SBU Configuration Program 352 is run, in this embodiment, the Active Status field on Bin Inventory records 1300 associated with a master bin can be updated to reflect the configuration changes made to that master bin. For example, if a master bin that is divided into two bins, each with a Bin Size of "2", is configured to become one large undivided bin, it will start with two Bin Inventory records 1300 that have an Active Status with a value such as "active"—one of those records having a Configuration Code value such as "12" and the other having a Configuration Code value such as "34". After the configuration adjustment gets made, both of the records which had an Active Status value such as "active" can have an Active Status value such as "inactive". The Active Status of the Bin Inventory record 1300 associated with that master bin that has a Configuration Code such as "1234", can be updated from a value such as "inactive" to a value such as "active". The number of records on the Bin Inventory table 1300 can be much larger than if inactive records were not listed on the table 1300, but bin configuration adjustment changes can be made by updating the Active Status field on Bin Inventory records 1300 associated with the master bin of the SBU 158, instead of adding and deleting Bin Inventory records 1300.

In a further embodiment of the invention, notification messages can be customized by each shipper to include standard information, such as a description of their package retrieval policies, or situation specific information based upon factors including, but not limited to the time elapsed since the delivery notification of a bulk delivered package, the number of packages currently in a CDC for a package recipient, seasonal-based factors, and CDC location-based factors. A separate table can be used to store different predefined messages that can be selected for use in an electronic notification message depending upon the values of other fields on that table. This can provide shippers with the capability to change the content of notification messages sent to package recipients and can allow them to have several situational notification messages that can be selected and played based upon other factors.

In yet a further embodiment of the invention, instead of entering a Quick Code and PIN on the SBU keypad 244, an ePD customer access card can be used at a SBU 158 that has a card reader along with an entered PIN to retrieve a bulk delivered package. Alternately, a Customer Id and PIN can be entered on a SBU keypad 244 to retrieve a bulk delivered package instead of entering a Quick Code and PIN on the SBU keypad 244.

While exemplary systems and methods embodying the present invention are shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

What is claimed is:

1. A storage system for storing delivered articles, comprising:
   a storage machine unit having at least one storage locker bin for storing a delivered article for a recipient;
   means for identifying at least one randomly selected storage locker bin, wherein said bin identifying means comprises a storage locker bin identifier;
   means for identifying the delivered article, wherein said article identifying means comprises an article identifier;
   means for associating said article identifier with said randomly selected storage locker bin identifier at the time of delivery of the article for the recipient; and
   a recipient identifier which can be associated with said article identifier, for advising the recipient regarding the delivery of the article.

2. The storage system according to claim 1, wherein the storage machine unit comprises storage locker bins that are moveable to provide access to a storage locker bin during loading of the delivered articles.

3. The storage system according to claim 2, wherein said storage machine unit comprises bin doors corresponding to said storage locker bins, said doors remaining unlocked during movement of said moveable storage locker bins for said loading.

4. The storage system according to claim 2, wherein said storage locker bins are moveable about an axis.

5. A storage system according to claim 1, wherein said bin identifying means further comprises an optical reader for recognizing said storage locker bin identifier.

6. The storage system according to claim 5, wherein said optical reader is a scanner.

7. The storage system according to claim 1, wherein the storage machine unit comprises storage locker bins that are moveable to provide access to a particular storage locker bin during retrieval of the delivered article by a recipient.

8. The storage system according to claim 7, wherein said storage machine unit comprises a set of bin doors corresponding to said moveable storage locker bins to provide access to any of said moveable storage locker bins when said storage locker bins are moved adjacent to said set of bin doors.

9. The storage system according to claim 8, wherein said set of bin doors is stationary with respect to the movement of said moveable storage locker bins.

10. The storage system according to claim 9, wherein said access is provided when said moveable storage locker bins are moved to a position behind said stationary set of bin doors.

11. The storage system according to claim 8, further comprising a bin door sensor that detects closure of a bin door of said set of bin doors, prior to permitting the movement of said moveable storage locker bins during said retrieval.

12. The storage system according to claim 7, further comprising means to enable self-service retrieval of said delivered article by said recipient.

13. The storage system according to claim 12, wherein said self-service retrieval means further comprises:
   means for determining said moveable storage locker bin corresponding to a code entered by said recipient, said moveable storage locker bin containing an article for said recipient, said code being at least one of a code containing a recipient identifier, a PIN code, and a code temporarily assigned to said recipient to enable retrieval;
   means for moving said determined storage locker bin to an unloading position; and
   means for unlocking said moved determined storage locker bin.

14. The storage system according to claim 7, wherein said storage locker bins are moveable about an axis.

15. The storage system according to claim 7, wherein said storage locker bins comprises a stationary storage locker bin located at a fixed position within said storage machine unit.

16. The storage system according to claim 1, wherein said storage locker bins further comprises an adjustment dividing mechanism that enables a storage locker bin to be configured into a quantity of storage locker bins of various dimensions.

17. The storage system according to claim 16, wherein said adjustment dividing mechanism comprises:
   a dividing panel within said storage locker bin; and
   a key operated locking mechanism capable of locking said dividing panel into different positions, wherein a single key operates a plurality of said key operated locking mechanisms.

18. The storage system according to claim 16, further comprising:
   means for tracking storage locker bin configuration changes; and
   a data record for storing and updating said tracked configuration changes.

19. The storage system according to claim 18, wherein said storage locker bin configuration changes include at least one of changes to a quantity of storage locker bins within said storage locker bin and changes to the dimensions of said storage locker bins.

20. The storage system according to claim 18, further comprising an optical reader to read configuration change data for said tracking means.

21. The storage system according to claim 1, further comprising electronic circuitry for automatically triggering a dispatch of an electronic notification to the recipient of a delivered article subsequent to its loading.

22. The storage system according to claim 21, wherein said electronic circuitry further comprises means for recording information necessary for billing related to the delivery of the delivered article, said information including at least one data entity selected from the group of data entities consisting of an order identifier, an ordering customer identifier, a recipient identifier, a customer identifier, a package identifier, a delivery date, a delivery time, a delivery notification date, and a delivery notification time.

23. The storage system according to claim 21, wherein said electronic notification comprises, at least one of a facsimile, an email, a telephone call, and a page.

24. The storage system according to claim 23, wherein a time for dispatching said electronic notification can be customized to include one of a periodic notification and a time during which dispatching said electronic notification is restricted.

25. The storage system according to claim 1, further comprising means for reserving a quantity of storage locker bins for articles to be loaded at a future time, said quantity including at least one of specified ones of said storage locker bins and unspecified ones of said storage locker bins.

26. The storage system according to claim 25, wherein said reservation is for a specific shipper.

27. The storage system according to claim 1, further comprising authentication means for authenticating a recipient identity prior to one of revealing an identifier of a storage machine unit, said storage machine unit containing an article destined for said recipient and providing access to a storage locker bin containing said article destined for said recipient.

28. The storage system according to claim 27, further comprising at least one of a data card reader, a data entry keypad, and a finger print authentication device.

29. The storage system according to claim 28, wherein said authentication means is located separately from said storage machine unit.

30. The storage system according to claim 27, further comprising an electronically controllable entrance door to an area of a facility containing said storage machine units, said entrance door having a disposition to allow or deny entry controlled by said authentication means.

31. The storage system according to claim 27, further comprising means for providing a temporary access code to enable retrieval of the article destined for the recipient from the storage locker bin.

32. The storage system according to claim 1, further comprising means for creating a package location report comprising identifiers of storage machine units containing articles destined for a particular recipient.

33. The storage system according to claim 32, wherein said package location report lists a temporary access code to be used in conjunction with a recipient's PIN code for retrieval of said article destined for said recipient.

34. The storage system according to claim 33, further comprising an entrance station including at least one of a data entry keypad and a data card reader.

35. The storage system according to claim 34, further comprising an access card having at least a recipient identifier electronically stored thereon, said recipient identifier readable by said data card reader.

36. The storage system according to claim 35, wherein said means for creating a package location report comprises means for validating an identity of the recipient, said validating means including reading said recipient identifier from said access card using said data card reader and validating data entered on said data entry keypad in conjunction with said read recipient identifier.

37. The storage system according to claim 1, further comprising:
   an access card having at least a recipient identifier electronically stored thereon, said recipient identifier readable by a data card reader; and
   a data entry keypad for inputting a recipient's PIN code, validation of said recipient identifier and said PIN code causing electronic opening of an access to a destination centralized pickup location wherein said storage machine unit is located.

38. The storage system according to claim 1, wherein said article identifier comprises an identifier of said recipient.

39. The storage system according to claim 1, further comprising a data record having stored therein, said article identifier and said associated storage locker bin identifier.

40. The storage system according to claim 1, further comprising means for creating a report listing quantities of available bins within said storage machine unit.

41. A storage system according to claim 1 and further comprising:

a processor communicatively interfaced to said storage machine unit for controlling a disposition of the delivered articles within said storage machine unit.

42. The storage system according to claim 41, further comprising:

a database communicatively linked to said processor; and at least one application program linked to said database for controlling the disposition of the delivered articles, the disposition, comprising, configuration of said storage locker bins for accommodating the delivered articles, loading the delivered articles into said storage locker bins, notification of delivery of the delivered articles upon loading, and retrieval of said delivered articles by the recipients.

43. The storage system according to claim 41, further comprising, means for loading the delivered article into any randomly chosen storage locker bin having a capacity to accommodate the delivered article, wherein an article identifier is associated with an identifier of the storage locker bin.

44. The storage system according to claim 41, further comprising means for configuring one of a randomly chosen storage locker bin and a specific storage locker bin to accommodate a delivered article destined for the recipient.

45. The storage system according to claim 41, further comprising:

means for loading the article destined for the recipient into a randomly chosen storage locker bin, said loading means comprising means to associate a storage locker bin identifier with an article identifier;

means for notifying the recipient of the delivered article subsequent to said loading; and means for permitting the recipient to retrieve said delivered article subsequent to said loading.

46. The storage system according to claim 41, wherein said processor is a server.

47. A storage system according to claim 41 and further comprising:

electronic circuitry for automatically triggering the dispatch of an electronic notification to the recipient of a delivered article subsequent to its loading.

48. A storage system according to claim 41 and further comprising:

an adjustment dividing mechanism of said storage locker bins that enables a storage locker bin to be configured into a quantity of storage locker bins of various dimensions.

49. A storage system according to claim 1, wherein said article identifying means further comprises an optical reader for recognizing said article identifier.

* * * * *